US011137985B2

(12) United States Patent
Schoppe et al.

(10) Patent No.: US 11,137,985 B2
(45) Date of Patent: Oct. 5, 2021

(54) USER INTERFACE STENCIL AUTOMATION

(71) Applicant: salesforce.com, inc., San Francisco, CA (US)

(72) Inventors: Owen Winne Schoppe, Orinda, CA (US); Brian J. Lonsdorf, Belmont, CA (US); Alan Martin Ross, San Francisco, CA (US); Sönke Rohde, San Francisco, CA (US); David James Woodward, Westfield, IN (US); Jessica Lundin, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/779,215

(22) Filed: Jan. 31, 2020

(65) Prior Publication Data
US 2021/0240452 A1 Aug. 5, 2021

(51) Int. Cl.
*G06F 8/38* (2018.01)
*G06T 11/20* (2006.01)
(Continued)

(52) U.S. Cl.
CPC ............ *G06F 8/38* (2013.01); *G06F 16/9577* (2019.01); *G06T 7/11* (2017.01); *G06T 11/20* (2013.01)

(58) Field of Classification Search
CPC ................................. G06F 8/38; G06T 11/20
See application file for complete search history.

(56) References Cited

U.S. PATENT DOCUMENTS 8,271,837 B2    9/2012 Prophete et al.
8,392,832 B2 *  3/2013 Arastafar ............ G06F 16/9577
                                                715/273
(Continued)

FOREIGN PATENT DOCUMENTS

WO    2017180410 A1    10/2017
WO    2020092308 A1    5/2020

OTHER PUBLICATIONS

Loading—Lightning Design System; salesforce.com, inc. ;Copyright 2015-present; https://www.lightningdesignsystem.com/guidelines/loading/; 6 pages. [Retrieved Jan. 30, 2020].

*Primary Examiner* — Amy M Levy
(74) *Attorney, Agent, or Firm* — Kowert, Hood, Munyon, Rankin & Goetzel, P.C.

(57) ABSTRACT

Techniques are disclosed for automatically generating stencils for content of a user interface (UI) to be rendered. A computer system receives information specifying content of a user interface (UI) to be rendered. Based on this information, the computer system identifies one or more bounding regions of content within the UI, including analyzing metadata and a rendered version of the UI. The computer system then automatically generates, one or more UI stencils based on the identified bounding regions, that are displayable as progress indicators prior to rendering corresponding UI content. Once it has generated the stencils, the computer system stores information specifying the one or more UI stencils for use in the UI. Automatically generating stencils for UIs may advantageously reduce the time gap from development to deployment of these UIs while improving their perceived performance and, by extension, improving user experience.

20 Claims, 44 Drawing Sheets

(51) Int. Cl.
*G06T 7/11* (2017.01)
*G06F 16/957* (2019.01)

(56) References Cited

U.S. PATENT DOCUMENTS

| | | | |
|---|---|---|---|
| 8,407,184 B2 | 3/2013 | Prophete et al. | |
| 8,407,611 B2* | 3/2013 | Zhang | G06F 8/38 |
| | | | 715/762 |
| 9,076,072 B2 | 7/2015 | Hayek et al. | |
| 9,323,418 B2* | 4/2016 | DiVita | G06F 8/38 |
| 9,411,071 B2 | 8/2016 | Gray et al. | |
| 9,575,634 B2* | 2/2017 | Goodson | G06F 3/0481 |
| 10,180,837 B2 | 1/2019 | Schoppe et al. | |
| 10,467,225 B2 | 11/2019 | Rohde | |
| 10,628,445 B2 | 4/2020 | Prophete et al. | |
| 10,635,413 B1* | 4/2020 | Krishnamoorthy | G06F 8/34 |
| 10,706,113 B2 | 7/2020 | Lundin et al. | |
| 10,789,066 B1 | 9/2020 | Rohde et al. | |
| 10,796,285 B2 | 10/2020 | Johnson et al. | |
| 10,817,822 B2 | 10/2020 | Ni et al. | |
| 2006/0075336 A1* | 4/2006 | Gawor | G06Q 10/00 |
| | | | 715/273 |
| 2009/0111448 A1* | 4/2009 | Paila | H04H 20/106 |
| | | | 455/418 |
| 2011/0099499 A1* | 4/2011 | Pnueli | G06F 8/38 |
| | | | 715/771 |
| 2012/0054593 A1 | 3/2012 | Naderi | |
| 2014/0282014 A1* | 9/2014 | Lee | G06F 9/44526 |
| | | | 715/733 |
| 2014/0282138 A1* | 9/2014 | Hopton | G06F 8/38 |
| | | | 715/765 |
| 2015/0310126 A1* | 10/2015 | Steiner | G06F 40/14 |
| | | | 715/204 |
| 2018/0024915 A1 | 1/2018 | Taneja | |
| 2018/0056130 A1 | 3/2018 | Bitran et al. | |
| 2018/0060500 A1 | 3/2018 | Ni et al. | |
| 2018/0067976 A1 | 3/2018 | Schoppe et al. | |
| 2018/0089372 A1 | 3/2018 | Bitran et al. | |
| 2018/0101807 A1 | 4/2018 | Ni et al. | |
| 2018/0107793 A1 | 4/2018 | Ni et al. | |
| 2018/0107962 A1 | 4/2018 | Lundin et al. | |
| 2018/0203571 A1* | 7/2018 | Dayanandan | G06T 7/73 |
| 2018/0365713 A1 | 12/2018 | Rohde et al. | |
| 2019/0250891 A1 | 8/2019 | Kumar et al. | |
| 2019/0339834 A1* | 11/2019 | Weiner | G06F 3/0483 |
| 2020/0097577 A1 | 3/2020 | Nielsen et al. | |
| 2020/0133444 A1 | 4/2020 | Hou et al. | |
| 2020/0133692 A1 | 4/2020 | Rohde et al. | |
| 2020/0133693 A1 | 4/2020 | Rohde et al. | |
| 2020/0134310 A1 | 4/2020 | Rohde et al. | |
| 2020/0341602 A1 | 10/2020 | Schoppe et al. | |
| 2020/0341779 A1 | 10/2020 | Rohde et al. | |
| 2020/0341780 A1 | 10/2020 | Andolina et al. | |
| 2020/0341781 A1 | 10/2020 | Schoppe et al. | |
| 2020/0387295 A1 | 12/2020 | Schoppe et al. | |

\* cited by examiner

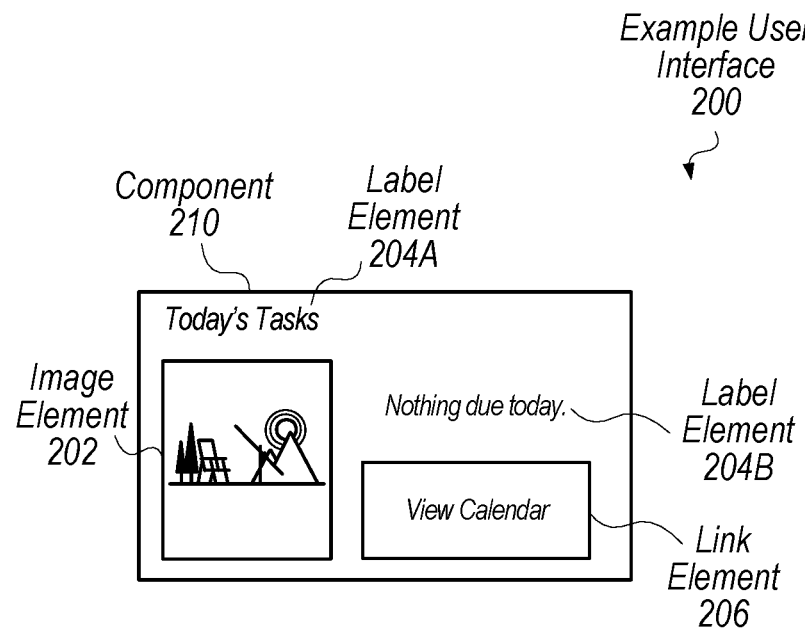
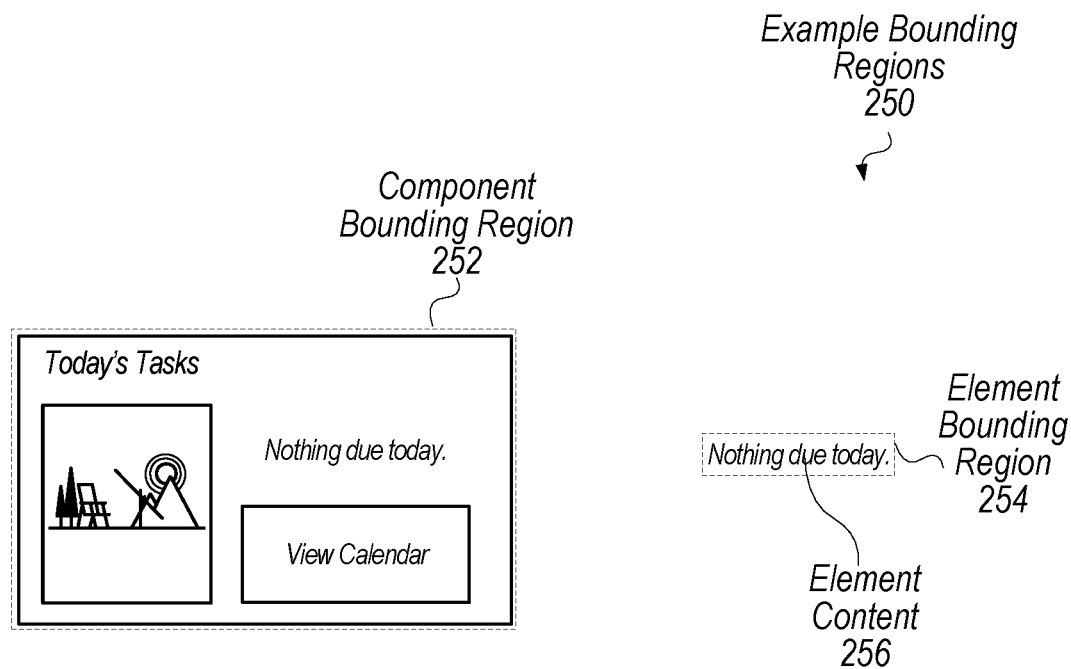
Fig. 2

```
                                                                    700
                                                                  ↙

┌─────────────────────────────────────────────────────────────┐
    │  Receive information specifying a current user interface    │
    │  (UI), including a particular current UI component.         │
    │                            710                              │
    └─────────────────────────────────────────────────────────────┘
                                   │
                                   ▼
    ┌─────────────────────────────────────────────────────────────┐
    │  Receive information specifying a plurality of new UI       │
    │  components for a new UI.                                   │
    │                            720                              │
    └─────────────────────────────────────────────────────────────┘
                                   │
                                   ▼
    ┌─────────────────────────────────────────────────────────────┐
    │  Identify characteristics of the particular current UI      │
    │  component.                                                 │
    │                            730                              │
    └─────────────────────────────────────────────────────────────┘
                                   │
                                   ▼
    ┌─────────────────────────────────────────────────────────────┐
    │  Score, based on the identified characteristics, ones of    │
    │  the plurality of new UI components, where the scoring is   │
    │  performed to determine a similarity to the particular      │
    │  current UI component.                                      │
    │                            740                              │
    └─────────────────────────────────────────────────────────────┘
                                   │
                                   ▼
    ┌─────────────────────────────────────────────────────────────┐
    │  Select, based on the scoring, a particular new UI          │
    │  component from the plurality of new UI components for use, │
    │  in the new UI, for the particular current UI component.    │
    │                            750                              │
    └─────────────────────────────────────────────────────────────┘
```

*Fig. 7*

*Rendering of New UI 2000*

*Portions of New UI with Reduced Differences 2002*

Privacy
Do You Consent?

| YES | NO |

*Clear Buttons*

*Order Can Be Randomized*

Fig. 20

*Rendering of New UI 2100*

*Portions of New UI with Reduced Differences 2102*

How Do You Feel?

○ Great!   ○ Good   ○ OK   ○ So-So   ○ Bad

*All Options Visible & On Equal Footing Vertically*

Next

```
┌─────────────────────────────────────────────────────────────────────┐
│ Receive information specifying a plurality of portions of a current │
│ user interface (UI) for which a neutral presentation is desired.    │
│                              2210                                    │
└─────────────────────────────────────────────────────────────────────┘
                                  │
                                  ▼
┌─────────────────────────────────────────────────────────────────────┐
│  Measure at least one presentation aspect for each of the           │
│  plurality of portions.                                              │
│                              2220                                    │
└─────────────────────────────────────────────────────────────────────┘
                                  │
                                  ▼
┌─────────────────────────────────────────────────────────────────────┐
│  Generate a new UI that reduces differences in the at least one     │
│  presentation aspect for the plurality of portions.                  │
│                              2230                                    │
└─────────────────────────────────────────────────────────────────────┘
```

*Fig. 22*

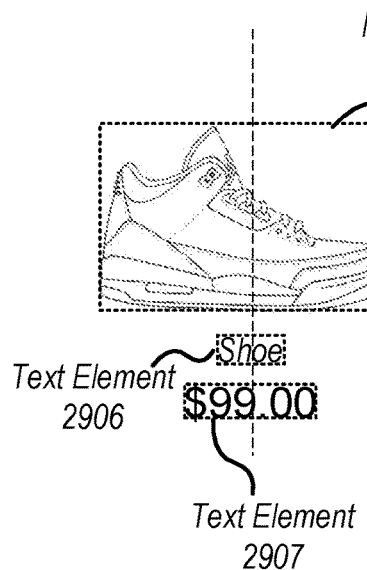
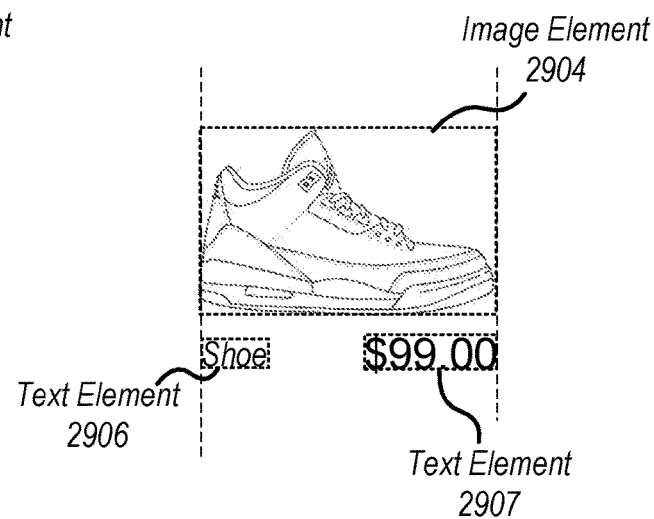
Fig. 29A  Fig. 29B
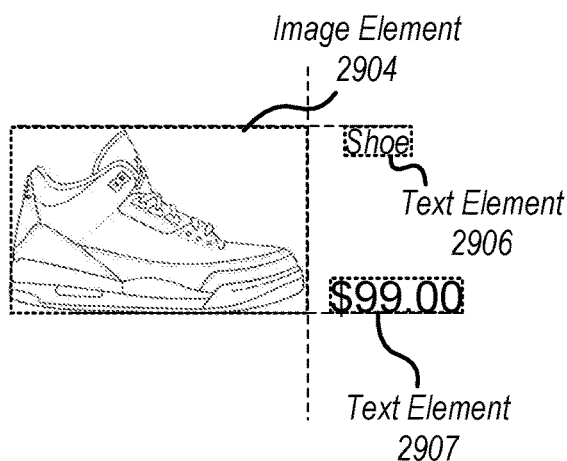
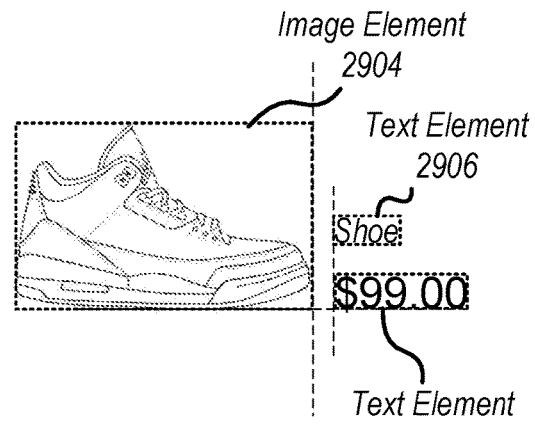
Fig. 29C  Fig. 29D

```
                                    3300

┌─────────────────────────────────────────────────────────────┐
│ Receive a rendering of an image of a user interface (UI)    │
│ where the rendered image includes a plurality of child      │
│ elements positioned within at least one outer bounding      │
│                         region.                             │
│                          3310                               │
└─────────────────────────────────────────────────────────────┘
                               │
                               ▼
┌─────────────────────────────────────────────────────────────┐
│ Updates the rendered image by placing one or more of the    │
│     child elements in selected locations in the rendered    │
│                          image.                             │
│                          3320                               │
└─────────────────────────────────────────────────────────────┘
                               │
                               ▼
┌─────────────────────────────────────────────────────────────┐
│ Determine, using a machine learning algorithm, location     │
│ information for the plurality of child elements in the      │
│                  updated rendered image.                    │
│                          3330                               │
└─────────────────────────────────────────────────────────────┘
                               │
                               ▼
┌─────────────────────────────────────────────────────────────┐
│ Generates information specifying the content of the UI      │
│ based on the location information for the plurality of      │
│         child elements in the updated rendered image.       │
│                          3340                               │
└─────────────────────────────────────────────────────────────┘
```

New UI 4100E

Sales | Home | Opportunities ▼  Leads ▼  Tasks ▼  Files ▼  Accounts ▼  Contacts ▼  Dashboards ▼  Reports ▼  Calender ▼  Email Templates ▼

All ▼ | Search

Quarterly Performance     As of Today 10:20 AM
CLOSED $0   OPEN (>70%) $0   GOAL --

500K
400K
300K   Add the opportunities you're working on, then come back here to view your performance.
200K
100K
0
        Feb           Mar           Apr

Assistant

Nothing needs your attention right now. Check back later.

Today's Events
Looks like you're free and clear the rest of the day.
View Calendar

Today's Tasks
Nothing due today. Be a go-getter, and check back soon
View All

Key Deals – Recent Opportunities
Acme – 1,200 Widgets
Acme – 3/18/2017 - $140,000.00
View All Key Deals

Recent Records
☐ Admin User
☐ John Doe
☐ Sample Report
☐ salesforce.com
☐ Global Media

USER INTERFACE STENCIL AUTOMATION

CROSS-REFERENCE TO RELATED APPLICATIONS

This application is related to the following U.S. Applications filed on Jan. 31, 2020: U.S. application Ser. Nos. 16/778,936, 16/779,177, 16/779,290, and 16/779,390. Each of the above-referenced applications is hereby incorporated by reference as if entirely set forth herein.

BACKGROUND

Technical Field

This disclosure relates generally to user interfaces, and, more specifically, to automating user interface design.

Description of the Related Art

User interfaces are often poorly developed or quickly become outdated as styles and design standards change. For example, a company may rebrand its business to have a new style; as a result, the company's website may need to be updated according to match the new branding. In general, developers implement user interface updates by hand, which can be tedious, especially in cases where the program code for these user interfaces is poorly written (e.g., the user interfaces include large amounts of HTML <div> tags and handwritten cascading style sheets (CSS)). Moreover, user interface updates can also create problems, even if artfully designed. For instance, drastic user interface changes are frequently disorienting to users and, as a result, impede user productivity or engagement.

BRIEF DESCRIPTION OF THE DRAWINGS

FIG. 2 is a block diagram illustrating an example UI and example bounding regions for constituent parts of the example UI, according to some embodiments.

FIG. 7 is a flow diagram illustrating a method for determining a similarity of components of a current UI to new UI components for use in automatically generating a new UI, according to some embodiments.

FIGS. 19-21 depict examples of portions of new UIs that may be rendered after reducing differences in presentation aspects for the examples depicted in FIGS. 13-15.

FIG. 22 is a flow diagram illustrating a method for measuring presentation aspects of portions of a UI identified to be presented neutrally and automatically generating a new UI that reduces differences in the presentation aspects of the identified portions, according to some embodiments.

FIGS. 29A-29D depict block diagrams illustrating examples of additional contemplated horizontal and vertical alignments.

FIG. 33 is a flow diagram illustrating a method for automatically updating locations of elements in a rendered image of a UI and generating new information specifying content of the updated UI, according to some embodiments.

FIGS. 41A-41E are block diagrams illustrating detailed examples of a current UI, intermediate UIs, and a new UI, according to some embodiments.

Figure 1A:
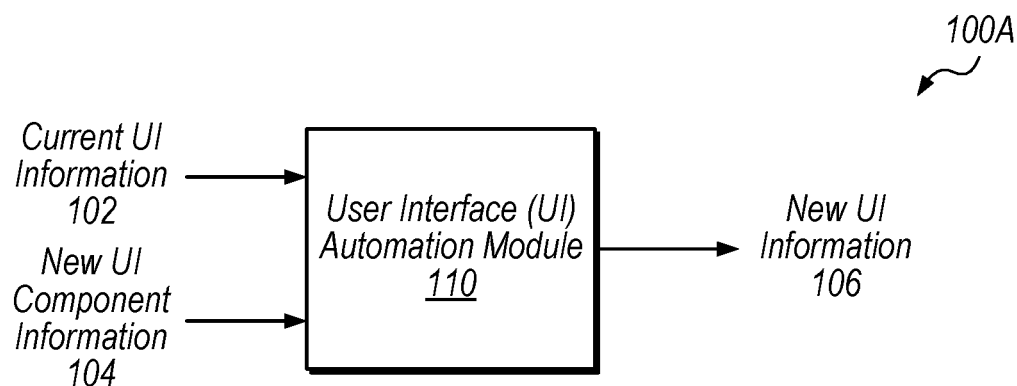
FIGS. 1A-1C are block diagrams illustrating example computer systems configured to automatically update user interfaces (UIs), according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to automatically update a user interface" is intended to cover, for example, a computer system having, for example, a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When used herein, the term "or" is used as an inclusive or and not as an exclusive or unless otherwise explicitly specified or evident from the context. As one specific example, the phrase specifying that "the shape or location of UI content is changed" is an inclusive or, and is intended to cover changes to only the shape of UI content, changes to only the location of UI content, or changes to both the shape and location of UI content. Moreover, phrases in the form of "at least one of the following: x, y, z" are intended to encompass any one of x, y, and z, as well as any combination thereof. Thus, this phrase would cover combinations such as 1) x but not y or z, 2) y and z but not x, and 3) all of x, y, and z, etc.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

DETAILED DESCRIPTION

In many situations, web sites may become out-of-date or are developed using poor programming practices, and, as a result require updating in some way. For example, a company may rebrand its business such that it has a new style, a website may have poorly implemented user interface (UI) components (e.g., buttons are clickable divisions, text colors lack contrast, components contain handwritten cascading style sheets (CSS), etc.), or a website may not include up-to-date accessibility or web standards. When the CSS Flexbox layout model was introduced, for example, user interfaces developed using block formatting became out-of-date.

Techniques are disclosed for automatically updating old or obsolete user interfaces to satisfy the requirements of a new, desired design. For example, in the SALESFORCE. COM context, a user interface generated according to the Salesforce Classic design system may be automatically updated using disclosed techniques in order to satisfy the requirements of the newer Salesforce Lightning design system. The disclosed UI automation system may update some or all of a website or other user interface (which may include multiple pages) to a new style and functionality. One approach for automatically updating a UI involves analyzing individual components of a current UI to map these components to new UI components, which are then used to generate various new UIs to replace current, outdated UI. For example, the UI automation system may analyze the functionality and appearance of components of a current UI and map these to a library of standard new UI components that have been engineered to meet the design requirements of a new UI design specification (Salesforce Lightning is one specific example of a UI design specification). The UI automation system may, for example, map a current UI component that is a clickable div (e.g., <div> This is a link<div>) to a standard button component specified in the new UI design specification.

In addition to identifying the need for automatically updating obsolete UIs, the present inventors have also recognized the need for automating the process of generating "stencils," for user interface content. As user interfaces are updated or changed (e.g., the shape or location of UI content is changed, content is removed altogether, new content is added, etc.), stencils for this content require updates. Although stencils are perceived as important by user interface developers, these stencils must be developed by hand, which is tedious. As a result, techniques developed by the inventors are disclosed for automatically generating stencils for the UI content. As used herein, the term "stencil" (or "placeholder") refers to a visual placeholder that provides an abstracted representation of user interface content to be rendered to visually communicate that content of the UI is in the process of loading. For example, stencils are rendered in place of and prior to the rendering of user interface content when content of the user interface has not yet fully loaded. Stencils may be used to visually represent user interface components and, by extension, user interface elements included in these components. A stencil in many cases may be a more sophisticated version of a loading graphic (e.g., a spinner or an hourglass) displayed in a UI to indicate loading of the UI. In many cases, stencils may be displayed when user interface data is not displayed within some time threshold (e.g., 300-500 ms). For example, stencils might be displayed starting at 300 ms after loading and remain displayed until the UI data has loaded). Stencils may advantageously improve the perceived performance of a user interface and, as a result, improve user experience.

The present inventors have also recognized the need for automating the process of presenting a neutral design for a UI. Design may emphasize presentation aspects, which can be visual or content related aspects, of content or elements in the design to help draw a user's attention to particular content or elements in the UI. The emphasis of particular content or elements in the design may, for example, improve communication of the emphasized content or elements. Such emphasis may, however, also draw the user's attention away from other content or elements in the UI.

While emphasis to draw the user's attention to/away from certain content or elements may be useful for some UI presentations, there are UI presentations that can benefit from a more neutral presentation of content or elements in the UI. For example, UIs that may benefit from a more neutral presentation include, but are not limited to, UIs that present legal decisions (such as opt in/opt out of agreements), UIs with survey data, UIs with forms or information displays, UIs with news, reports, or analytics, UIs that present facts, or other UIs where a user is requested to make a choice. As used herein, the term "neutral presentation" refers to presenting elements or components in a UI in a way that reduces or minimizes any influence or sway that differences in the presentation of the elements or components (including visual, clarity, or tonal presentation aspects of the elements or components) have on a user's interpretation of the elements or components. In certain embodiments, a neutral presentation is desired for comparable elements in a UI. As used herein, the term "comparable elements" refers to elements in a UI that are related in some manner and presented for comparison by a user. Comparable elements may include, for example, user selectable elements related to a concept for which a user is requested to respond by selecting one or more of the elements. Examples of comparable elements include, but are not limited to, user selectable answers to legal agreements, user selectable responses to survey questions, and informational elements directed to a topic.

Figure 13:
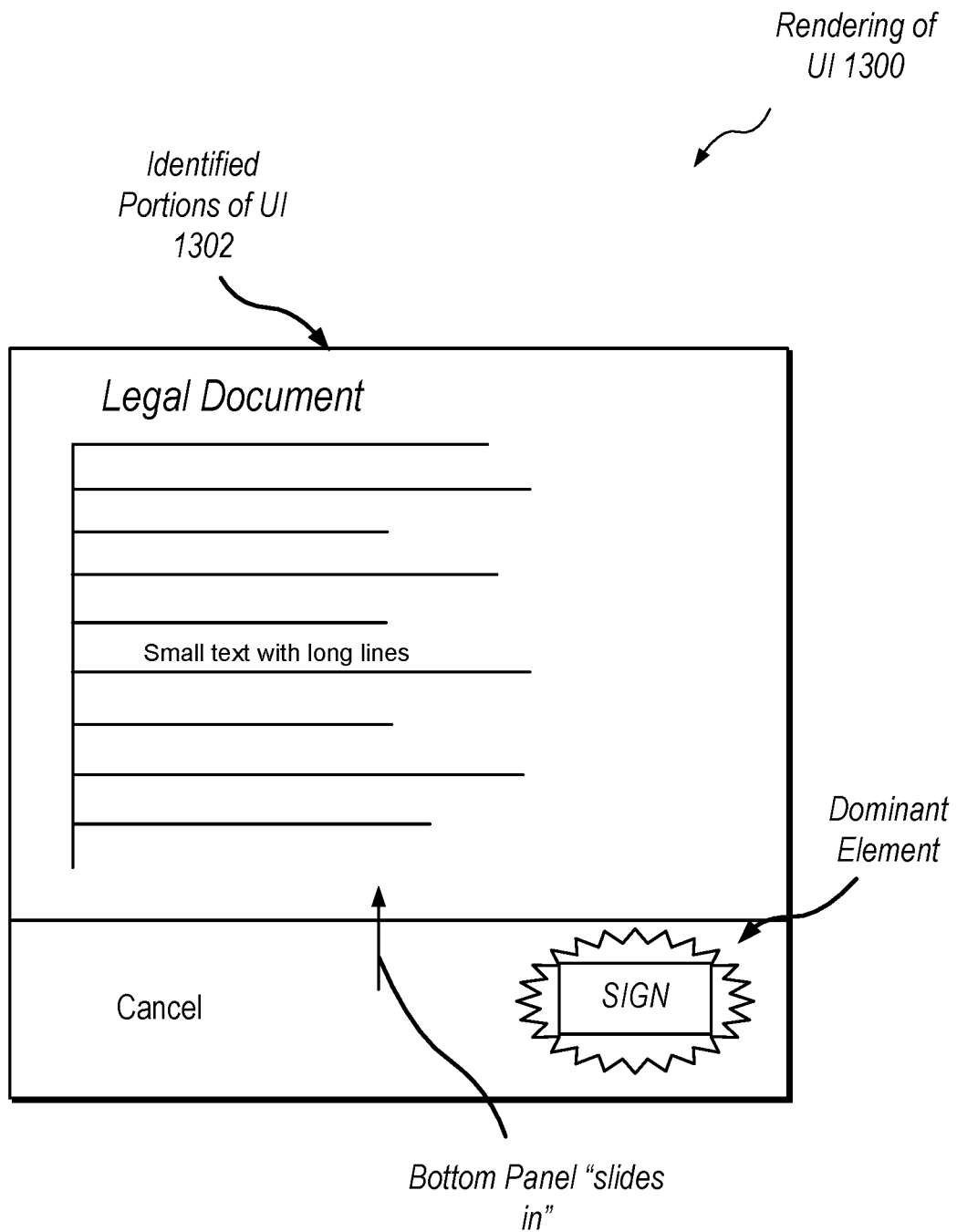
FIGS. 13-15 depict examples of portions of UIs that may be identified for neutral presentation, according to some embodiments.
Figure 14:
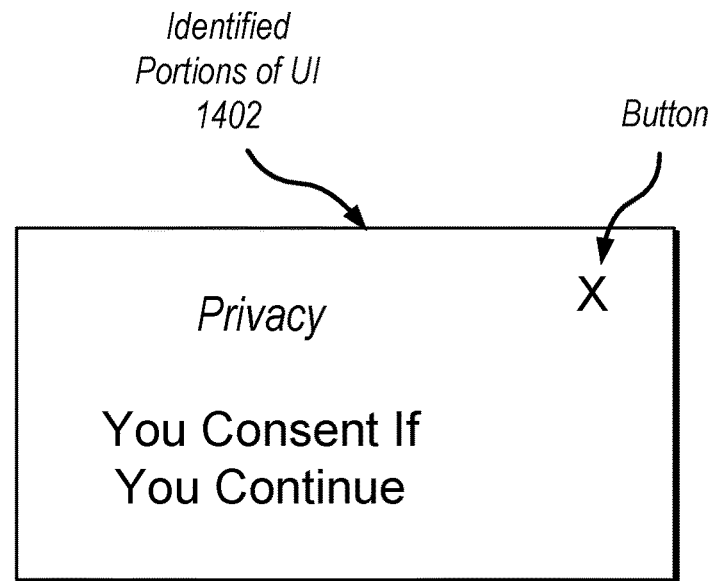
Figure 15:
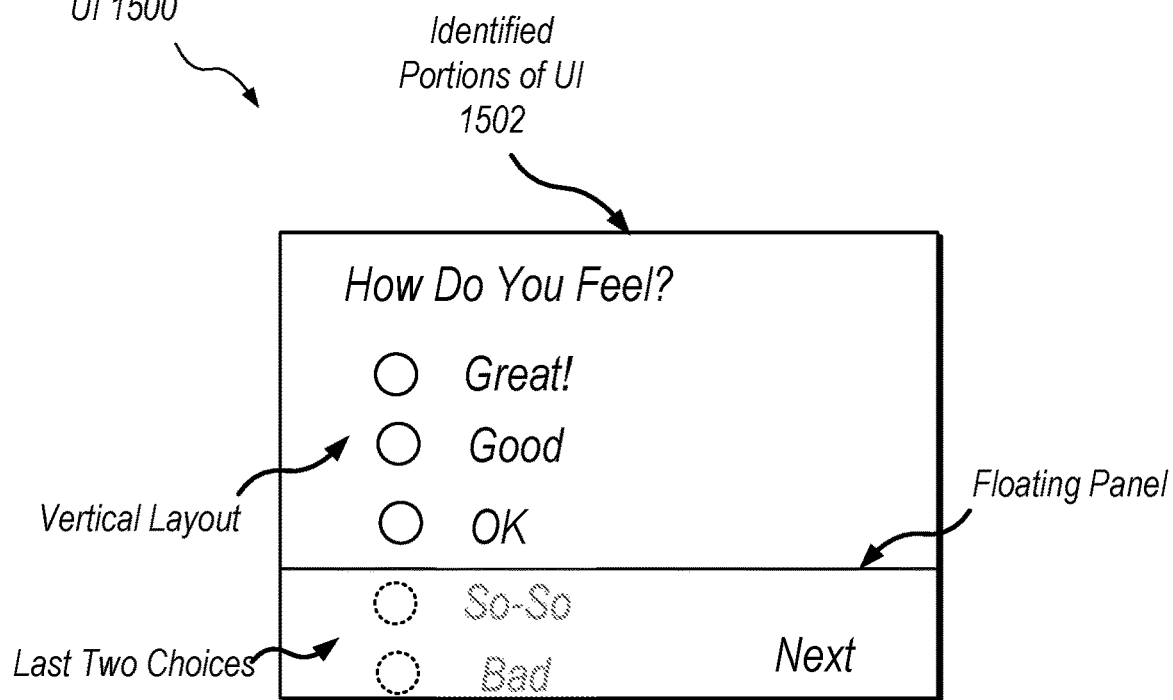
Figure 19:
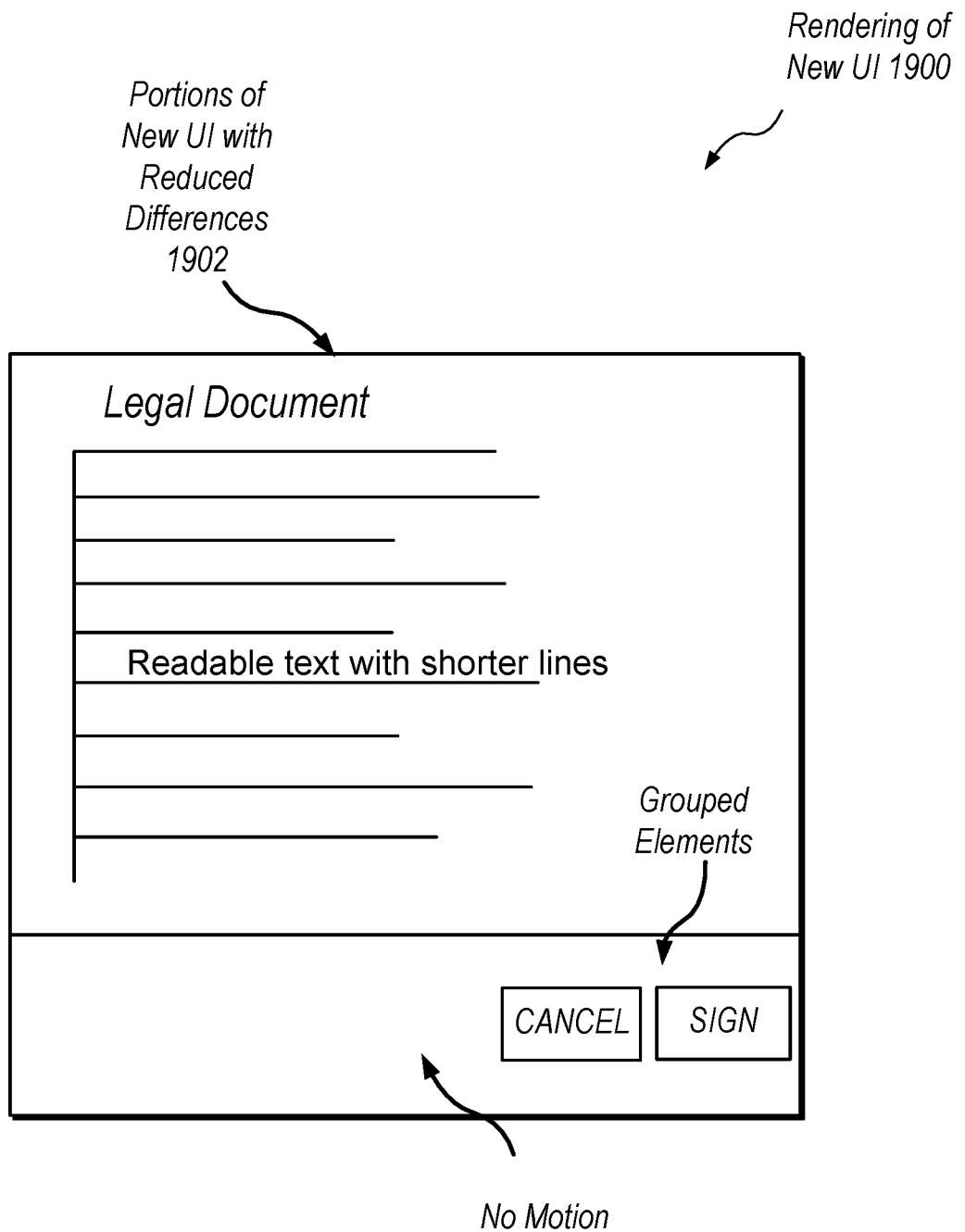

In the UIs listed above, it may be advantageous to present elements or components in the UI with a more neutral presentation to avoid any bias or influence towards a certain choice or selection. FIGS. 13-15, described below, depict examples of renderings of UIs that present elements of the UI with bias between the elements. FIGS. 19-21, described below, depict examples of the renderings of the UIs in FIGS. 13-15 with more neutral presentations of the elements of the UI.

The present disclosure contemplates automatically generating a more neutral presentation of content or elements in a UI by measuring the presentation aspects of portions of the UI identified to be presented neutrally (e.g., elements or content identified to be presented neutrally) and automatically generating a new UI that reduces differences in the presentation aspects of the identified portions. Presentation aspects may include, for example, visual aspects, clarity aspects, or tonal aspects. Visual aspects may include visual prominence aspects, which may include measurable aspects such as font size, color/contrast, font weight, font decoration, font capitalization, and font family. Visual aspects may also include background color, border, shadows, border-radius, spacing in and around text, bounding region size, animation or motion effects, layout position, or visual grouping. Clarity aspects may include aspects of text or writing such as length of statements, wordiness of statements, ambiguity, grammatical issues, or other word content-related aspects. Tonal aspects may include subject or emotional tone of images, text, or shapes in the UI.

Presentation aspects in the UI may be measured directly (e.g., by visual inspection) or by using various machine learning algorithms. Presentation aspects that are measured to have any differences that deviate away from a neutral presentation may have their differences reduced for the generation of a new UI. For example, a UI automation module (such as UI automation module 110, described herein) may generate a new UI design that has reduced the measured differences in presentation aspects. In this example, reducing differences may include identification of areas where randomization is needed (such as randomization of survey choices or random order of buttons) or adjusting the display style of elements to be more neutral (such as making buttons close to equal size, making color and font identical, spacing buttons to avoid inadvertent errors in clicking buttons, etc.). After the differences in presentation aspects are reduced to an extent possible, a new UI may be automatically generated that includes the new presentation aspects. Automatically generating a new UI that has reduced the differences in presentation aspects in the UI may advantageously generate UIs that avoid the use of presentation of particular content or elements in the UI that may bias or influence decisions or choices made by a user of the UI.

The present inventors have also recognized the need for automating the process of placing elements in a UI to generate a more appealing design for the user interface. For example, when elements (such as images, text, or shapes) in a UI are not aligned or do not have the proper spacing, the UI may look awkward or unappealing to a user. As such, providing better alignment or spacing of elements in the UI may provide a more appealing visual presentation for the UI.

In many situations, alignment or spacing of elements in a UI is adjusted by visually inspecting the UI (e.g., a programmer visually inspecting the UI) and then changing the underlying code (e.g., HTML or CSS information specifying the content of the UI). These steps may be iteratively repeated until the elements are placed in the desired alignment or spacing. This iterative process may, however, be time consuming and can be prone to errors due to the multiple passes of changing the code and visually inspecting the placement for every element in the UI. Additionally, some elements, such as image elements, may be opaque to the iterative process as the position of the subject of an image within an element is not well defined by the bounding region in the code because the code cannot define the spacing or padding between the image subject and the boundaries of the element, which may especially occur in images that have either white or transparent backgrounds (such as product images).

The present disclosure contemplates automatically updating locations of child elements in a UI by implementing a machine learning algorithm (e.g., a computer vision algorithm) on an image rendering of the UI to determine locations of child elements in the UI. As used herein, the term "child element" refers to an element located within a bounding region a rendered of a UI (e.g., an image rendering of the UI) where the bounding region for the child element is located within an outer bounding region (e.g., a bounding region for a "parent element"). In some instances, a parent element may have multiple child elements. Additionally, it is possible for a child element to be a parent element to other child elements or a parent element to be a child element to another parent element.

The locations of the child elements in the UI image rendering may be updated automatically until the elements are placed in selected locations as determined by the machine learning algorithm. For example, elements may be relocated until the elements are placed in selected alignments or spacing in the UI image rendering. The updated UI image rendering may then be used to generate code that places the elements in the selected locations from the UI image rendering. Using machine learning (e.g., computer vision) to determine and update locations of elements may advantageously provide automatic placement of elements in a UI without the need for visual inspection of the elements. Additionally, using machine learning on the UI image rendering may advantageously place elements based on the actual content in the UI rather than bounding regions determined by code used to generate the UI design.

The present inventors have recognized that sudden, dramatic changes to a user interface may, if not handled properly, lead to a poor user experience. Consider a situation such as a website upgrade in which a particular user interface is overhauled to have a different look and feel, and different graphical content that affect how a user interacts with the interface. This change in user interface may be disorienting for users, leading to an inability to efficiently interact with the interface, which may in turn may decrease the productivity of these users. In some cases, users may even choose to revert to the original user interface, or may choose not to upgrade their user interface in favor of maintaining productivity, thereby missing out on certain features that may be present only in the new interface.

To help ameliorate these problems, the present inventors propose a paradigm for smoothing the transition from a current UI to a new UI by automatically generating intermediate UIs to control the rate at which users experience changes to their current user interface design. For example, the disclosed user interface migration system may transition from a current UI, through several intermediate UIs, to a final, target user interface design to allow users to become comfortable with one or more portions of new UI content before being introduced to additional new UI content. The disclosed UI migration system analyzes a current UI and a new UI to identify a set of differences between the two. Based on a set of identified differences, the migration system generates intermediate UIs and scores these UIs based on various factors. The migration system then generates a migration plan for migrating from the current UI to the new UI that includes instructions for transitioning through various intermediate UIs whose scores satisfy a design requirement threshold. For example, a first intermediate UI included in a migration plan for an online grocery store website may change the position of a red checkout button relative to the current UI, while the second intermediate UI changes the color of the checkout button from red to green. In this example, the new UI changes the font of the green checkout button relative to the second intermediate UI. In some embodiments, controlling the rate at which users experience a new, updated UI may advantageously improve productivity, which in turn may improve user experience. In some embodiments, user interface migration plans may vary for different users of a UI, based on user attributes and data collected for individual users.

Example User Interface Generation System

Figure 1B:
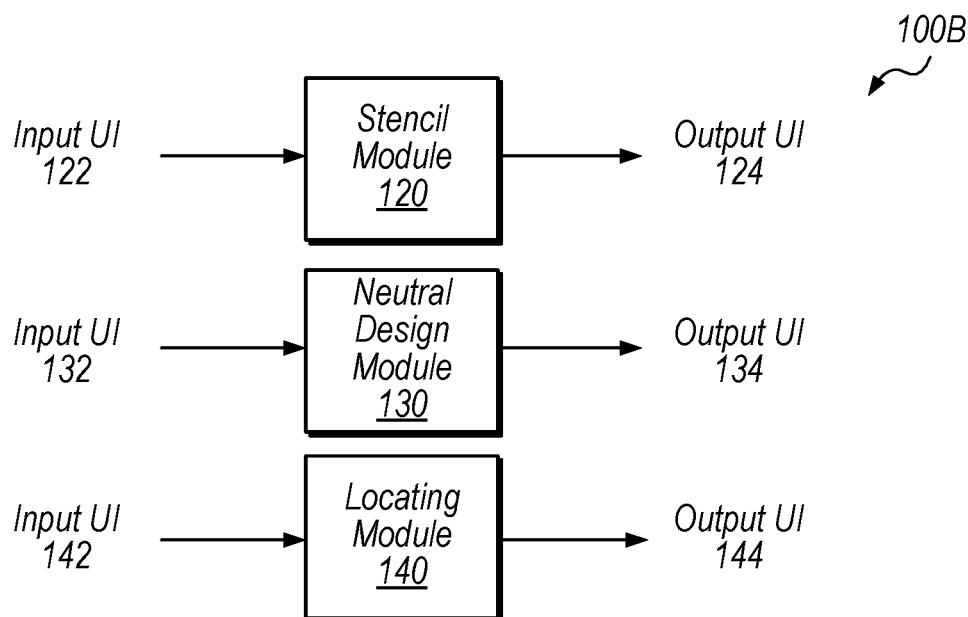
Figure 1C:
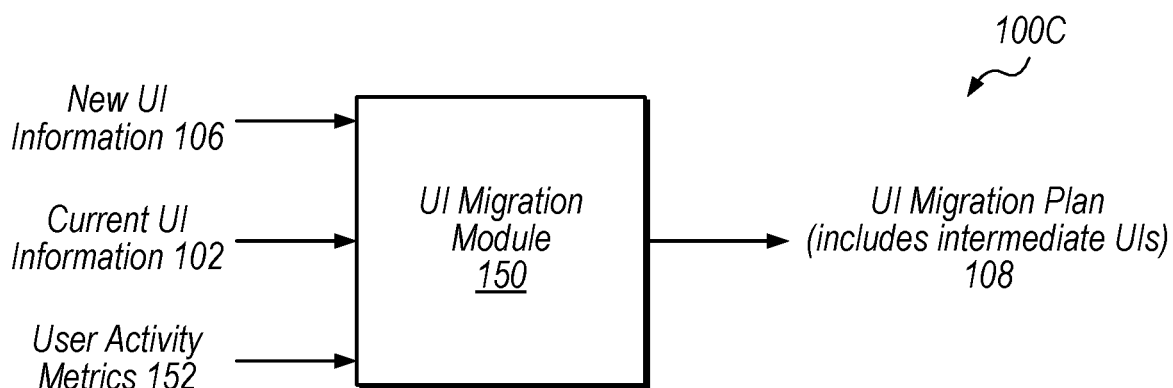

FIGS. 1A-1C are block diagrams illustrating example computer systems 100A-100C configured to automatically update user interfaces (UIs). For example, FIG. 1A shows system 100A that includes a UI automation module 110 for automatically updating a current UI to a new UI. In the illustrated embodiment, module 110 receives information specifying a current UI 102 and information specifying new UI components 104 and outputs information specifying a new UI 106. The information specifying UIs 102 and 106, and components 104 may include the following: program code (e.g., JavaScript, cascading style sheets (CSS), etc.), markup files (e.g., Hypertext Markup Language (HTML)), screenshots or renderings, etc.

In some situations, a company may rebrand and, as a result, want to quickly implement their new branding across their website. In this example situation, the UI automation module 110 may automatically update current webpages that follow the old branding by generating new webpages that are formatted according to the new branding. As one specific example, in the SALESFORCE.COM context, UI automation module 110 may automatically update Salesforce Classic UIs to Salesforce Lightning UIs. Note that techniques for automatically updating current UIs are discussed in further detail below with reference to FIGS. 3-7.

FIG. 1B shows a system 100B that includes three different modules for updating or formatting UIs: stencil module 120, neutral design module 130, and locating module 140. In the illustrated embodiment, modules 120, 130, and 140 receive input UIs 122, 132, and 142 and generate output UIs 124, 134, and 144, respectively. Input UIs 122, 132, and 142 may include information specifying their respective content, such as program code, markup files, screenshots or renderings, lists of components to be loaded for rendering in the UIs (e.g., a manifest file), etc.

In some situations, stencil module 120 may generate a stencil to abstractly represent a portion of a user interface that includes an image, text describing the image, and a button that links to another UI that includes related content. In this example, the stencil may include a gray box that is the same size as the image, gray lines or ovals that extend the same length across the interface as the text describing the image, and another gray box that is similar in size to the button. These stencils may then be displayed in the user interface, prior to rendering and during loading of the data for the image, text, and button. Techniques for generating UI stencils are discussed in further detail below with reference to FIGS. 8-11.

In some situations, neutral design module 130 may generate a new UI that presents alternative options for user input more neutrally than the existing UI. In this example, neutral design module 130 may measure presentation aspects for a portion of the UI that includes the alternative options for user input and generate a new UI that reduces measured differences in the presentation aspects for the portion in order to present the alternative options more neutrally on the new UI. The alternative options may be, for example, "yes" and "no" options for accepting terms of a legal agreement associated with the web page or provider displaying the UI. Presenting the "yes" and "no" options more neutrally reduces bias and influence on the user's selection of an option due, in any part, to the way in which the alternative options are presented to the user. Note that techniques for generating new UI with reduced differences in presentation aspects are discussed in further detail below with reference to FIGS. 12-22.

In some situations, locating module 140 may generate an updated UI that includes an image aligned with text describing the image in a portion of the UI. In this example, a computer vision algorithm is applied to an image rendering of the UI to measure location information for the image and corresponding text and then reposition the image or corresponding text to align the image and corresponding text in a desired alignment. The image rendering of the UI with the desired alignment may be used to generate updated code (e.g., HTML or CSS) for rendering the update UI. Note that techniques for generating updated UI with alignment are discussed in further detail below with reference to FIGS. 23-33.

FIG. 1C shows a system 100C that includes a UI migration module 150 for migrating from a current UI to a new UI. In the illustrated embodiment, UI migration module 150 receives information specifying a new UI 106, information specifying a current UI 102, and user activity metrics 152. User activity metrics 152 may indicate types and amounts of user interaction with various user interfaces. UI migration module 150 then outputs a UI migration plan 108 that includes intermediate UIs. For example, for a company that has redesigned their website, the UI migration plan 108 may transition from the old website to the new, redesigned website using intermediate UIs. The migration plan may accomplish a rate of change between the old and new websites that is comfortable for a user by slowly introducing changes in each successive intermediate UI. For example, a first intermediate UI included in the UI migration plan for this website may change the location of the home page button on a webpage of the website from the location of this button in the same webpage of the old website. In some cases, the migration plan may specify a speed at which the intermediate UIs are transitioned through as well as an order in which they are displayed to users of the website. Note that techniques for migrating from a current UI to a new UI are discussed in detail below with reference to FIGS. 34-42.

Example Current and New User Interfaces

FIG. 2 is a block diagram illustrating an example user interface 200 and example bounding regions 250 for constituent parts of the example user interface. In the illustrated embodiment, user interface 200 includes a component 210 and bounding regions 250 include a component bounding region 252 and an element bounding region 254.

Component 210 may correspond to one "page" of a user interface 200 that has multiple pages in some embodiments. A given page of a UI may include one or more components, which, as described below, may include one or more elements.

Component 210, in the illustrated embodiment, includes various elements: image element 202, label elements 204, and link element 206. Note that label elements 204 include text; specifically label element 204A is a title and label element 204B is a description. Link element 206 is a button that is selectable to view a calendar. As used herein, the term "element" refers to the smallest granularity at which potentially-visible user interface items are specified. Individual images, text strings, links, etc. are examples of user interface elements. Similarly, as used herein, the term "component" refers to a set of one or more (typically multiple) user interface elements. For example, a user interface component may be a button that includes a text string and a link, or may include several buttons.

Component bounding region 252, in the illustrated embodiment, encompasses an outer boundary (e.g., area) of component 210. In contrast, element bounding region 254 encompasses an outer boundary of label element 204B. The information included within the element bounding region 254 is referred to as the element content 256. As used herein, the term "bounding region" refers to the region encompassed within an outer boundary of one or more portions of user interface content and provides the size and position of the content within the user interface. For example, a bounding region may include the smallest possible measure (e.g., area, volume, etc.) around the outside of an element or component within a user interface. A bounding region may be an HTML, bounding rectangle (which may also be referred to as bounding boxes). In some situations, a bounding region may include padding and a border, each with a thickness, that encompass the UI content of the bounding region.

In some embodiments, information specifying bounding regions may be used to generate stencils for content of a user interface prior to rendering of the UI. These stencils may be displayed to visually represent corresponding content of the user interface. For example, prior to rendering of user interface 200, one or more stencils may be displayed to represent an outline of component 210 as well as a general shape of elements 202-206 in order to visually communicate that the content for these elements and component are currently loading.

Example UI Automation Module

Figure 3:
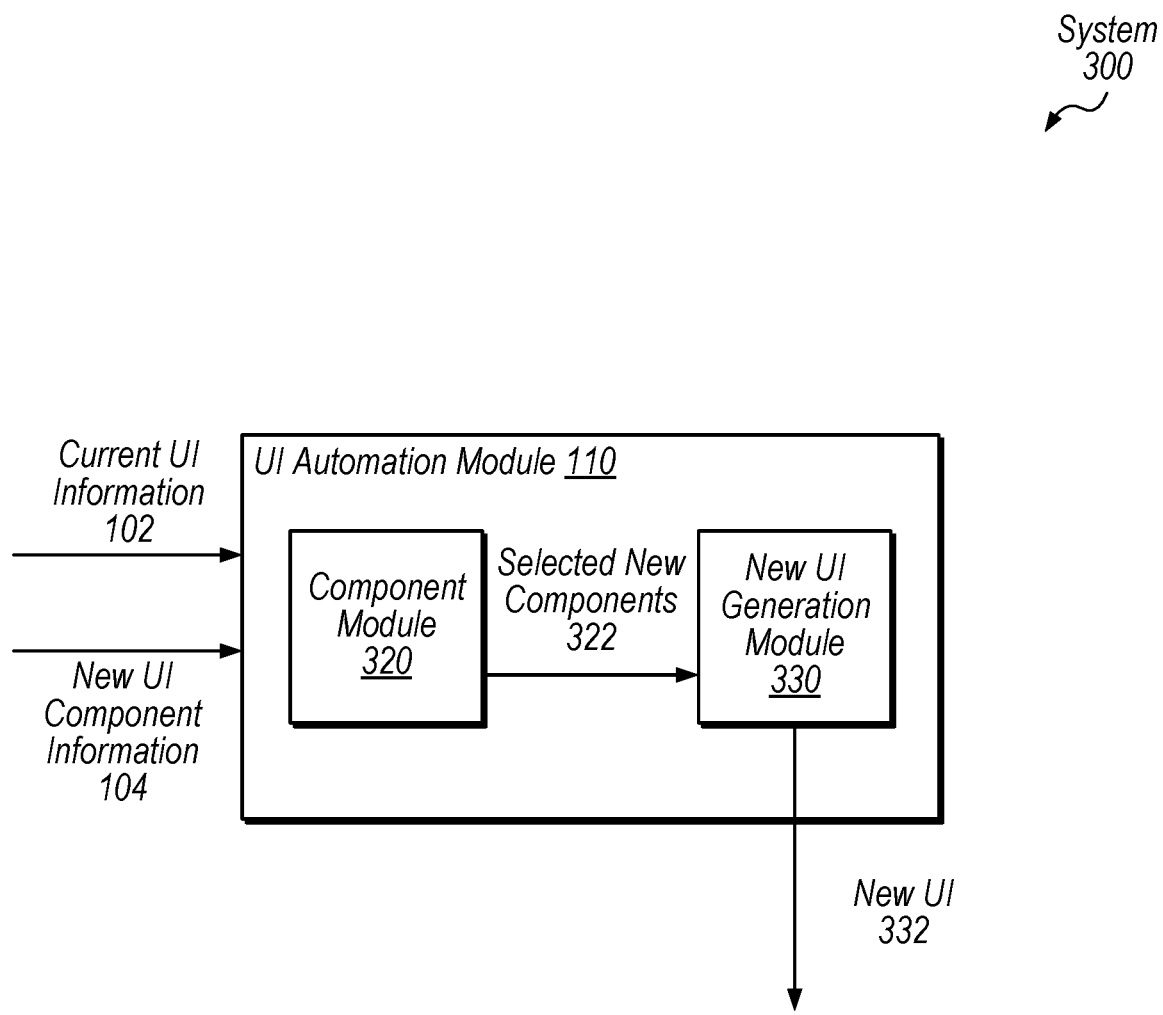
FIG. 3 is a block diagram illustrating an example UI automation module for automatically updating UIs, according to some embodiments.

FIG. 3 is a block diagram illustrating an example system 300 including a UI automation module 110 for automatically updating current UIs. In the illustrated embodiment, UI automation module 110 includes a component module 320 and new UI generation module 330.

Component module 320, in the illustrated example, receives information specifying one or more current UIs 102 and information specifying one or more new UI components 104 and provides selected new components 322 to new UI generation module 330. In some embodiments, component module 320 sends information specifying a mapping between one or more components of the current UIs to one or more of the selected new components 322. The new UI components 104 may be specified by a user interface design specification. As used herein, the term "user interface design specification" refers to a maintained set of design criteria as well as information specifying a collection of user interface elements or components that satisfy this set of design criteria. A set of design criteria may be employed by developers to generate user interfaces for a particular entity associated with the UI design specification. In some situations, use of a UI design specification may ensure consistency between different user interfaces generated for a particular company, for example. In the SALESFORCE.COM context, for example, a user interface may be designed according to the Salesforce Lightning Design System.

New UI generation module 330, in the illustrated embodiment, generates a new UI 332 using the selected new components 322 and outputs information specifying these UIs (e.g., program code or renderings). In some embodiments, UI automation module 110 provides a new UI 332 to one or more of stencil module 120, neutral design module 130, and locating module 140 for augmentation (e.g., generate stencils for) or formatting (e.g., providing a neutral design) of the new UI 332.

In some embodiments, the program code for new UI 332 may include utility classes that minimize the amount of CSS included in components of the corresponding current UI 102. For example, the inline CSS properties "display: flexjustify-content: end;" of current UI 102 may be translated by UI automation module 110 to the utility classes "slds-grid slds-grid align-end," included in the new UI design specification, for new UI 332.

Example Component Module

Figure 4:
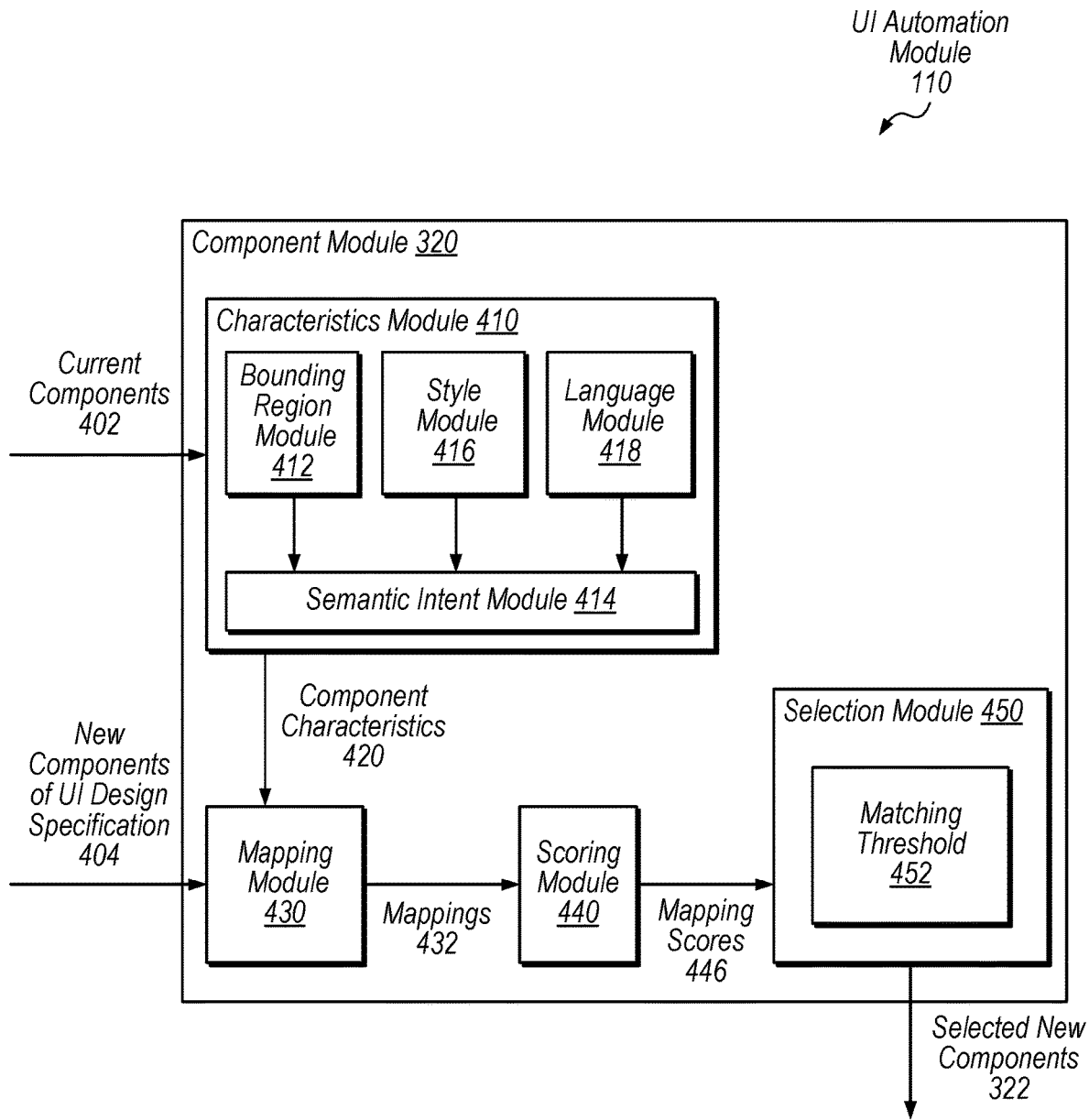
FIG. 4 is a block diagram illustrating an example component module, according to some embodiments.

FIG. 4 is a block diagram illustrating an example component module 320 for selecting components 404 of a new UI design specification for use in a new UI in place of current components 402. In the illustrated embodiment, component module 320 includes characteristics module 410, mapping module 430, scoring module 440, and selection module 450. Characteristics module 410 includes bounding region module 412, semantic intent module 414, style module 416, and language module 418, while selection module 450 includes a matching threshold 452.

Characteristics module 410, in the illustrated embodiment, receives information specifying current components 402 of a current UI. This module then determines component characteristics 420 for one or more of the current components 402. In some embodiments, characteristics module 410 identifies characteristics of both current and new components in order to determine mappings between the two. Examples of component characteristics include: semantic intent, bounding region, style, a quantity of elements included in the component, types of elements (e.g., text, image, link, etc.) included in the component, etc. The style of a component may include one or more of the following: color, shape, font, weight, transparency, location (e.g., location within a UI, location of elements within a component, etc.), size, etc.

Bounding region module 412 determines bounding regions for one or more current components 402. In some embodiments, bounding region module 412 uses computer vision techniques to identify the bounding regions. For example, module 412 may use one or more of the following computer vision algorithms: edge detection, object detection, object tracking, face detection, etc.

Semantic intent module 414 determines a semantic intent of one or more current components 402. Module 414 may, for example, determine semantic intent for a particular current component 402 by checking whether the program code for this component specifies an event handler. An event handler may execute when an event occurs. For example, a click handler may execute when a user clicks on a button (one example of the particular component). In the illustrated embodiment, semantic intent module 414 receives information from style module 416 that determines style characteristics for current components 402. For example, style characteristics may include: color, shape, size, font, weight, transparency, spacing, rotation, borders, etc. In the illustrated embodiment, semantic intent module 414 also receives information from a language module 418. In some embodiments, module 418 performs natural language processing on text included in current components 402. Semantic intent module 414 also receives bounding region information from bounding region module 412.

As used herein, the term "semantic intent" refers to meaning as would be perceived by a user. As one specific example, semantic intent module 414 may receive style characteristics indicating that a particular component is a green rectangle that encompasses black text, language characteristics indicating that the component says "pay now," and bounding region dimensions indicating that this component is smaller than other current components 402 (e.g., this component occupies a small portion of a given UI). In this example, based on this information and based on determining that the component is associated with a click handler, module 414 determines that the component is a payment button.

Mapping module 430, in the illustrated embodiment, receives component characteristics 420 for one or more current components 402 and information specifying new components 404 of a UI design specification, and generates mappings 432 based on this information. For example, mapping module 430 may specify that one or more new components 404 appear to match a particular current component 402 based on the new components having the same or similar characteristics 420 (or some portion thereof).

Scoring module 440, then determines mapping scores 446 for each of the mappings 432 received from module 430 and provides these scores to selection module 450. In some embodiments, scoring module 440 includes a machine learning classifier that provides output indicating probabilities that a current component 402 matches a new component 404 of the UI design specification. For example, classifier output for a particular mapping 432 may be a value between 0 and 1, where a value close to 1 (e.g., 0.8) indicates that the new component 404 included in the mapping is most likely a best match for a particular current component 402 to which it is mapped (although there may be other new components mapped to this current component that receive a classifier score closer to 1). The machine learning classifier included in scoring module 440 may be trained based on a library of new components 404 specified in the UI design specification.

Selection module 450, in the illustrated embodiment, receives mapping scores 446 for the various mappings generated by module 430. The mapping scores 446 may be for mappings between various new components 404 and a particular current component 402 of a current UI. Selection module 450 than determines whether these scores satisfy a matching threshold 452 and selects new components 404 whose scores indicate that they are within a threshold similarity to (e.g., they may be a best match for) the particular current component 402. After determining potential matching new components 404 for current components 402 of a current UI, selection module 450 outputs selected new components 322.

In some embodiments, selection module 450 compares the mapping scores 446 for a particular current component to one another to determine which mapping has a score that indicates a best match. In some embodiments, selection module 450 selects multiple new components for a particular current component based on their mapping scores 446 indicating that these new components satisfy matching threshold 452. In other embodiments, selection module 450 selects only one new component for a particular current component.

Example Mapping

Figure 5:
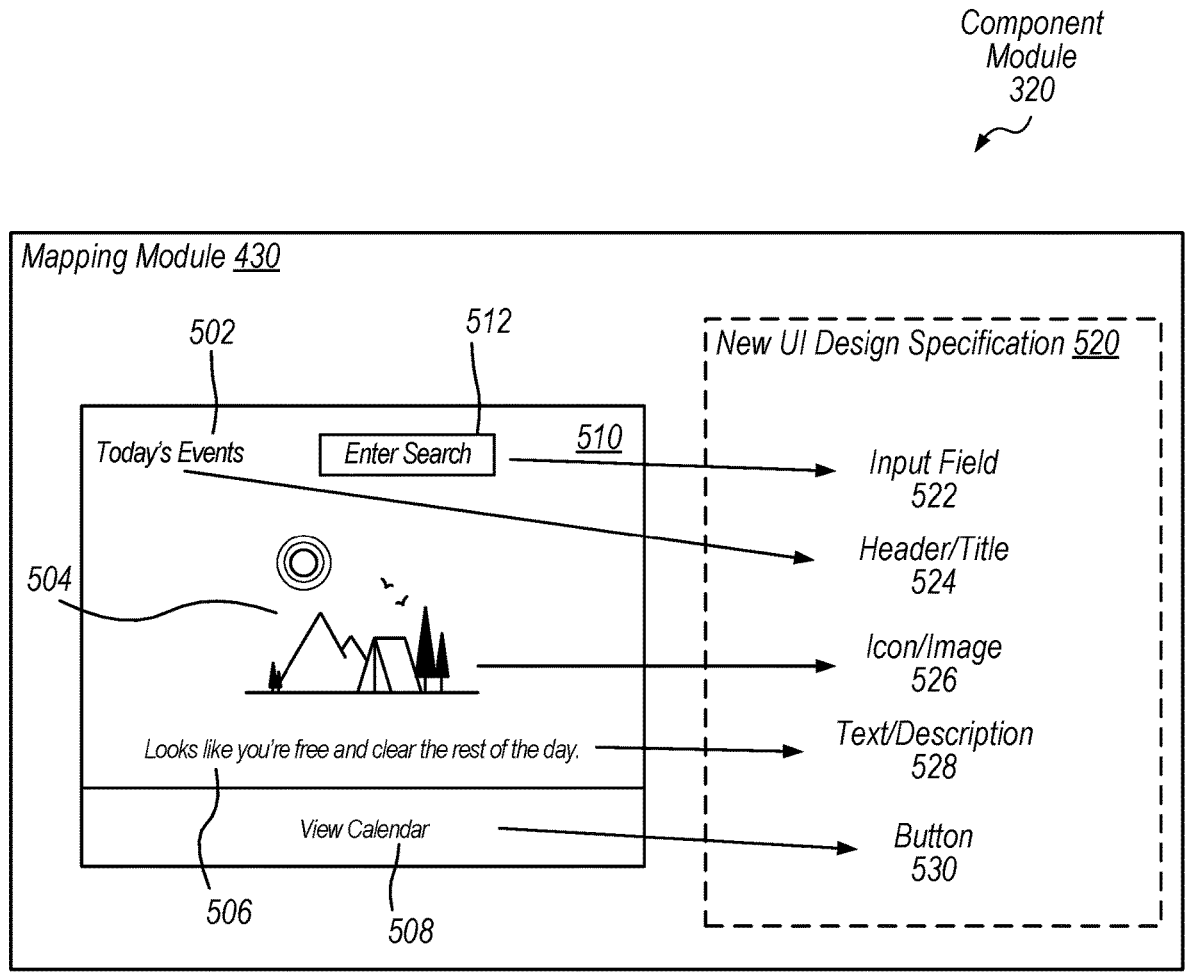
FIG. 5 is a block diagram illustrating an example mapping module, according to some embodiments.

FIG. 5 is a block diagram illustrating an example mapping module 430. In the illustrated embodiment, mapping module 430 determines mappings between components of a current UI 510 based on a screenshot of the current UI and components specified in a new UI design specification 520.

In the illustrated embodiment, mapping module 430 determines that the "Today's Events" component 502 maps to a header/title component 524 of new UI design specification 520. Further mapping module 430 determines that the visual component 504 and the written component 506 map to an icon/image component 526 and a text/description, respectively. Still further, mapping module 430 maps the "View Calendar" component 508 to a button component 530. Finally, mapping module 430 maps the "Enter Search" component 512 of current UI 510 to an input field 522 component of new UI design specification 520.

In some embodiments, mapping module 430 maps components of current UI 510 to multiple different components of new UI design specification 520. For example, new UI design specification 520 may include various different component designs for each of input field 522, header/title 524, icon/image 526, text/description 528 and button 530. As a result, mapping module 430 may map several different component designs from the new UI design specification 520 to each component of current UI 510. For example, mapping module 430 may map several different designs for an input field 522 component of new UI design specification 520 to the "Enter Search" component 512.

Example New UI Generation

Figure 6:
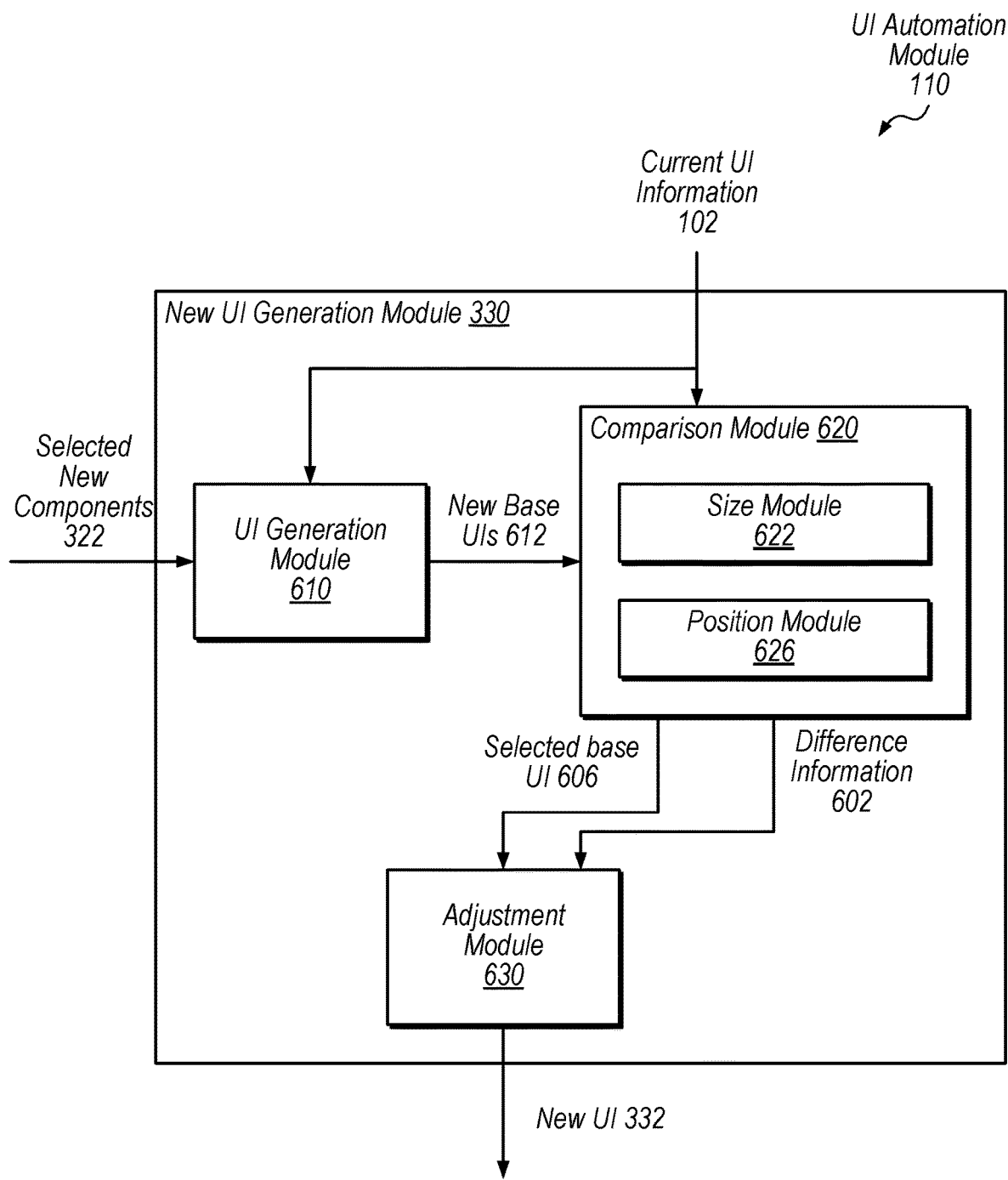
FIG. 6 is a diagram illustrating an example new UI generation module, according to some embodiments.

FIG. 6 is a block diagram illustrating an example new UI generation module 330. In the illustrated embodiment, new UI generation module 330 includes UI generation module 610, comparison module 620, and adjustment module 630.

UI generation module 610, in the illustrated embodiment, receives selected new components 322 and information specifying a current UI 102 and generates one or more new base UIs 612 using the selected new components 322 to replace components of the current UI. For example, UI generation module 610 may determine which current components 402 are included in a particular current UI 102 and, based on this determination, generate a set of the selected new components 322 to replace the current components 402. After generating a set of the selected new components 322 for the particular current UI 102, UI generation module 610 arranges the set of new components within a new base UI 612 according to the locations of corresponding components within the particular current UI. In some embodiments, UI generation module 610 generates multiple new base UIs 612 for a particular current UI 102 using the set of selected new components 322. For example, these multiple new base UIs 612 may include the same new components 322 but with different arrangements of these components.

In some embodiments, UI generation module 610 includes one or more computer vision algorithms. For example, UI generation module 610 may use a computer vision algorithm to determine locations of current components 402 within a particular current UI 102. Specifically, UI generation module 610 may identify bounding regions for the current components 402 that specify both the size and position of components within the particular current UI 102. As one specific example, if a current title component is located in the top left corner of the current UI, then a new title component selected for the current title component would be placed in the same or a similar location of the new base UI 612.

Comparison module 620, in the illustrated embodiment, compares new base UIs 612 with current UI 102 using computer vision techniques to determine difference information 602. Comparison module 620 includes a size module 622 and a position module 626. Size module 622 determines the size of components within current UI 102 and the size of components within the new base UIs 612 (that are new updated versions of the current UI 102). Similarly, position module 626 determines the position of these components within their respective UIs. After determining size and position information for current UI 102 and a particular new base UI 612, comparison module 620 determines the difference between the two. Note that modules 622 and 626 may use computer vision algorithms or may analyze program code of the UIs to determine size and position information. Comparison module 620 may include any number of modules for comparing different characteristics of current UI 102 and new base UIs 612 to provide difference information 602 for the UIs.

Comparison module 620 selects ones of the new base UIs 612 based on the difference information 602 for this UI satisfying a threshold difference criterion. The threshold difference criterion may specify a threshold of allowable difference for a particular metric that a new base UI may include relative to current UI 102. There may be various difference metrics used to measure differences between two UIs, including: difference in pixels (e.g., a percent difference), number of differences in visible UI content, number of differences in program code (e.g., HTML, CSS, etc.). For example, if comparison module 620 determines that difference metrics measured between a new base UI 612 and current UI 102 is above a threshold, it may throw out this base UI (i.e., this new base UI will not be used to replace the current UI). Comparison module 620 may select base UI 606 based on this UI including the least number of differences from the current UI 102. Comparison module 620 then provides the selected base UI 606 and the difference information 602 for this base UI to adjustment module 630.

Adjustment module 630, in the illustrated embodiment, makes adjustments to the selected base UI 606 based on the difference information 602. As one specific example, adjustment module 630 may make a new component of base UI 606 smaller when the difference information 602 indicates that the corresponding component of current UI 102 is smaller than the new component to which it has been mapped. As another example, due to a difference in size between a new component and its corresponding current component, the location of the new component within base UI 606 may be skewed relative to the location of the current component within current UI 102 (e.g., may be closer the vertical midline of the UI than the right edge of the UI) and, as a result, adjustment module 630 alters the location of the new component.

Example Method

Turning now to FIG. 7, a flow diagram illustrating a method 700 for determining a similarity of components of a current UI to new UI components for use in automatically generating a new UI, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, a computer system receives information specifying a current user interface (UI), including a particular current UI component.

At 720, the computer system receives information specifying a plurality of new UI components for a new UI. In some embodiments, the plurality of new UI components is specified by a UI design specification. For example, the UI design specification may include: definitions for the new UI components, accessibility rules, and a design palette. The design palette may include, for example, style information (e.g., colors, fonts, weights, etc.) for UIs generated according to the UI design specification.

At 730, the computer system identifies characteristics of the particular current UI component. In some embodiments, identifying characteristics includes analyzing, using one or more computer vision algorithms, program code and one or more screenshots included in the information specifying the current UI. For example, the computer system may identify one or more bounding regions and a location of the particular current UI component within the current UI. The computer system may, for example, use an edge detection algorithm to identify the bounding regions of the particular current UI.

In some embodiments, identifying characteristics includes determining a semantic intent associated with the particular current UI component. In some embodiments, determining the semantic intent is performed by identifying one or more event handlers associated with the particular current UI component. For example, if a component is associated with a click handler (e.g., the click handler is listening for a user to click on the component), then this component may be a button. In some embodiments, determining the semantic intent is performed by using natural language processing techniques to process text included in the particular current UI component. For example, if a component says "enter search," then this may be an input field intended to receive user input.

In some embodiments, the computer system maps, based on the identified characteristics, at least one of the plurality of current components to ones of the plurality of new components of the UI design specification. In some embodiments, identifying characteristics includes determining a current component type for ones of the plurality of current components. In some embodiments, the mapping includes comparing at least one of the current components to ones of the plurality of new components that are the same component type as the current component.

In some embodiments, the computer system scores the mappings between the current components and the new components. In some embodiments, scoring the mappings includes classifying, by a machine learning module based on the information specifying the current UI and the information specifying the plurality of new components, the new components included in the mappings. In some situations, one new component may be more similar to the current UI component than another new component. As one specific example, if the current component is a green button with black text, then a first new component that is a green button with gray text may be more similar to the current component than a second new component that is a red button with black text.

At 740, the computer system scores, based on the identified characteristics, ones of the plurality of new UI components, where the scoring is performed to determine a similarity to the particular current UI component.

At 750, the computer system selects, based on the scoring, a particular new UI component from the plurality of new UI components for use, in the new UI, for the particular current UI component.

In some embodiments, the computer system automatically generates the new UI. In some embodiments, the new UI includes the selected particular new UI component. In some embodiments, in order to automatically generate the new UI, the computer system identifies, scores, and selects new UI components for use in the new UI for the other current UI components included in the current UI. For example, the computer system may identify for each current UI component which new UI component is the most similar or a "best match" for representing the current component in the new UI.

In some embodiments, after automatically generating the new UI, the computer system identifies one or more differences between the new UI and the current UI. The computer system then adjusts, based on the identified differences, one or more components of the new UI. In some embodiments, the adjusting includes altering a position of at least one of the components within the new UI. In some embodiments, the computer system generates a plurality of new UIs, where the plurality of new UIs includes the selected particular new UI component. In some embodiments, the computer system determines differences between ones of the plurality of new UIs and the current UI. For example, the location or size of components in a new UI may differ from corresponding components in the current UI.

In some situations, automatically updating an old user interface may advantageously improve functionality of the user interface (e.g., improve visibility for the UI by increasing the contrast between UI elements) and, as a result, may improve user experience. Further, automatically updating a UI that includes large amounts of handwritten CSS, for example, may advantageously provide a more adaptable UI by decreasing the amount of time necessary to implement future changes to the automatically updated UI.

Example Stencil Generation

Figure 8:
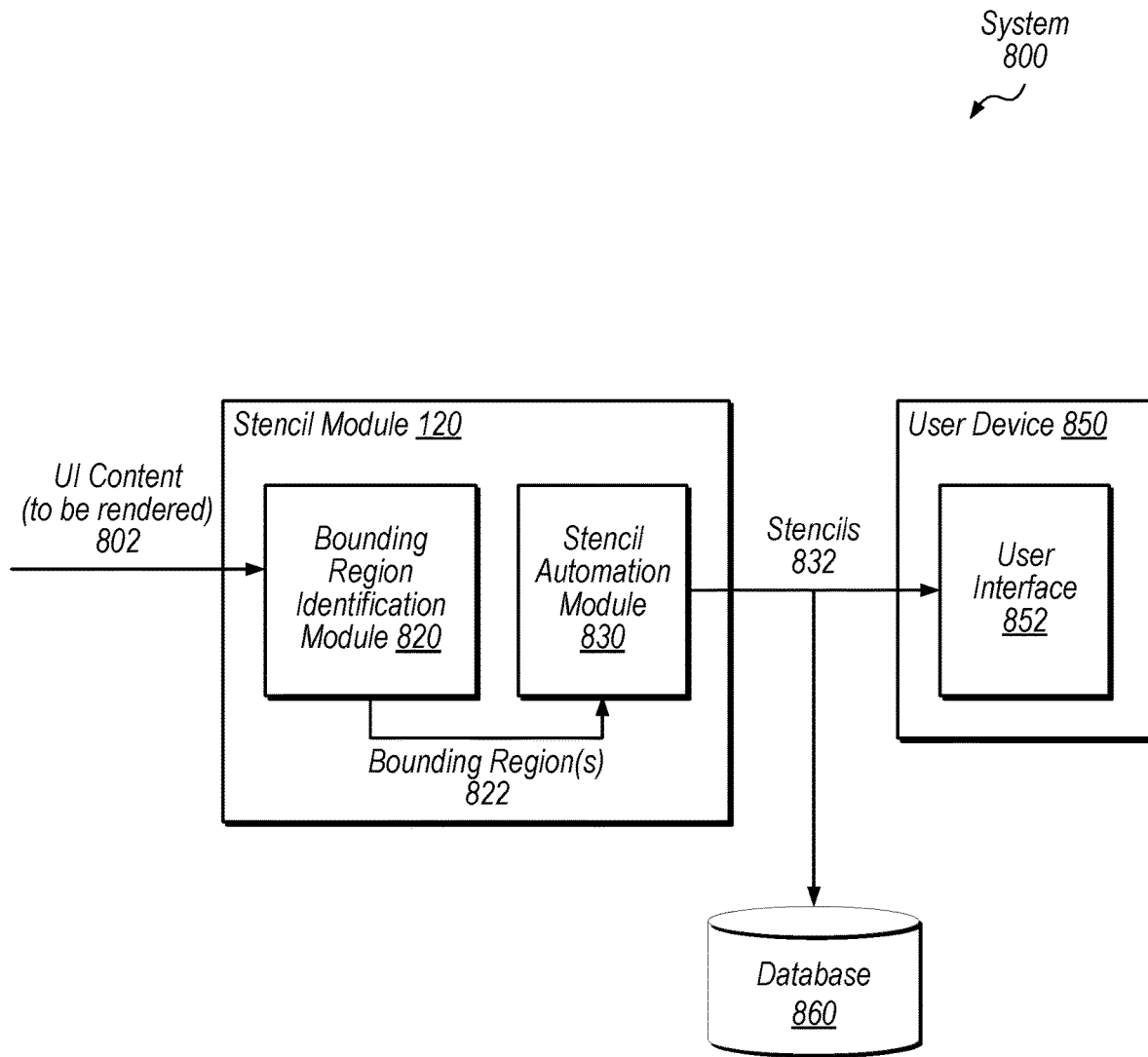
FIG. 8 is a block diagram illustrating an example system configured to automatically generate stencils for UI content to be rendered, according to some embodiments.

FIG. 8 is a block diagram illustrating an example system 800 configured to automatically generate stencils 832 for UI content 802 to be rendered. In the illustrated embodiment, system 800 includes stencil module 120, user device 850, and database 860. Stencil module 120 includes bounding region identification module 820 and stencil automation module 830, while user device 850 includes a user interface 852.

Stencil module 120, in the illustrated embodiment, receives information specifying UI content 802 for a user interface to be rendered (e.g., by user device 850 via UI 852). UI content 802 does not, however, include user interface stencils. In some embodiments, the received information includes a list of components to be loaded for rendering in the UI, program code of the UI, and a rendered version of the UI. For example, the information specifying UI content 802 may include a manifest file, JavaScript, CSS, HTML, etc. for the UI to be rendered as well as a screenshot of the UI. A manifest file for a UI, for example, may include metadata, such as style and location information, for a set of UI components that are to be rendered in the UI.

In the illustrated embodiment, stencil module 120 provides the information specifying the UI content 802 to bounding region identification module 820, which in turn identifies one or more bounding regions 822 and provides them to stencil automation module 830. In some embodiments, bounding region identification module 820 analyzes a screenshot of the UI content in addition to program code for the UI. This may, for example, allow bounding region identification module 820 to identify visible UI content and only provide bounding regions 822 for the visible content. For example, UI content that is listed in the HTML, for the UI may not actually be visible when rendered. Specifically, text content that is not visible to users viewing a UI may be included in the information specifying the UI for accessibility purposes. For example, a web browser may use screen-reading technology to speak this text to assist (e.g., visually impaired) users in understanding content displayed in the UI. This assistive, non-visible text should not be stenciled. Bounding region identification module 820 may advantageously prevent stencil module 120 from stenciling non-visible content of a UI.

Based on the identified bounding regions 822, stencil automation module 830 generates stencils 832 and provides these stencils to user device 850 for rendering in user interface 852 and database 860 for storage. For example, stencil automation module 830 may generate program code for the stencils 832 and provide this code to user device 850. In some situations, stencil module 120 is included in a server that executes the program code for stencils 832 and provides a rendering of the stencils to user device 850 for display via user interface 852 in response to a user of device 850 requesting display of the UI content 802.

Figure 9:
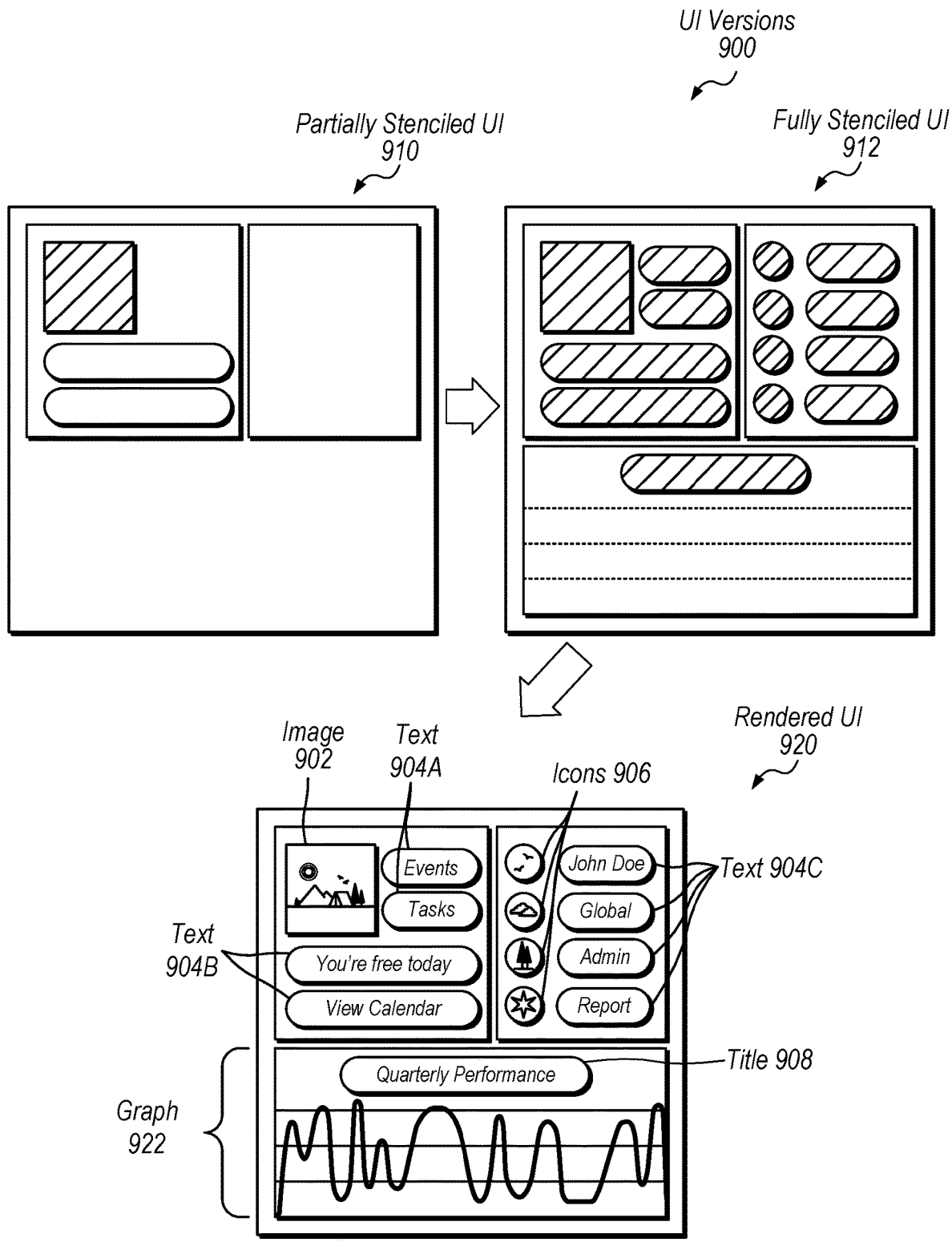
FIG. 9 is a block diagram illustrating example versions of a UI, including a partially stenciled version of a UI, a fully stenciled version of the UI, and a rendered version of the UI, according to some embodiments.

In some embodiments, stencil module 120 generates stencils in real-time. For example, user interface 852 may display "live" stencils 832 to a user via UI 852 as UI content is loaded (e.g., prior to rendering the UI content 802 requested by the user). Live stencils are updated in real-time as new data arrives for components of a UI to be rendered. FIG. 9 provides examples of stencils generated in real-time. In some embodiments, stencil module 120 generates stencils ahead of time and stores the stencils in database 860 for later use. For example, the stencils 832 stored in database 860 may be fully generated stencils that visually represent components of a UI to be rendered. Database 860 stores stencils 832 for UI content 802 for use at a later time (e.g., when user device 850 requests UI content 802 for display via user interface 852).

Example UI Versions

FIG. 9 is a block diagram illustrating example UI versions 900, including a partially stenciled version of a UI 910, a fully stenciled version of the UI 912, and a rendered version of the UI 920. In the illustrated embodiment, the UIs progress from the partially stenciled UI 910 to the fully stenciled UI 912 and, finally, to the rendered version of the UI 920 that includes three different components with rendered UI content.

Stencils generated by stencil module 120 may be displayed when information specifying UI content is taking longer than a time interval to load. In some situations, this time interval is specified by a system administrator. For example, stencils may be shown in a UI if 300 milliseconds have passed since a user requested the UI. In this example, the stencils are shown until all information has loaded for the UI (e.g., from 300 ms to 600 ms), at which time user device 850 renders the UI content to replace the stencils. Note that in instances where the information specifying UI content takes less than a specified time interval to load, stencils may not be shown prior to the rendering.

Partially stenciled UI 910, in the illustrated embodiment, includes stencils that are generated in real-time. Stencils that are generated in real-time may be dynamic stencils that may visually represent a portion of UI content to be rendered and may be updated in real-time as content for other portions of the UI content are received by stencil module 120. For example, UI 910 includes rectangular outlines for two UI components, ovular outlines for two elements within a first of the two components, and a shaded box for an element within the first component. In this particular example, stencil module 120 may receive the data specifying content of the UI from multiple different sources. A first source may be UI content that is provided by a local server or local cache (e.g., either of which may be included in system 800) and is specified by a manifest file (e.g., specifies outlines and locations of UI components). A second source may be UI content that is locally stored by the user device 850 requesting a UI 852. Other sources may include UI content that is received from various application programming interfaces (APIs). As a result, portions of the data specifying the UI content may arrive at different times. Further in this example, as data arrives, stencil module generates partial stencils based on the data that has arrived. As more data arrives, stencil module 120 is able to alter (e.g., add to) the partial stencils to generate a fully stenciled UI 912.

Fully stenciled UI 912 shows rectangular outlines for three UI components as well as various shaded elements within each of these components. Note that the shapes and sizes of the stencils vary according to the underlying UI content to be rendered. The stencils shown in UIs 910 and 912 may be colored (e.g., gray) and different ones of the stencils may be shaded differently (e.g., may be different shades of the same color, may be different colors, or any combination thereof). The stencils for each component in a UI may also include a background color. For example, the two component stencils shown in UI 910 may be black while the stencils for the elements within these components may be gray. In some embodiments, stencils are colored according to a design palette of the UI 920. Design palette determination is discussed below with reference to FIG. 10.

Finally, once all the data has loaded for the example UI 900, this data is rendered to replace the stencils as shown in rendered UI 920. Rendered UI 920 shows UI content for various elements 902, 904, 906, 908, and 922 that were previously stenciled within UI 912. For example, the stencil for image 902 is a shaded box that visually represents the shape, size, and location of the image to be rendered. Similarly, the stencil for the quarterly performance graph 922 includes dotted lines representing axis lines of the graph to be rendered, but does not include the quarterly performance data itself. Stencil module 120 may use computer vision algorithms to identify the axis lines within graph 922 in order to stencil these details in addition to stenciling the outer region and title of the graph.

Example Stencil Module

Figure 10:
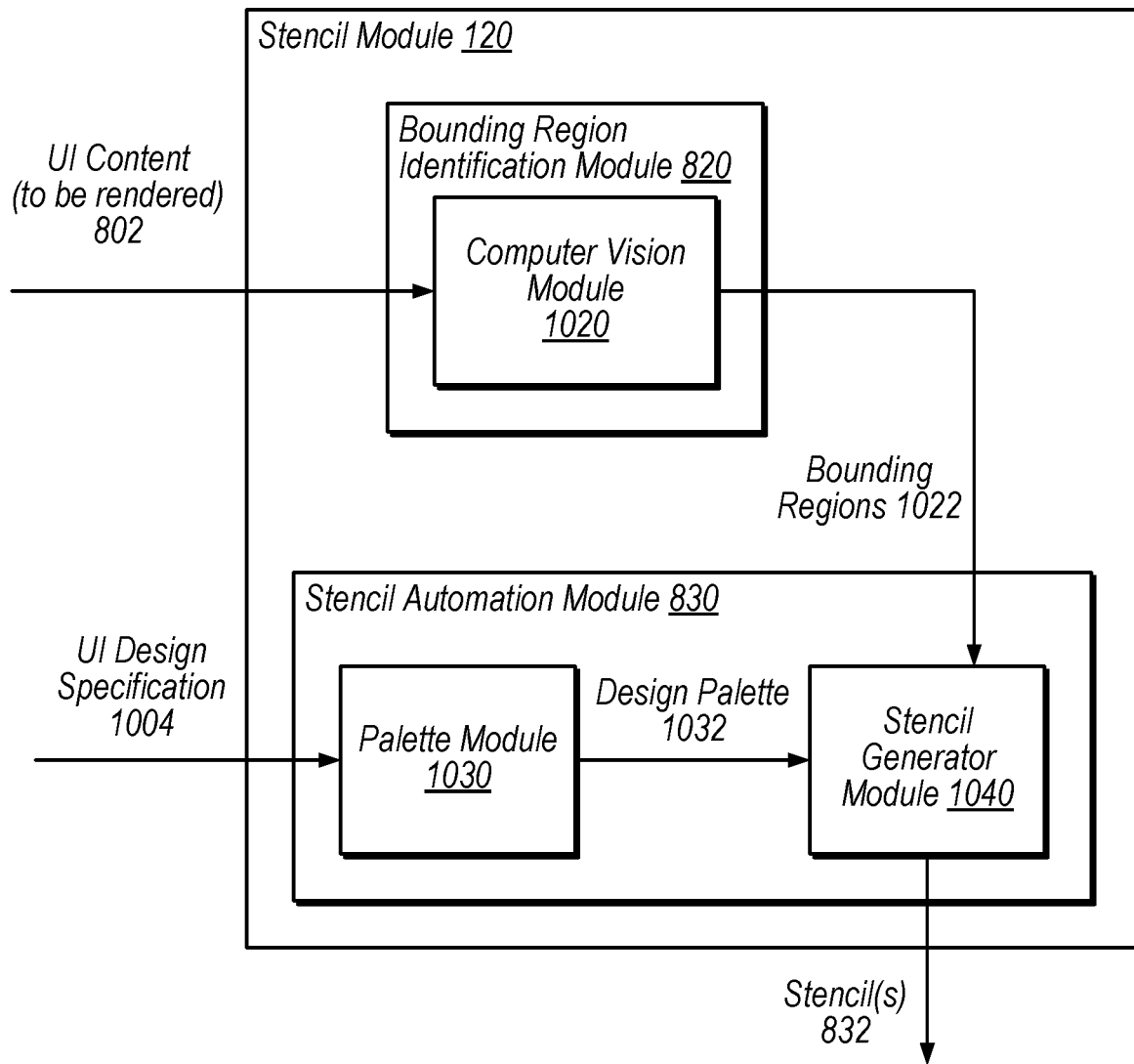
FIG. 10 is a block diagram illustrating an example stencil module, according to some embodiments.

FIG. 10 is a block diagram illustrating an example stencil module 120. In the illustrated embodiment, system 1000 includes stencil module 120. Within stencil module 120, bounding region identification module 820 includes a computer vision module 1020 and stencil automation module 830 includes a palette module 1030 and a stencil generator module 1040.

Computer vision module 1020, in the illustrated embodiment, receives UI content 802 to be rendered and determines one or more bounding regions 1022 for the content. For example, computer vision module 1020 may determine a bounding region for a UI component or one or more UI elements within that component. This module then provides the one or more bounding regions 1022 to a stencil generator module 1040 included in stencil automation module 830. Computer vision module 1020 may use various different types of computer vision algorithms to identify objects within UIs. For example, computer vision module 1020 may apply an edge detection algorithm to identify bounding regions 1022 of elements and components included in UI content 802.

As one specific example, computer vision module 1020 may determine, based on an image file (e.g., .PNG, JPEG, etc.) showing UI content 802, that a badge component includes a circle bounding region within a square bounding region. In this example, the square bounding region is defined in the HTML file of the UI content 802, while the circle bounding region is not. As a result, using computer vision techniques may advantageously allow stencil module 120 to identify the inner circle bounding region of the badge and stencil this content instead of the square bounding region. In some instances, using computer vision techniques to identify the inner circle of the badge may advantageously reduce the amount of time for stenciling this content relative to other techniques (e.g., a technique that attempts to identify the circle based on analyzing program code of the badge).

Palette module 1030 receives a UI design specification 1004 associated with the UI content 802 and determines a design palette 1032 for the specification. Design palette 1032 may specify various characteristics of elements or components included in specification 1004. For example, design palette 1032 may include colors, style (e.g., fonts, weights, transparency, etc.), shapes, etc. of elements and components included in UI design specification 1004. In the SALESFORCE.COM context, UI design specification 1004 may include descriptions for Salesforce Lightning (one example of UI design specification) components that specify a color scheme of this design specification. For example, the color scheme of Salesforce Lightning may include colors on the blue spectrum (e.g., cool colors) rather than colors on the red spectrum (e.g., warm colors). In some instances, stencils may be colored based on the colors included in a customer's brand (e.g., red, green, purple, etc.) resulting in stencils that are personalized for that customer. Palette module 1030 may determine a color scheme for design palette 1032 by pulling all of the information specifying elements (e.g., text, links, images, etc.) from UI design specification 1004 and placing the colors of each of these elements into a set of colors for this design specification.

Stencil generator module 1040, in the illustrated embodiment, receives design palette 1032 and bounding regions 1022 and generates one or more stencils for UI content 802. For example, stencil generator module 1040 may generate stencils whose sizes correspond to the bounding regions 1022 of UI content. In addition, stencil generator module 1040 may color stencils according to a color scheme specified in design palette 1032. As one specific example, stencil generator module 1040 may determine, for a set of colors included in design palette 1032, a percentage of the total area that each color occupies when used for a particular webpage. In this example, if design palette 1032 includes multiple different gray colors, stencil generator module 1040 will select the gray color that is used on the largest area. Based on the selected gray color, stencil generator module 1040 may color the stencils it generates for UI content 802. For example, stencil generator module 1040 may determine an average of the amounts and use the average to color stencils. Stencil generator module 1040 may use a border style (e.g., rounded or square corners) specified in design palette 1032 to format stencils.

In some embodiments, computer vision module 1020 analyzes a plurality of rendered instances of a particular UI component included in the UI content 802 to be rendered and generates a stencil for the particular UI component based on a minimum set of data included in the plurality of rendered instances. For example, computer vision module 1020 may analyze 100, 200, 300, etc. rendered instances of a calendar component that displays events for a particular day to various different users. In this example, computer vision module 1020 determines that, for the particular day, at least two events show up in each instance of the calendar component. Based on this determination, computer vision module 1020 provides bounding regions 1022 for the calendar component (including bounding regions of the two event elements within the calendar component) to stencil generator module 1040. In this example, the calendar stencil that is generated by stencil generator module 1040 is then used to visually represent the calendar component to various different users within their respective UIs prior to rendering of their individual calendars. This type of "average" stenciling may advantageously improve stenciling efficiency, such that the system is able to automatically generate stencils more quickly than stencils that are developed by hand. In addition, this type of stenciling may also reduce or prevent the "jerkiness" sensation experienced by users when viewing a UI during replacement of stencils by UI content.

In some embodiments, stencils are generated such that they are equal to or smaller in size than the UI content which they visually represent. For example, for a given component that includes an outer box with three lines of text that are vertically stacked inside the box, stencil module 120 may generate a stencil that includes a gray outline that is the same size and the outer box and two gray, shaded ovals for the top two lines of text that are the same width as the top two lines of text. When the actual UI content is rendered to replace this stencil, the content cascades in one direction toward the bottom of the UI since the third line of text that is rendered is not included in the stencil. In some situations, this may also advantageously reduce or prevent the jerkiness sensation experienced by users viewing the UI during replacement of the stencil with actual UI content.

Example Method

Figure 11:
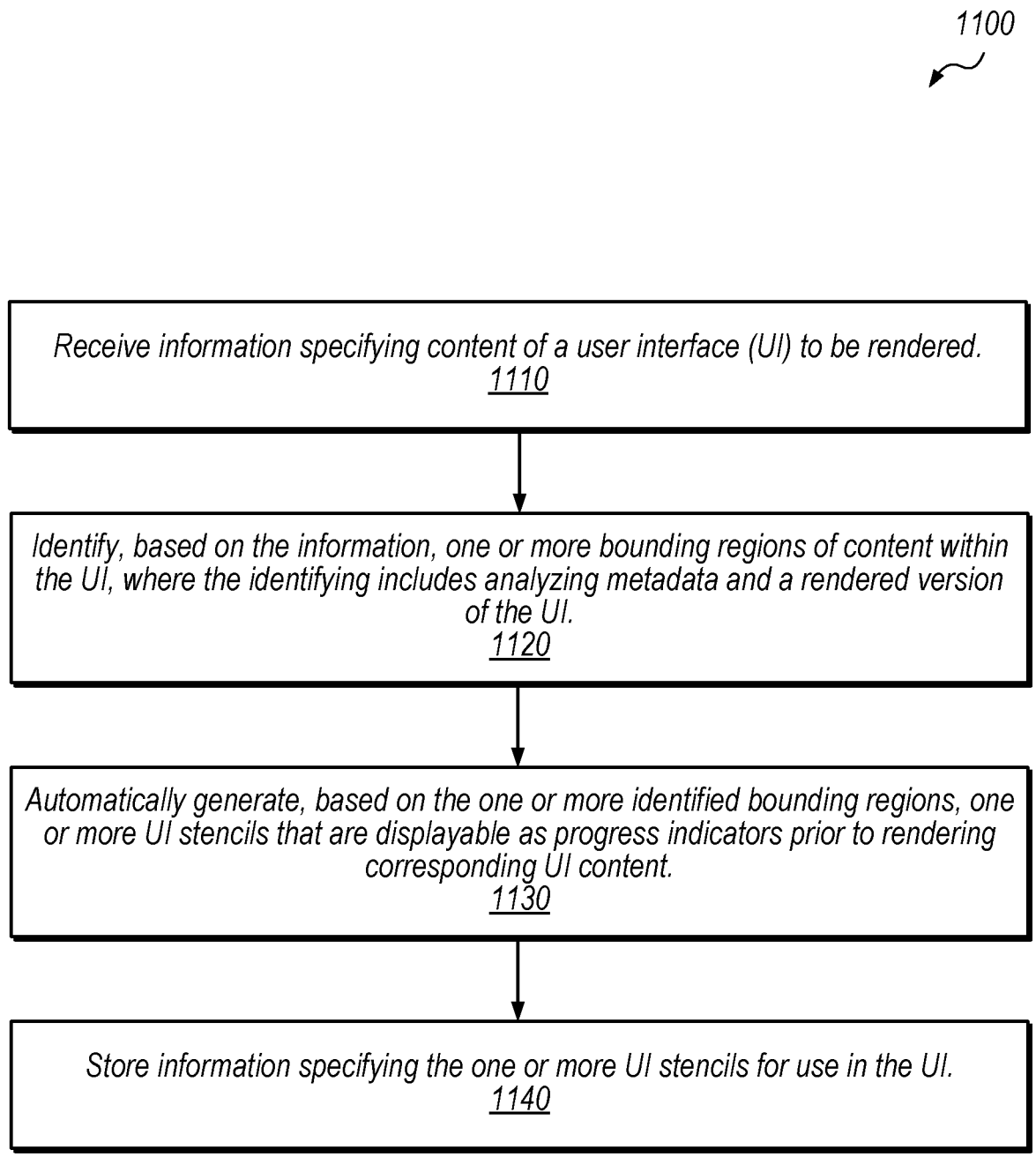
FIG. 11 is a flow diagram illustrating a method for automatically generating stencils for content of a UI to be rendered, according to some embodiments.

Turning now to FIG. 11, a flow diagram illustrating a method 1100 for automatically generating stencils for content of a UI to be rendered, according to some embodiments. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1110, in the illustrated embodiment, a computer system receives information specifying content of a user interface (UI) to be rendered.

At 1120, the computer system identifies, based on the information, one or more bounding regions of content within the UI, where the identifying includes analyzing metadata and a rendered version of the UI. In some embodiments, identifying one or more bounding regions includes analyzing, using one or more computer vision algorithms, the rendered version, where results of the analyzing indicate an outer boundary of one or more constituent parts included in the rendered version. In some embodiments, the one or more constituent parts include one or more UI elements.

In some embodiments, the metadata of the UI includes a list of components to be loaded for rendering in the UI and program code of the UI, while the rendered version is a screenshot of the UI. The list of components may be a manifest file, for example. This list may specify a size and location within a UI of the components to be loaded. The program code may include JavaScript, CSS, HTML, or any of various types of program code used to develop user interfaces.

At 1130, the computer system automatically generates, based on the one or more identified bounding regions, one or more UI stencils that are displayable as progress indicators prior to rendering corresponding UI content.

In some embodiments, the automatically generating includes analyzing one or more rendered instances of a particular UI component included in the information specifying content of the UI. In some embodiments, the computer system determines, based on the analyzing, a subset of data of the particular UI component that is included in the one or more rendered instances. In some embodiments, the computer system generates, based on the subset of data, a stencil for the particular UI component. For example, automatic stencil generation may be enhanced by evaluating various rendered instances of a particular UI component, determining a minimum set of data that is included in multiple of the instances (e.g., three out of six elements show up in all instances), and generating a stencil for the particular component based on the minimum set of data.

In some embodiments, the computer system dynamically generates one or more UI stencils for one or more UI regions, wherein content for respective first portions of the one or more UI regions is available but content for respective second portions of the one or more UI regions is unavailable. In some embodiments, the computer system stores information specifying the dynamically generated UI stencils for use in the UI. In some embodiments, the computer system updates, during display of the one or more UI stencils, at least one of the UI stencils, where the updating is based on content for the second portion of the UI region corresponding to the at least one of the UI stencils being available. In some embodiments, the dynamically generating is performed within a specified time interval. For example, if a UI is taking longer than 300, 400, 500, etc. milliseconds (ms) to load, stencils need to be generated prior to 300 ms in order to display the stencils from 300 ms until the UI data has fully loaded.

At 1140, the computer system stores information specifying the one or more UI stencils for use in the UI.

In some embodiments, the computer system determines a design palette. In some embodiments, determining a design palette includes accessing a plurality of UI element specifications included in a UI design specification associated with the UI to be rendered. In some embodiments, the plurality of UI element specifications includes characteristics of the plurality of UI elements. For example, the characteristics of the UI elements may include type (e.g., image, link, label, etc.), color, size, shape, font, location (e.g., within a component), etc. In some embodiments, the computer system formats the one or more UI stencils according to the design palette.

In some embodiments, the formatting includes performing a color analysis of a variety of colors included in the plurality of UI element specifications. In some embodiments, based on the determined results of the color analysis, the computer system determines a representative color for the UI to be rendered. In some embodiments, the computer system assigns the representative color to one or more UI stencils. For example, if three out of five UI elements specified in the UI design specification include a particular gray color, this color may be selected as the representative color for UI stencils.

In some embodiments, the formatting includes determining respective amounts of a base stencil color included in ones of the plurality of colors specified in the design palette. In some embodiments, the computer system adjusts the base color according to the determined amounts. For example, the base color may be gray. In this example, if colors included in the design palette include high percentages of a darker gray color, then the base gray color may be adjusted to be a darker gray. In contrast, if the design palette colors include high percentages of a light gray, then the base gray color may be adjusted to a lighter gray color.

In some embodiments, the one or more UI stencils are base UI stencils. In some embodiments, the computer system generates a dynamic UI stencil for a UI region when content for a portion of the UI region is available but content for another portion of the UI region is unavailable, where the dynamic UI stencil is used to replace a base UI stencil that was generated for the UI region. In some embodiments, the computer system updates, during display of the dynamic UI stencil, the dynamic UI stencil, where the updating is based on content for another portion of the UI region being available. For example, stencils may be generated or altered in real-time. If, for example, two different application programming interfaces (APIs) are providing data for a particular component to be rendered, this data may arrive at different times. In this example, the computer system will generate and cause display of pieces of a stencil based on pieces of data that are first received for the particular component and, as more data arrives, the computer system updates or adds to the displayed stencil.

As one specific example, the particular component may include an image, two lines of text, and a button. In this example, the computer system first receives data specifying the image element and causes display of a stencil that includes a gray outline (indicating the outer boundary of the particular component) and a gray box (indicating the image element) within the gray outline. Next, the computer system receives data specifying the two lines of text and updates the stencil to include two gray ovals (indicating the text) within the gray outline. Finally, the computer system receives data specifying the button and causes an updated version of the stencil to be displayed, where the updated version includes a gray rectangle (indicating the button element) within the gray outline.

Example Design Neutralization

Figure 12:
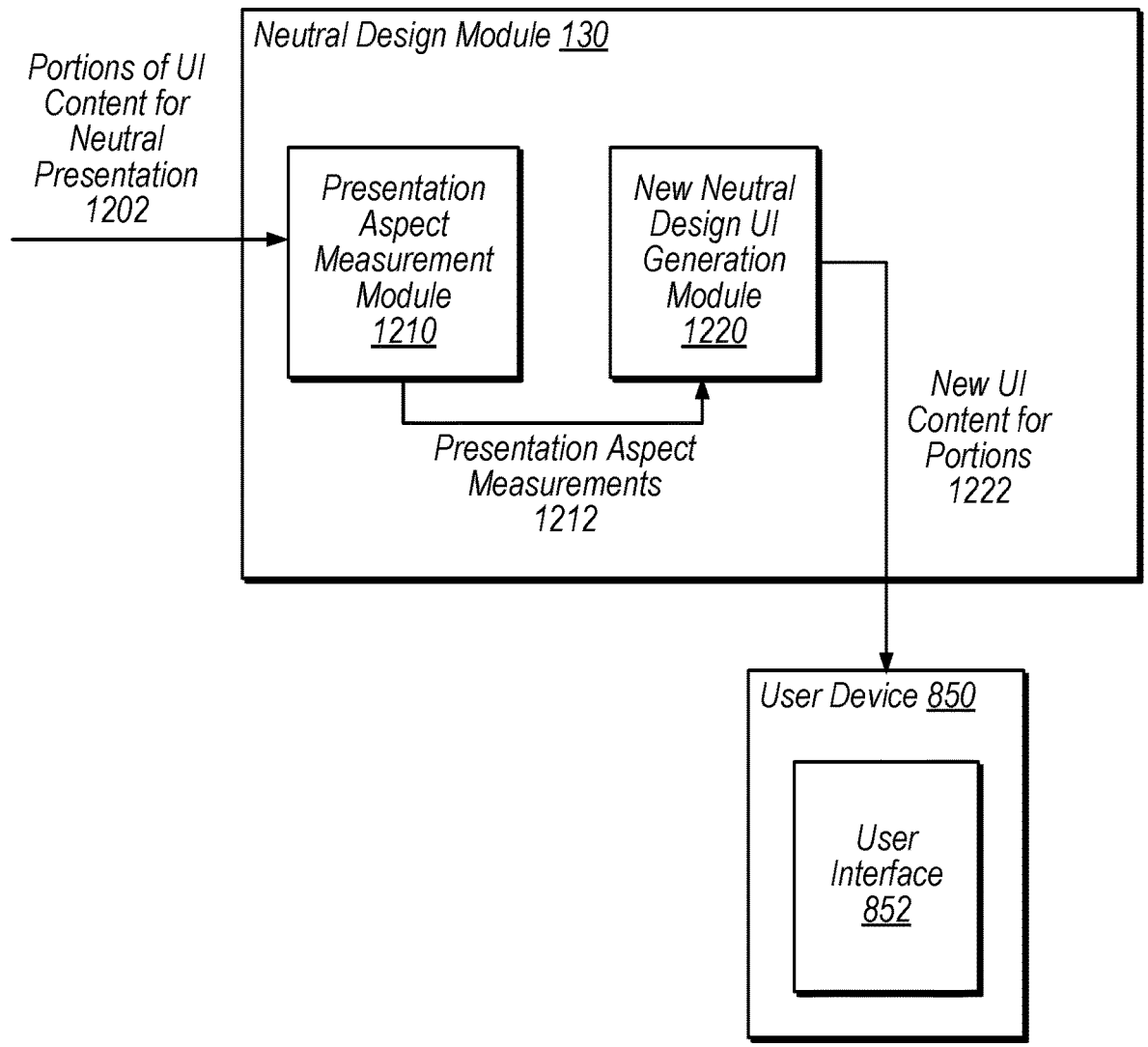
FIG. 12 is a block diagram illustrating an example system configured to measure presentation aspects of portions of a UI identified to be presented neutrally and automatically generate a new UI that reduces differences in the presentation aspects of the identified portions, according to some embodiments.

FIG. 12 is a block diagram illustrating an example system configured to measure presentation aspects of portions of a UI identified to be presented neutrally and automatically generate a new UI that reduces differences in the presentation aspects of the identified portions. In certain embodiments, the portions of the UI identified to be presented neutrally include elements or content in the UI identified to be presented neutrally. In the illustrated embodiment, system 1200 includes a neutral design module 130 and a user device 850. Neutral design module 130 includes presentation aspect measurement module 1210 and new neutral design UI generation module 1220, while user device 850 includes user interface 852.

Neutral design module 130, in the illustrated embodiment, receives portions of UI content for neutral presentation 1202. In some embodiments, portion of UI content for neutral presentation 1202 include elements in the UI that are defined by information specifying UI content for the portions to be rendered as UI elements. The information specifying UI content may include a list of components to be loaded for rendering in the UI, program code of the UI, and a rendered version of the UI. The information specifying UI content may include, for example, a manifest file, JavaScript, CSS, HTML, etc. for the UI portions to be rendered as well as a screenshot of the UI portions.

In certain embodiments, portions of UI content for neutral presentation 1202 includes components or elements of the UI that are identified as being desired to be presented neutrally. In some embodiments, portions of UI content for neutral presentation 1202 include comparable elements of the UI, as described herein. Identification of portions of UI content for neutral presentation 1202 may be implemented by either manual identification or automatic identification. Manual identification may include, for example, a user selecting portions of a UI for neutral presentation by selecting portions on a rendering of the UI (e.g., selecting portions that include comparable elements). As an example, manual methods may include tagging or otherwise demarcating elements in the source code (e.g., HTML, CSS, etc.) or UI definition (e.g., JSON, XML, etc.) as needing neutral presentation. As another example, elements may be marked or selected in a WYSIWYG UI building tool or UI tool.

Automatic identification may include, for example, auditing or scanning UIs already being displayed (such as existing website UIs or existing application UIs) for elements or components in the UIs that are suited for being presented neutrally (such as comparable elements). Automatic identification may also be used during development of new UIs by auditing or scanning renderings of new UIs being tested. Examples of an automatic identification methods include, but are not limited to, identifying similar intent of two elements due to their: structural similarity (e.g., both elements contain an icon and text); similarity of their subtree DOM (Document Object Model) structures (e.g., both elements contain a span followed by a <ul> with two <li> elements); spatial proximity or repetition in the UI (e.g., the elements occupy the cells of a grid); proximity in the DOM tree (e.g., two sibling elements within a <div> (division)); similar element definition in HTML (e.g., both elements are <input type="radio">); their text seems related based on a semantic analysis using NLP (described herein) or another statistical method (e.g., Ok/Cancel or Yes/No commonly appear together); stylistic similarity (e.g., both elements have solid backgrounds with bold text). In certain embodiments, automatic identification methods determine a statistical correlation for identifying similar intent of two elements. For example, a statistical percentage may be determined for how similar the elements are, which may be compared to examples determinations of similar elements.

Examples of portions of UI content for neutral presentation include, but are not limited to, portions of UIs that present legal decisions (such as opt in/opt out or yes/no decisions for agreements), portions of UIs with survey data, portions of UIs with forms or information displays, portions of UIs with news, reports, or analytics, portions of UIs that present facts, or other portions of UIs where a user is presented with comparable elements such as user selectable elements and requested to provide user input. User selectable elements may include, for example, elements that present alternative options where a user is requested to make a choice between the alternative options. In some embodiments, alternative options are identified (using methods described above) as multiple options presented to a user where the user is requested to make a choice or selection between one or more of the multiple options presented to the user (e.g., a singular choice or a choice of a number less than all the presented options). In some embodiments, alternative options include binary decisions for which user selected is requested. In some embodiments, alternative options include factual information for which a reduction in bias is desired. In these examples, it may be advantageous to reduce differences in presentation aspects of UI elements (e.g., present the UI elements neutrally) in the portions of the UI to avoid guiding or misleading a user towards a particular selection or decision.

Example Portions of UI for Neutral Presentation

FIGS. 13-15 depict examples of portions of UIs that may be identified for neutral presentation. The examples in FIGS. 13-15 may be identified as being desired for neutral presentation based on emphasis of choices in the examples that may influence a user's selected or decisions regarding the choices. FIG. 13 depicts an example of rendering of UI 1300 with identified portions of UI 1302. Identified portions of UI 1302 may be, for example, a legal document. The legal document may be identified for more neutral presentation as the legal document includes "small text with long lines", a dominant comparable element (e.g., "SIGN" is dominant over "Cancel"), and the bottom panel "slides in", which has motion that may draw attention of the user. An element (e.g., "SIGN") may be dominant when the element is presented in an elevated or emphasized manner relative to another element. For example, in the illustrated embodiment, "SIGN" is presented with additional elements (such as the starburst outline and all capital letters) that elevate its position compared to the "Cancel" element. Other examples of element dominance include, but are not limited, positional dominance (e.g., an element is in an elevated vertical position relative to another element, font dominance (e.g., larger font size or more noticeable font for an element), color dominance (e.g., a color that draws more attention than another color), or other visual aspects that can emphasize dominance.

FIG. 14 depicts an example of rendering of UI 1400 with identified portions of UI 1402. Identified portions of UI 1402 may be, for example, a privacy consent with button "x" being an ambiguous element and the portion having overall ambiguity on actions the user may take. FIG. 15 depicts an example of rendering of UI 1500 with identified portions of UI 1502. Identified portions of UI 1502 may be, for example, a survey asking the question "How Do You Feel?" with a plurality of answers to choose from (e.g., "Great!", "Good", "OK", "So-So", and "Bad") by selection of the corresponding circle button. In identified portions of UI

1502, the selections are presented as comparable elements in a vertical layout, which may provide emphasis to the first choice in the layout (e.g., the top choice of "Great!" is the dominant element). Additionally, identified portions of UI 1502 includes a floating panel that causes the last two choices to be hidden from view and gives the last two choices lower priority. The elements of identified portions of UI 1302, 1402, and 1502, shown in FIGS. 13-15, may be neutralized (e.g., have their differences reduced) according to embodiments described herein (see, e.g., the examples depicted in FIGS. 18-20).

Example Design Neutralization (Continued)

Turning back to FIG. 12, in the illustrated embodiment, neutral design module 130 provides the portions of UI content for neutral presentation 1202 to presentation aspect measurement module 1210. Presentation aspects that may be measured by presentation aspect measurement module 1210 include, but are not limited to, visual aspects, clarity aspects, and tonal aspects. Examples of visual aspects, clarity aspects, and tonal aspects are described herein.

In the illustrated embodiment, presentation aspect measurement module 1210 provides presentation aspect measurements 1212 to new neutral design UI generation module 1220. New neutral design UI generation module 1220 may generate new UI content for portions 1222. New UI content for portions 1222 may include new UI content that reduces differences in one or more presentation aspects in the portions of UI content for neutral presentation 1202. Reducing the differences may include, for example, reducing or neutralizing differences in the presentation aspects such that the portions of UI content are presented more neutrally when rendered for a user. In one specific example, differences in visual prominence weight may be reduced between two different elements in a portion of UI content that presents a binary choice for a user between the two elements. Reducing the differences in visual prominence weight between the two elements may present the elements more neutrally, which reduces bias or influence on the binary choice being made by the user.

In certain embodiments, new neutral design UI generation module 1220 generates new information specifying content for the portions of the UI (e.g., new HTML or CSS code for rendering the portions of the UI) for inclusion in new UI content for portions 1222. In such embodiments, new UI content for portions 1222 may be output from neutral design module 130 for implementation in generating a rendering of a new UI that includes the reduced differences in presentation aspects in the portions of the UI for a more neutral presentation of the portions of the UI. For example, new UI content for portions 1222 may be provided to user device 850 for rendering of UI 852 where UI 852 includes the reduced differences in presentation aspects in the portions of the UI.

Example Presentation Aspect Measurement Module

Figure 16:
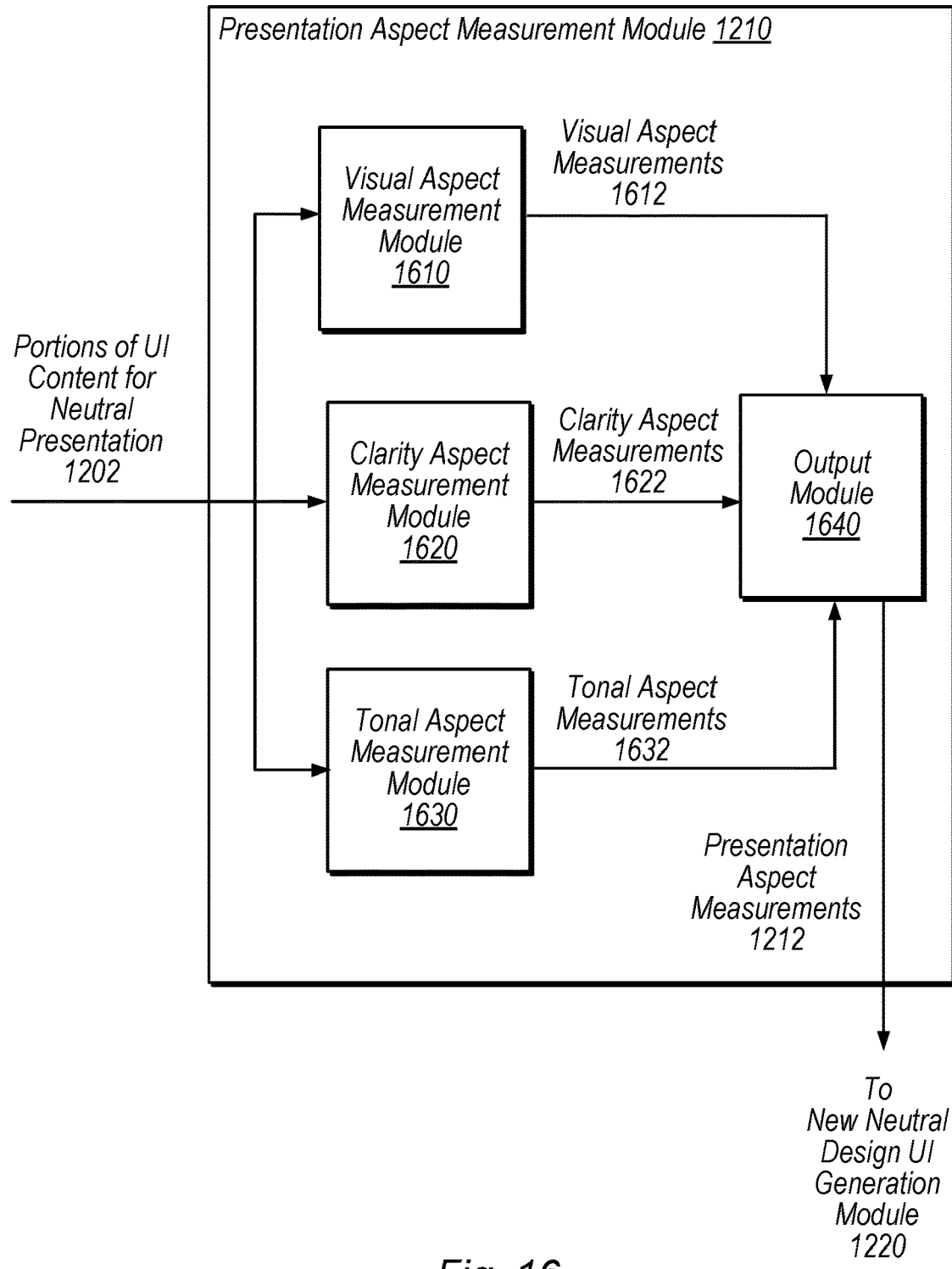
FIG. 16 is a block diagram illustrating an example presentation aspect measurement module, according to some embodiments.

FIG. 16 is a block diagram illustrating an example presentation aspect measurement module 1210. In the illustrated embodiment, system 1600 includes example presentation aspect measurement module 1210, which includes visual aspect measurement module 1610, clarity aspect measurement module 1620, and tonal aspect measurement module 1630. In certain embodiments, within presentation aspect measurement module 1210, portions of UI content for neutral presentation 1202 may be provided to each of visual aspect measurement module 1610, clarity aspect measurement module 1620, and tonal aspect measurement module 1630 for measurement of visual aspects, clarity aspects, and tonal aspects, respectively, of the received portions of UI content.

In the illustrated embodiment, visual aspect measurement module 1610 measures visual aspect measurements 1612 of portions of UI content 1202. In some embodiments, visual aspect measurements 1612 include, but are not limited to, visual prominence aspect measurements. Visual prominence aspect measurements may include, but not be limited to, aspects related to fonts used in the plurality of portions, aspects related to colors used in the plurality of portions, aspects related to spacing in the plurality of portions, aspects related to size and position of elements in the plurality of portions, aspects related to backgrounds of elements in the plurality of portions, aspects related to borders of elements in the plurality of portions, aspects related to layout position of elements in the plurality of portions, and aspects related to motion effects in the plurality of portions. Examples of visual prominence aspect measurements related to fonts include, but are not limited to, font size, font color/contrast, font weight, font decoration, font capitalization, and font family. Other examples of visual aspect measurements 1612 include, but are not limited to, measurements of background color, border, shadows, border-radius, spacing in and around text, bounding region size, animation or motion effects, layout position, areas of attention, visual hierarchy, and visual grouping (it should be noted that some of these examples may overlap with other examples provided).

In some embodiments, visual aspect measurement module 1610 directly measures portions of UI content 1202 to determine visual aspect measurements 1612. For example, visual aspect measurement module 1610 may apply direct measurement methods to portions of UI content 1202 to determine visual aspect measurements 1612. In certain embodiments, visual aspect measurement module 1610 applies machine learning algorithms to portions of UI content 1202 to determine visual aspect measurements 1612. For example, visual aspect measurement module 1610 may apply computer vision algorithms or other image-based learning algorithms to determine visual aspect measurements 1612.

In the illustrated embodiment, clarity aspect measurement module 1620 measures clarity aspect measurements 1622 of portions of UI content 1202. In some embodiments, clarity aspect measurements 1622 include, but are not limited to, measurements of the clarity of text and writing in portions of UI content 1202. For example, clarity aspects may include aspects such as length of statements, wordiness of statements, ambiguity, grammatical issues, and other word content-related aspects. Examples of ambiguity include ambiguous pronouns, ambiguous decisions. Another clarity aspect may be, for example, how much legal language is included in portions of UI content 1202 as too much legal language may be confusing to a typical user that is not trained in legal language.

In some embodiments, clarity aspect measurement module 1620 directly measures portions of UI content 1202 to determine clarity aspect measurements 1622. For example, clarity aspect measurement module 1620 may apply direct measurement methods, such as word processing-type applications, to portions of UI content 1202 to determine clarity aspect measurements 1622. In certain embodiments, clarity aspect measurement module 1620 applies machine learning algorithms to portions of UI content 1202 to determine clarity aspect measurements 1622. For example, clarity aspect measurement module 1620 may apply computer vision algorithms or other image-based learning algorithms to determine clarity aspect measurements 1622. In some embodiments, location determination module 140 (described herein) may be implemented to determine clarity aspects. For example, location determination module 140 may determine alignment of elements and where elements have less alignment, the elements may be measured to have less clarity between the elements. In some embodiments, a computer vision algorithm may implement an entropy model and the entropy measure may be used to determine clarity aspect measurements. In some embodiments, clarity aspect measurement module 1620 may implement clarity measurement algorithms based on metrics such as, but not limited to, amount of text per visible area of the screen (e.g., density), relative text hierarchy (e.g., greater differences between largest and smallest text is more clear), and number of elements in a visible area (e.g., more small elements is less clear). One specific example of an algorithm that may be used to determine clarity aspect measurements is WordRake® (WordRake, LLC).

In the illustrated embodiment, tonal aspect measurement module 1630 measures tonal aspect measurements 1632 of portions of UI content 1202. In some embodiments, tonal aspect measurements 1632 include, but are not limited to, subjective, emotional, or sentimental tone aspects of images, text, or shapes in portions of UI content 1202. For example, tonal aspects may include measurement of engagement of a user based on subjective, emotional, or sentimental content in portions of UI content 1202. The measurement may include a metric or weight of subjective, emotional, or sentimental response elicited by content in portions of UI content 1202.

In certain embodiments, tonal aspect measurement module 1630 applies machine learning algorithms to portions of UI content 1202 to determine tonal aspect measurements 1632. For example, tonal aspect measurement module 1630 may apply emotional recognition algorithms or NLP (natural language processing) algorithms to determine tonal aspect measurements 1632. In some embodiments, tonal aspect measurement module 1630 directly measures portions of UI content 1202 to determine tonal aspect measurements 1632. For example, tonal aspect measurement module 1630 may receive input from a user regarding their tonal response to portions of UI content 1202. In one embodiment, facial recognition algorithms may be used to measure tonal response of the user. For example, facial recognition algorithms may be utilized in a controlled setting (such as a lab setting) to assess user feedback during presentation of UI renderings. Other feedbacks systems (e.g., direct user input) may also be used in similar controlled settings.

In the illustrated embodiments, visual aspect measurements 1612, clarity aspect measurements 1622, and tonal aspect measurements 1632 are provided to output module 1640. Output module 1640 may combine the received aspect measurements and output presentation aspect measurements 1212 from presentation aspect measurement module 1210. In certain embodiments, presentation aspect measurements 1212 are provided to new neutral design UI generation module 1220, as shown in FIG. 12.

Example Presentation Aspect Measurement Module

Figure 17:
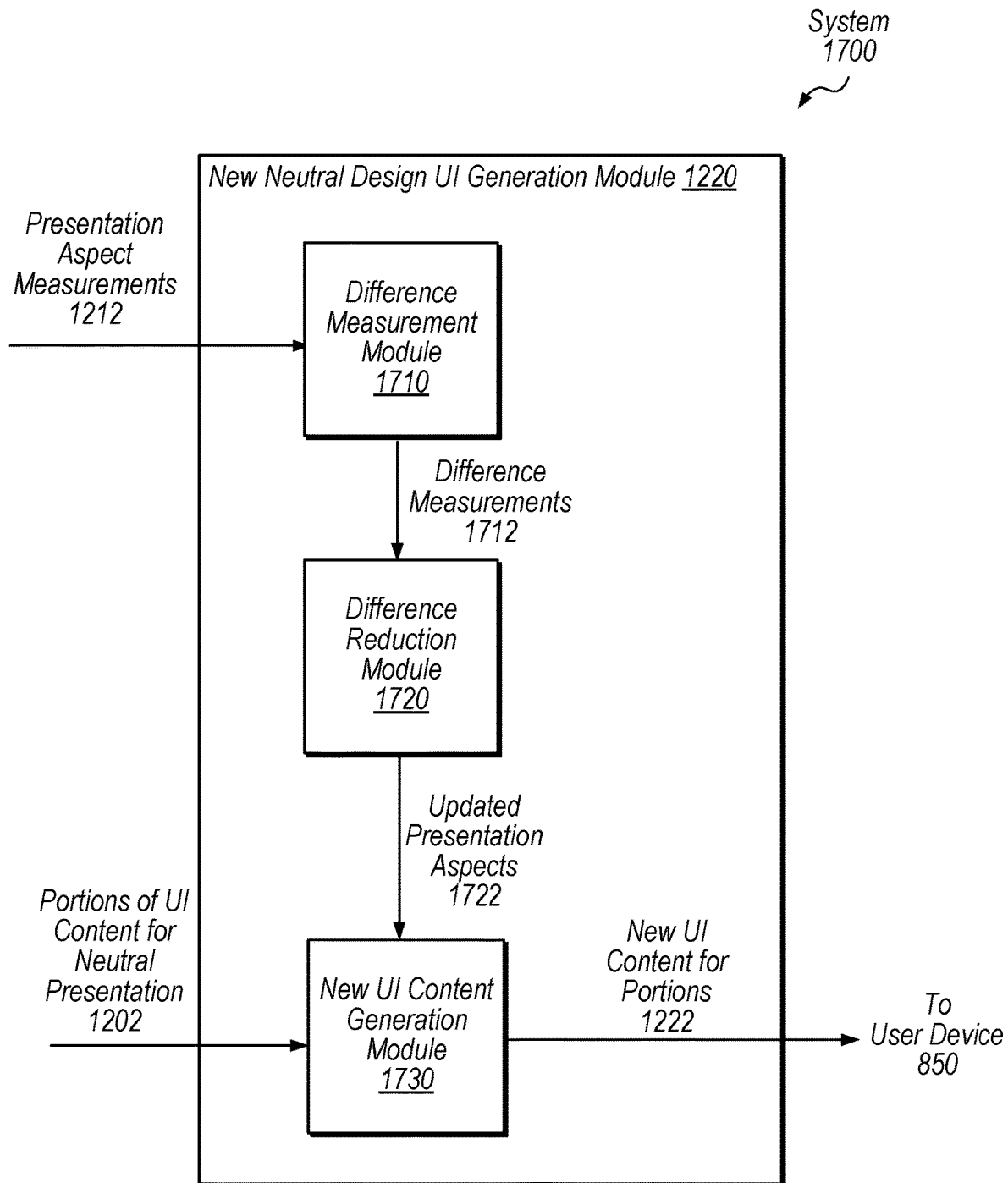
FIG. 17 is a block diagram illustrating an example new UI generation module, according to some embodiments.

FIG. 17 is a block diagram illustrating an example new neutral design UI generation module 1220. In the illustrated embodiment, system 1700 includes example new neutral design UI generation module 1220, which includes difference measurement module 1710, difference reduction module 1720, and new UI content generation module 1730. In certain embodiments, within new neutral design UI generation module 1220, presentation aspect measurements 1212 are received in difference measurement module 1710.

In the illustrated embodiment, difference measurement module 1710 determines difference measurements 1712 based on presentation aspect measurements 1212. Difference measurements 1712 may be measurements of differences in presentation aspects of portions of UI content 1202 based on presentation aspect measurements 1212.

In certain embodiments, difference measurements 1712 include a measurement of neutrality presentation based on presentation aspect measurements 1212. The measurement of neutrality presentation may be, for example, a neutrality score. In certain embodiments, the neutrality score is a measurement of the differences in presentation aspects between related elements (e.g., alternative options for which user input is requested) where the closer the differences are to zero, the lower the neutrality score is (e.g., zero differences gives a neutrality score of zero). In some embodiments, the neutrality score may include measurement of the differences in multiple presentation aspects for portions of UI content 1202.

In some embodiments, different presentation aspect measurements may have different weights in determining neutrality presentation or a neutrality score for portions of UI content 1202. For example, different weights may be given to visual aspect measurements and clarity aspect measurements. As another example, different weights may be given to individual visual aspect measurements (e.g., position of elements is given more weight than font size).

In the illustrated embodiments, difference reduction module 1720 receives difference measurements 1712 from difference measurement module 1710. Difference reduction module 1720 may reduce differences in presentation aspects based on difference measurements 1712. In certain embodiments, difference reduction module 1720 reduces the differences in presentation aspects to generate a more neutral presentation of the portions of UI content 1202. For example, difference reduction module 1720 may reduce the differences in one or more presentation aspects to attempt to reduce the neutrality score for the presentation aspects to as close to zero as possible.

In some embodiments, difference reduction module 1720 reduces the differences in selected presentation aspects. For example, difference reduction module 1720 may reduce the differences in one or only a few selected presentation aspects. Selection of presentation aspects for reduction may be automatic (e.g., based on weights of presentation aspects) or be manual (e.g., determined by a user or operator). In some embodiments, difference reduction module 1720 reduces the differences in as many presentation aspects as possible. For example, difference reduction module 1720 reduces the differences all presentation aspects that have reducible differences.

Difference reduction module 1720 may implement various methods for reducing the differences in presentation aspects. One example is difference reduction module 1720 may implement randomization methods for reducing the differences in presentation aspects. In one such embodiment, difference reduction module 1720 identifies areas where randomization is needed and randomizes the visual, clarity, or tonal aspects of elements in the identified areas. For example, difference reduction module 1720 may identify and randomize a list of items in a survey to prevent any item from being biased in its position. In some embodiments, randomization may be implemented in the rendering of the UI based on the reduction in differences (described herein). For example, the list of items may be randomized between different renderings of the UI (such as randomizing for different users taking a survey) so that there is no bias for selecting any of the items. Other methods of randomization may also be contemplated.

An additional example of a method for reducing differences in presentation aspects includes formatting text or images for accessibility or ease of reading. In this example, difference reduction module 1720 may reduce the use of color to communicate different options or elements or reduce line lengths for faster reading. Yet another example of a method for reducing differences in presentation aspects includes a method for presenting alternative options neutrally. In this example, difference reduction module 1720 may make the alternative options with similar styling, make the alternative options as close to equal size as possible, make the background colors and font styling identical for the alternative options, or position the alternative options side by side and in random order. In some instances, spacing between the alternative options may be controlled to reduce the likelihood of the wrong alternative option being accidentally selected by a user (e.g., a minimum space is provided between the alternative options). Other methods for reducing differences in presentation aspects may also be contemplated based on the presentation aspects described herein.

In the illustrated embodiment, difference reduction module 1720, after reducing the differences in presentation aspects to desired or selected levels, provides updated presentation aspects 1722 to new UI content generation module 1730. New UI content generation module 1730 may determine new UI content portions 1222 based on receiving updated presentation aspects 1722 along with portions of UI content for neutral presentation 1202. In certain embodiments, new UI content portions 1222 includes new information specifying content of the UI for rendering the new UI content for the portions for which neutral presentation is desired (e.g., new HTML or CSS code for rendering the new UI content). Methods for generating new UI content portions 1222 may include methods for generating new UI content as described herein. New UI content for portions 1222 may be provided to user device 850, as shown in FIG. 12, to render the new UI in UI 852 on the user device.

Alternative Example of Presentation Aspect Measurement Module

Figure 18:
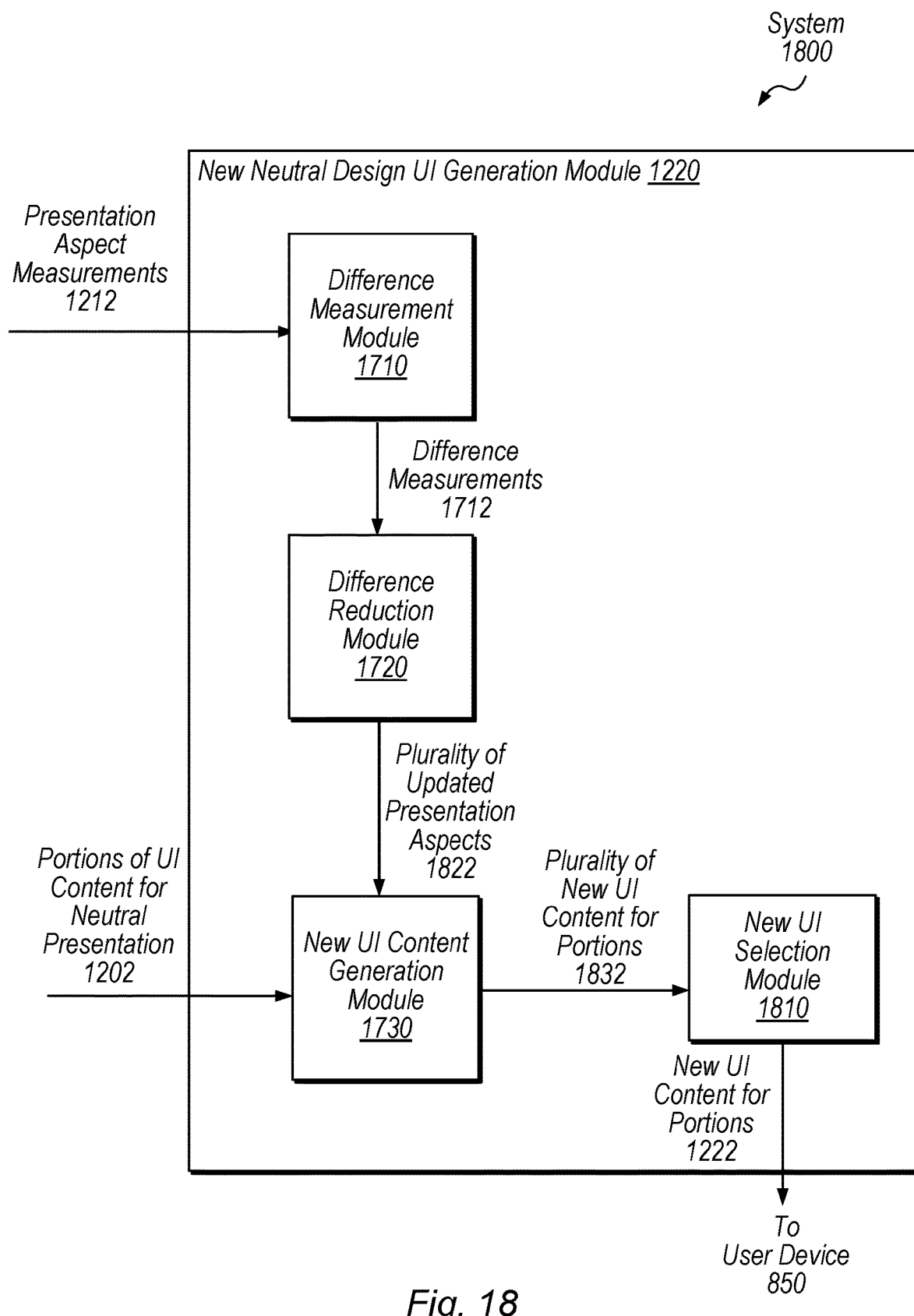
FIG. 18 is a block diagram illustrating an alternative example new UI generation module.

FIG. 18 is a block diagram illustrating an alternative example new neutral design UI generation module 1220. In the illustrated embodiment, system 1800 includes example new neutral design UI generation module 1220, which includes difference measurement module 1710, difference reduction module 1720, and new UI content generation module 1730, which operate similarly to the embodiments described above for the example new neutral design UI generation module 1220 depicted in FIG. 17. In the illustrated embodiment of FIG. 18, new neutral design UI generation module 1220 also includes new UI selection module 1810.

In the illustrated embodiment of FIG. 18, difference reduction module 1720 may generate a plurality of updated presentation aspects 1822 rather than a single version of updated presentation aspects as described in the example of FIG. 17. Each of the plurality of updated presentation aspects 1822 may include information that reduces differences in one or more presentation aspects for the portions of UI content 1202. Each of the plurality of updated presentation aspects 1822 may, however, in some embodiments, include different reductions in differences in one or more of the presentation aspects for portions of UI content 1202.

The plurality of updated presentation aspects 1822 may be provided to new UI content generation module 1730, which may generate a plurality of new UI content for portions 1832 based on the plurality of updated presentation aspects 1822 and portions of UI content for neutral presentation 1202. Each of the plurality of new UI content for portions 1832 includes content that renders a new UI with different reductions in presentation aspects based on the plurality of updated presentation aspects 1822. In some embodiments, each of the plurality of new UI content for portions 1832 are proposed new UI content for the portions.

In the illustrated embodiment, the plurality of new UI content for portions 1832 is provided to new UI selection module 1810. New UI selection module 1810 may assess the plurality of new UI content for portions 1832 to determine a selected new UI content for the portions for output as new UI content for portions 1222. In certain embodiments, new UI selection module 1810 selects the new UI content from the plurality of new UI content for portions 1832 that provides a desired neutrality presentation (e.g., the proposed new UI content that provides the desired neutrality presentation). In some embodiments, selecting the new UI content from the plurality of new UI content for portions 1832 that provides the desired neutrality presentation includes selecting the new UI content that has the best neutrality score. In such embodiments, new UI selection module 1810 may determine neutrality scores (as described herein) for each of the plurality of new UI content for portions 1832 and then select the new UI content with the best (e.g., lowest) neutrality score. New UI selection module 1810 may output the selected new UI content as new UI content for portions 1222, which may be provided to user device 850, as shown in FIG. 12, to render the new UI in UI 852 on the user device.

Example New UI Renderings After Reducing Differences in Presentation Aspects

FIGS. 19-21 depict examples of portions of new UIs that may be rendered after reducing differences in presentation aspects for the examples depicted in FIGS. 13-15, respectively. FIG. 19 depicts an example of rendering of new UI 1900 with portions of new UI with reduced differences 1902 compared to the example depicted in FIG. 13. As shown in FIG. 19, portions of new UI with reduced differences 1902 are presented more neutrally by having "readable text with shorter lines", no motion in the bottom panel, and grouped elements "SIGN" and "CANCEL" are presented as comparable elements with any dominance in the elements having been reduced. For example, the dominance in visual prominence of "SIGN" in FIG. 13 has been reduced in FIG. 19.

FIG. 20 depicts an example of rendering of new UI 2000 with portions of new UI with reduced differences 2002 compared to the example depicted in FIG. 14. As shown in FIG. 20, portions of new UI with reduced differences 2002 may be more neutrally presented with actual choices (not ambiguous choices) presented with clear buttons. In some embodiments, the buttons may be presented in a random order for more neutral decisions between users. FIG. 21 depicts an example of rendering of new UI 2100 with portions of new UI with reduced differences 2102 compared to the example depicted in FIG. 15. As shown in FIG. 21, portions of new UI with reduced differences 2102 may be more neutrally presented by presenting the alternative options (e.g., the comparable elements) visibly together in the same panel and on equal footing vertically.

Example Methods

Turning now to FIG. 22, a flow diagram illustrates a method 2200 for measuring presentation aspects of portions of a UI identified to be presented neutrally and automatically generating a new UI that reduces differences in the presentation aspects of the identified portions, according to some embodiments. The method shown in FIG. 22 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 2210, in the illustrated embodiment, a computer system receives information specifying a plurality of portions of a current user interface (UI) for which a neutral presentation is desired. In some embodiments, the plurality of portions includes elements (e.g., comparable elements) of the current UI for which a neutral presentation is desired.

At 2220, the computer system measures at least one presentation aspect for each of the plurality of portions. In certain embodiments, the at least one presentation aspect includes at least one of the following types of aspects: a visual aspect, a clarity aspect, and a tonal aspect. In some embodiments, measuring the at least one presentation aspect includes measuring visual prominence of comparable elements in the plurality of portions. In some embodiments, measuring the at least one presentation aspect includes measuring a clarity of text and writing in the plurality of portions using at least one machine learning algorithm. In some embodiments, measuring the at least one presentation aspect includes measuring emotional tone of content in the plurality of portions using an emotional recognition algorithm or a natural language processing algorithm.

In some embodiments, the plurality of portions includes a particular portion that requests user input between a plurality of selectable elements where measuring the at least one presentation aspect includes measuring the at least one presentation aspect for each of the plurality of selectable elements within the particular portion and generating the new UI includes generating a new UI portion to replace the particular portion within the new UI where the new UI portion has a more neutral presentation of the plurality of selectable elements than the particular portion in the current UI relative to the at least one presentation aspect. In some embodiments, measuring the at least one presentation aspect for each of the plurality of selectable elements within the particular portion includes measuring visual prominence between each of the plurality of selectable elements. In some embodiments, generating the new UI portion that has the more neutral presentation includes comparing the measured visual prominence of each of the plurality of selectable elements, and reducing differences in the visual prominence between each of the plurality of selectable elements.

At 2230, the computer system generates a new UI that reduces differences in the at least one presentation aspect for the plurality of portions. In some embodiments, the computer system generates information specifying content of the new UI based on the reduced differences in the at least one presentation aspect for the plurality of portions.

In some embodiments, a computer system receives information specifying a plurality of user selectable elements of a current user interface (UI) for which a neutral presentation is desired where the user selectable elements include alternative options for which user input is requested. The computer system may measure at least one presentation aspect for each of the user selectable elements and the computer system may generate a new UI that reduces differences in the at least one presentation aspect for the plurality of user selectable elements.

In some embodiments, the alternative options for which user input is requested include multiple options presented to a user where the user is requested to make a selection between one or more of the multiple options presented to the user. In some embodiments, the user selectable elements for which the neutral presentation is desired include a plurality of user selectable elements where at least one user selectable option has been determined to have at least some dominance in visual prominence over at least one other user selectable option. In some embodiments, generating the new UI includes reducing the dominance in visual prominence of the at least one user selectable option relative to the at least one other user selectable option.

In some embodiments, a computer system receives information specifying a plurality of portions of a current user interface (UI) for a which a neutral presentation of visual prominence is desired. The computer system may measure at least one visual prominence aspect for each of the plurality of portions and generate a new UI that reduces differences in the at least one visual prominence aspect for the plurality of portions.

In some embodiments, generating the new UI includes generating a plurality of proposed new UIs where each of the proposed new UIs reduces differences in the at least one visual prominence aspect for the plurality of portions and selecting as the new UI the proposed new UI in the plurality of proposed new UIs that has a desired neutrality presentation.

In some embodiments, the computer system measures a neutrality score for each of the plurality of proposed new UIs where selecting the proposed new UI that has the desired neutrality presentation includes selecting the proposed new UI with the best neutrality score. In some embodiments, measuring the neutrality score for each of the proposed new UIs includes measuring differences in a plurality of presentation aspects for each of the plurality of portions in each of the proposed new UIs. In some embodiments, measuring the at least one visual prominence aspect for each of the plurality of portions includes measuring differences in a plurality of visual prominence aspects for each of the plurality of portions where at least two of the visual prominence aspects have different weights.

In some embodiments, at least one visual prominence aspect includes at least one of the following types of aspects: aspects related to fonts used in the plurality of portions, aspects related to colors used in the plurality of portions, aspects related to spacing in the plurality of portions, aspects related to size and position of elements in the plurality of portions, aspects related to backgrounds of elements in the plurality of portions, aspects related to borders of elements in the plurality of portions, aspects related to layout position of elements in the plurality of portions, and aspects related to motion effects in the plurality of portions.

While the embodiments in FIGS. 12-22 related to neutral design module 130 are described above in the context of generating a more neutral presentation of content or elements in a UI, embodiments may also be contemplated in which neutral design module 130 is implemented to reduce neutral presentation of content or elements in a UI. Reducing the neutral presentation of content or elements in a UI may include, for example, increasing differences in presentation aspects (such as visual, clarity, or tonal aspects) between comparable elements in the UI. Neutral design module 130 may be configured to reduce neutral presentation of content or elements in a UI by reversing the metrics input into the neutral design module to generate UIs that emphasize or bias users towards particular choices. As an example, the examples of more neutral presentation of elements in FIGS. 19-21 may be input with reverse metrics into neutral design module 130 to generate the examples depicts in FIGS. 13-15 that have more biased presentations between the elements.

Example Locating Elements

Figure 23:
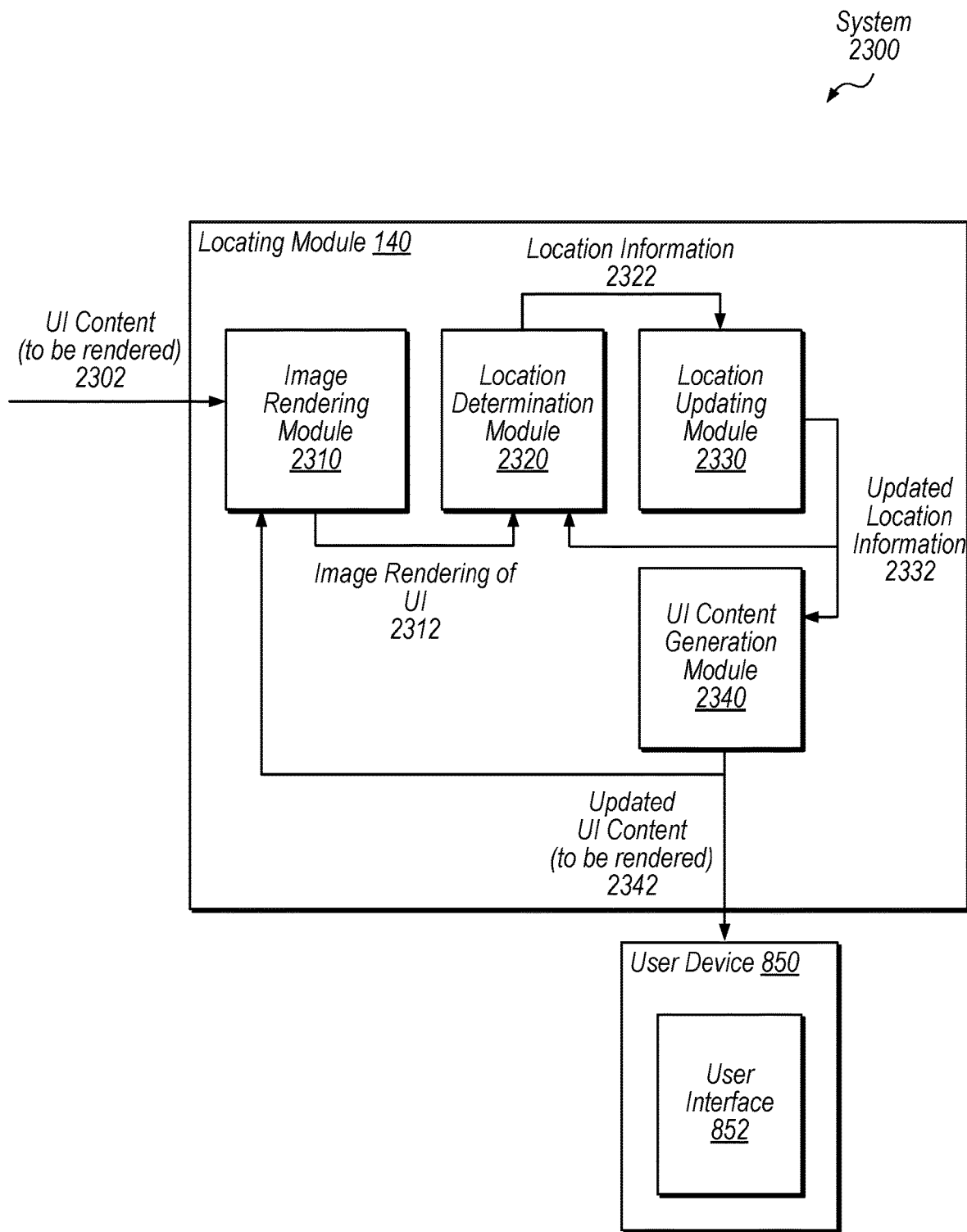
FIG. 23 is a block diagram illustrating an example system configured to automatically locating elements and updating locations of the elements for UI content to be rendered.

FIG. 23 is a block diagram illustrating an example system configured to automatically locating elements and updating locations of the elements for UI content to be rendered. In the illustrated embodiment, system 2300 includes a locating module 140 and a user device 850. Locating module 140 includes an image rendering module 2310, a location determination module 2320, a location updating module 2330, and a UI content generation module 2340, while user device 850 includes a user interface 852.

Locating module 140, in the illustrated embodiment, receives information specifying UI content 2302 for a user interface to be rendered (e.g., by user device 850 via UI 852). In some embodiments, the received information includes a list of components to be loaded for rendering in the UI, program code of the UI, and a rendered version of the UI. For example, the information specifying UI content 2302 may include a manifest file, JavaScript, CSS, HTML, etc. for the UI to be rendered as well as a screenshot of the UI.

In the illustrated embodiment, locating module 140 provides the information specifying the UI content 2302 to image rendering module 2310. In certain embodiments, image rendering module 2310 generates image rendering of UI 2312 based on UI content 2302. Image rendering of UI 2312 may be, for example, a rendering of UI 852 that would be displayed on user device 850 based on UI content 2302 (see, e.g., FIG. 24A, described below). In some embodiments, the image rendering of the UI 2312 is an image capture or screenshot of example user interface 200 and its content, shown in FIG. 2. The format for the image rendering of the UI 2312 may include any of various image file formats (e.g., JPEG, TIFF, PNG, etc.). In certain embodiments, the image rendering of the UI 2312 includes a rendering of substantially the entire UI (e.g., a rendering of the full UI that would be seen on user device 850). In some embodiments, the image rendering of the UI 2312 includes a rendering of a portion of the UI. For example, portions of the UI for rendering may be manually selected or automatically selected based on content for analysis in the UI (such as selection of content where alignment of elements is desired).

In the illustrated embodiment, image rendering module 2310 provides the image rendering of UI 2312 to location determination module 2320. Location determination module 2320 may implement a machine learning algorithm (e.g., a computer vision algorithm) to determine the locations of elements in the image rendering of the UI 2312. In certain embodiments, location determination module 2320 determines locations of child elements in the image rendering of the UI 2312. Location determine module 2320 may provide location information 2322 to location updating module 2330. In some embodiments, location information 2322 includes identifying information of the child elements for which locations have been determined. Identifying information may include, for example, labels for images (including content of images), text identification, or shape identification. The identifying information may be determined by the machine learning algorithm that determines the locations of the child elements or another machine learning algorithm.

Location updating module 2330 may update the locations of one or more of the child elements for which locations are provided in location information 2322. In certain embodiments, updating the locations of the child elements includes placing or positioning the child elements in selected locations relative to one another in the image rendering of the UI 2312. For example, updating the locations of two child elements may include changing the locations of one or both child elements until the child elements are in a selected or desired alignment in the image rendering of the UI 2312.

In some embodiments, location updating module 2330 may provide the updated locations to location determination module 2320, which then determines whether the child elements are in the selected locations relative to each other in the updated rendering. In this example, the location updating process may repeat with location updating module 2330 iteratively updating the locations until location determination module 2320 determines that the child elements are in the selected locations relative to each other, at which point location updating module 2330 may output the updated location information 2332 to UI content generation module 2340.

The updated location information determined by location updating module 2330 may be output as updated location information 2332, which is provided to UI content generation module 2340, as shown in FIG. 23. UI content generation module 2340 may generate updated UI content 2342, which is based on updated location information 2332, for rendering as UI 852 on user device 850. In certain embodiments, UI content generation module 2340 may provide updated UI content 2342 to image rendering module 2310. For example, UI content generation module 2340 may provide updated UI content 2342 to image rendering module 2310 for iterative updating of the locations of child elements. In this example, location updating module 2330 updates the locations of the child elements and UI content generation module 2340 provides the updated UI content 2342 to image rendering module 2310, which generates an updated image rendering of the UI 2312 based on the updated locations. Location determination module 2320 may then determine whether the child elements are in the selected locations relative to each other in the updated rendering. In this example, the location updating process may repeat with location updating module 2330 iteratively updating the locations until location determination module 2320 determines that the child elements are in the selected locations relative to each other in an updated image rendering, at which point locating module 140 may output the updated UI content 2342 (e.g., to user device 850 for rendering as UI 852).

Example Rendered Image of UI

Figure 24A:
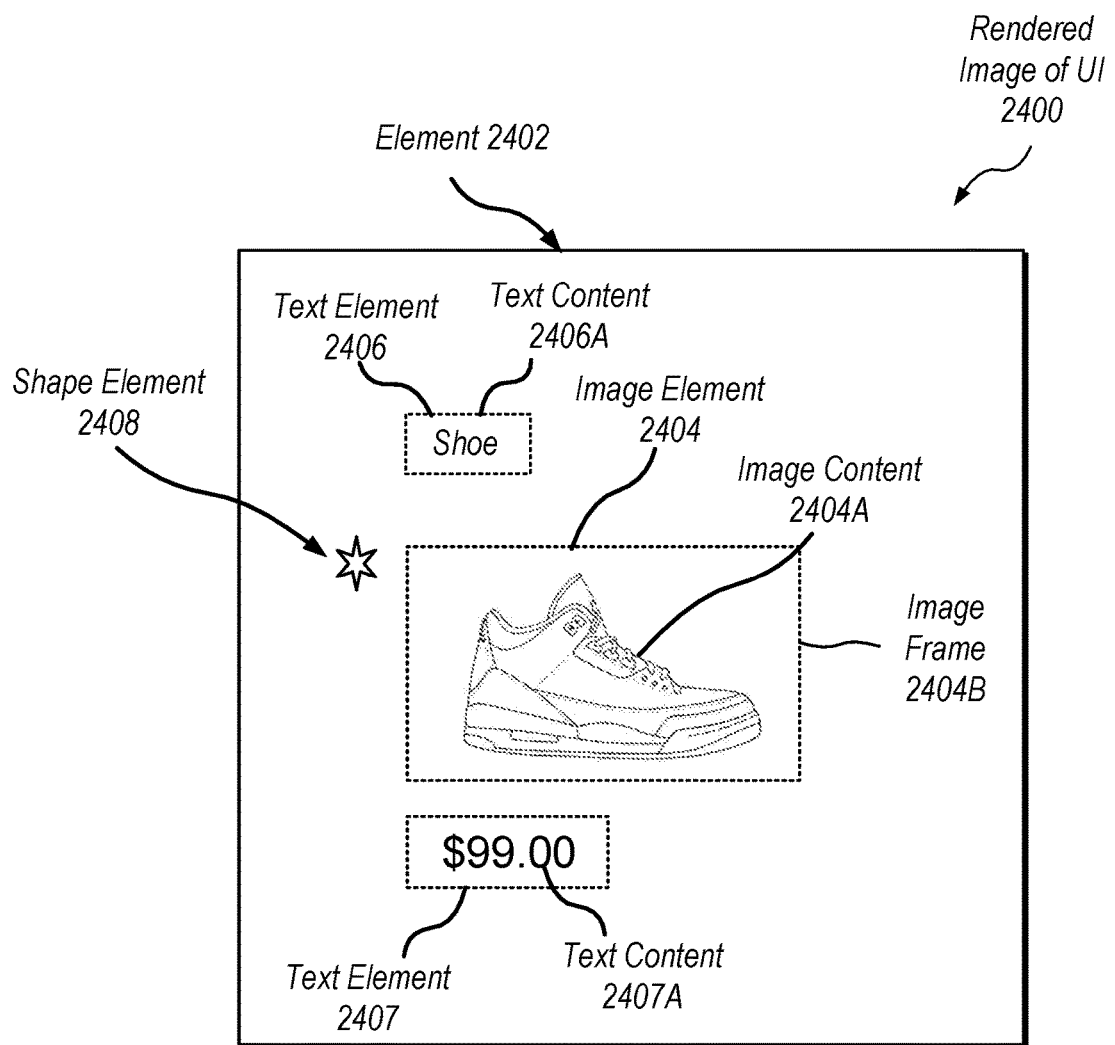
FIG. 24A is a block diagram illustrating an example of a rendered image of a UI.

FIG. 24A is a block diagram illustrating an example of a rendered image of UI 2400. In the illustrated embodiment, the rendered image of UI 2400 includes various different components with rendered UI content. As described above, the rendered image of UI 2400 may include a rendering of substantially the entire UI or a rendering of a portion of the UI. In the illustrated embodiment, rendered image of UI 2400 is an image showing a portion of UI content rendered including a rendering of element 2402.

In certain embodiments, element 2402 is a parent element to one or more child elements. Child elements may be elements positioned within the outer boundary of element 2402. In the illustrated embodiment, image element 2404, text element 2406, text element 2407, and shape element 2408 are child elements of element 2402. In some embodiments, the child elements include related content within the parent element. For example, in one embodiment, element 2402 is a product tile for an online shoe store that includes an image of the product (e.g., image element 2404 includes an image of a shoe (image content 2404A)) and text describing the product (e.g., text element 2406 includes text content 2406A providing a description of the shoe, "Shoe", and text element 2407 includes text content 2407A providing a price of the shoe, "$99.00"). Additional elements may also be included in element 2402 (e.g., shape element 2408 is a shape that appears in the product tile).

In the illustrated embodiment shown in FIG. 24A, one or more child elements (e.g., image element 2404, text element 2406, or text element 2407) have bounding regions (dashed lines) with the content of the elements (e.g., image content 2404A, text content 2406A, or text content 2407A) positioned within the bounding regions. The size and position of the bounding regions in the rendered image of UI 2400 is defined by information specifying the UI content (e.g., information specifying UI content 2302, shown in FIG. 23), which is used to generate the rendered image of UI 2400.

Figure 24B:
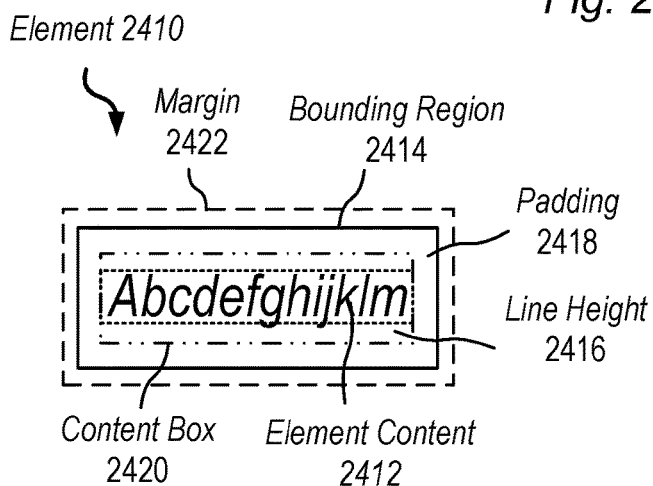
FIG. 24B is a block diagram illustrating an example of an element defined by information specifying the UI content.

FIG. 24B is a block diagram illustrating an example of element 2410 defined by information specifying the UI content. In the illustrated embodiment, element content 2412 is positioned inside bounding region 2414, which defines the outer boundary of element 2410. As described above, the size and position of bounding region 2414 may be defined by information specifying the UI content. The actual position of element content 2412 inside bounding region 2414 may be determined by dimensions for a combination of different attributes inside the bounding region. Attributes may include, for example, line height 2416 and padding 2418. Line height 2416 may define the height between element content 2412 and content box 2420. It should be noted that, in some instances, element content 2412 may extend into the space of line height 2416 depending on, for example, a font used for the element content. Padding 2418 may define the space between content box 2420 and bounding region 2414. In some embodiments, margin 2422 may also be defined outside bounding region 2414 to define minimum spacing between element 2410 and other elements.

As shown in the illustrated embodiment of FIG. 24B, the position of element content 2412 is defined with respect to bounding region 2414 by line height 2416 and padding 2418. For some embodiments of elements (such as image elements), however, the dimensions for line height 2416 and padding 2418 cannot be defined by the information specifying the UI content (e.g., HTML or CSS code) used to render the UI. Thus, the position of actual content (e.g., element content 2412) within a bounding region (e.g., bounding region 2414) may not be well defined based on the information specifying the UI content. With the position of the actual content not being well defined, the actual content may not be in a desired alignment based on the bounding regions of the elements being aligned. For example, in the illustrated embodiment shown in FIG. 24A, text element 2406, image element 2404, and text element 2407 have bounding regions that are in left alignment but with the padding of the actual content in the elements not being defined by the information specifying the UI content, text content 2406A, image content 2404A, and text content 2407A are out of alignment. Additionally, for elements where the padding and line height cannot be defined by the information specifying the UI content, such as image element 2404, refinement of the positioning by changing the underlying information specifying the UI content may be difficult and cumbersome to accomplish successfully.

Figure 24C:
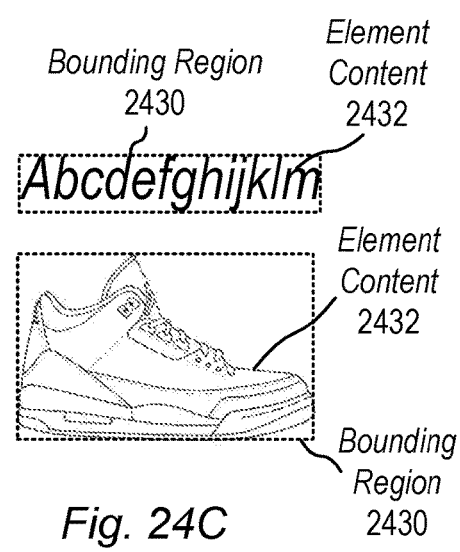
FIG. 24C is a block diagram illustrating an example of bounding regions for element content where the bounding regions may be determined by a computer vision algorithm.

Implementing a machine learning algorithm (e.g., a computer vision algorithm) on the rendered image of UI 2400 may, however, advantageously overcome the above described problems with position bounding regions and element content based on information specifying the UI content. Computer vision algorithms (such as edge detection, filtering, or object detection) may be implemented on the rendered image of UI 2400 to determine bounding regions around actual (e.g., visible) content in the rendered image of UI 2400. For example, FIG. 24C is a block diagram illustrating an example of bounding region 2430 for element content 2432 and bounding region 2434 for element content 2436 where the bounding regions may be determined by a computer vision algorithm. In certain embodiments, as shown in FIG. 24C, bounding region 2430 and bounding region 2434, as determined by the computer vision algorithm, provide direct and more accurate determination of the boundaries of element content 2432 and element content 2436.

Example Location Determination Module

Figure 25:
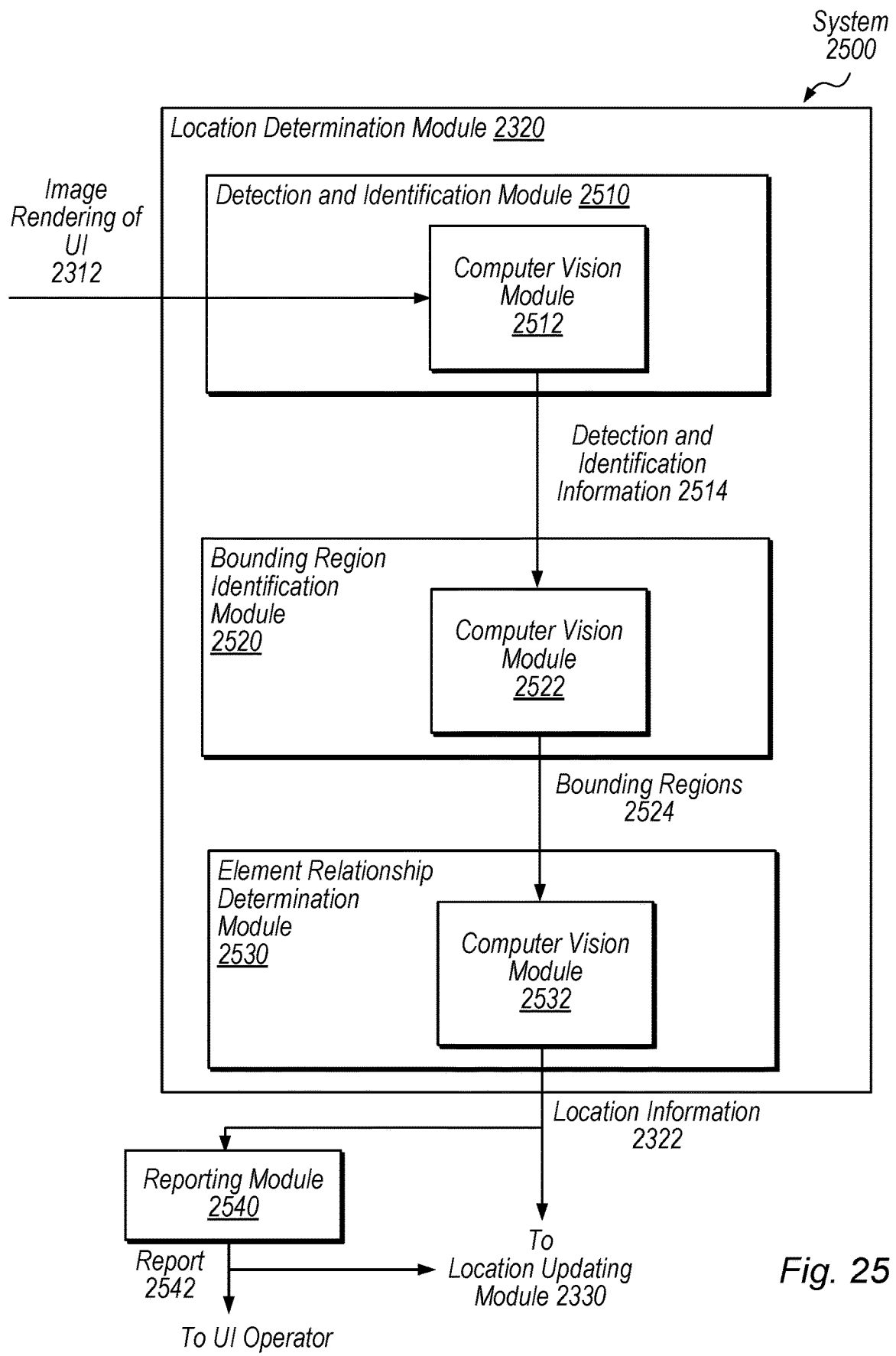
FIG. 25 is a block diagram illustrating an example location determination module.

Turning back to FIG. 23, location determination module 2320 receives image rendering of UI 2312 from image rendering module 2310. Location determination module 2320 may implement computer vision algorithms (or other machine learning algorithms) to detect, recognize, and determine locations of elements in image rendering of UI 2312. FIG. 25 is a block diagram illustrating an example location determination module 2320. In the illustrated embodiment, system 2500 includes location determination module 2320. Within location determination module 2320, detection and identification module 2510 includes a computer vision module 2512.

Computer vision module 2512, in the illustrated embodiment, receives image rendering of UI 2312 and detects and identifies elements (e.g., objects such as text, images, or shapes) in the image rendering. Computer vision module 2512 may use various different types of computer vision algorithms to detect and identify (e.g., recognize) elements within image rendering of UI 2312. For example, computer vision module 2512 may apply an object detection algorithm to detect elements (e.g., objects) such as text, images, or shapes and then identify the elements (e.g., what the element/object is) in image rendering of UI 2312. In certain embodiments, identification of elements in image rendering of UI 2312 includes determining identification information for the elements.

Within location determination module 2320, bounding region identification module 2520 includes a computer vision module 2522. Computer vision module 2522, in the illustrated embodiments, receives detection and identification information 2514 from detection and identification module 2510 and determines one or more bounding regions 2524 for the detected and identified elements. In certain embodiments, determining bounding regions 2524 includes determinations of size and position information of the bounding regions (e.g., the size and position of the bounding regions in image rendering of UI 2312). In some embodiments, computer vision module 2522 determines pixel information for detected and identified elements. Pixel information may also be used to determine size and position information for the detected and identified elements. Pixel information may be included in bounding regions 2524 output from bounding region identification module 2520. Computer vision module 2522 may use various different types of computer vision algorithms to determine bounding regions or pixel information for detected and identified elements. For example, computer vision module 2522 may apply an edge detection algorithm to determine bounding regions 2524 for detected and identified elements.

In certain embodiments, size information for bounding regions 2524 (or pixel information) includes height, widths, and center point information for the bounding regions. Position information for bounding regions 2524 may include spacing between different bounding regions and spacing between a bounding region and other elements or boundaries in image rendering of UI 2312. It is to be understood that while computer vision module 2512 and computer vision module 2522 (as well as computer vision module 2532, described below) are described separately in the illustrated embodiment, other embodiments may be contemplated where a single computer vision module is implemented or additional computer vision modules are implemented to provide the outputs of the computer vision modules described herein.

Example of Applying Computer Vision Algorithm(s) to Rendered Image of UI

Figure 26:
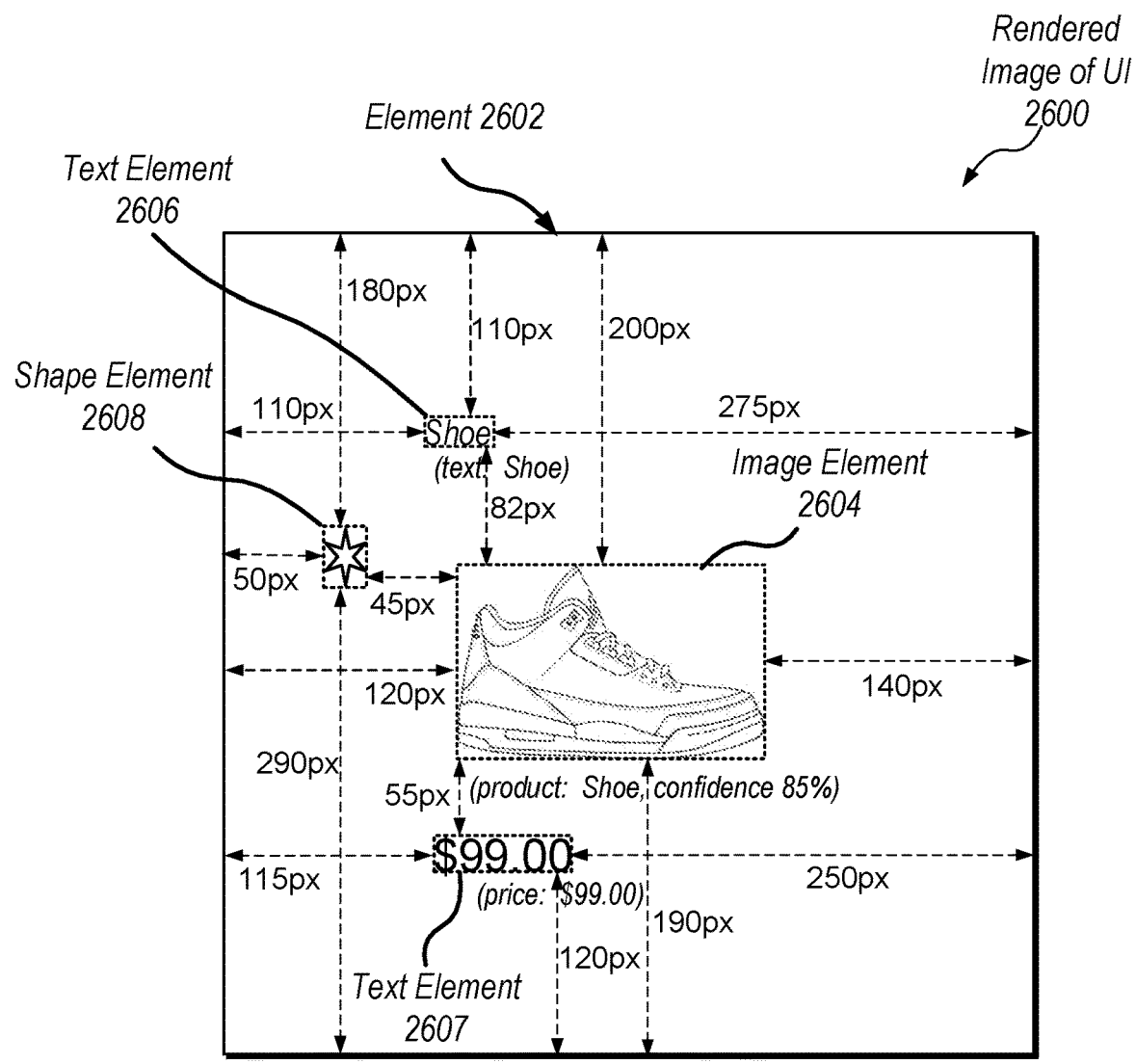
FIG. 26 is a block diagram illustrating an example of a rendered image of UI with size and position information for elements and bounding regions determined by applying computer vision algorithm(s) to the rendered image.

FIG. 26 is a block diagram illustrating an example of rendered image of UI 2600 with size and position information for elements and bounding regions determined by applying computer vision algorithm(s) to the rendered image. In the illustrated embodiment, rendered image of UI 2600 includes displays of size and position information for element bounding regions determined by applying computer vision algorithm(s) to rendered image of UI 2400, shown in FIG. 24A. Sizes of image element 2604, text element 2606, text element 2607, and shape element 2608 are shown by the dashed bounding regions for each element shown in the illustrated embodiment. Position information for the bounding regions of image element 2604, text element 2606, text element 2607, and shape element 2608 relative to each other and relative to the outer boundary of element 2602 is shown by arrowed lines and examples of distance measurements (e.g., "200px"). It should be noted that the distance measurements provided in FIG. 26 are example measurements and are not intended to be to scale. Additionally, other units of measurements besides "px" may be contemplated for expressing distance.

Identification information may also be determined by applying computer vision algorithm(s) to rendered image of UI 2400, shown in FIG. 24A. Identification information determined by applying computer vision, in the illustrated embodiment of FIG. 26, may include, for example, "(product: Shoe, confidence 85%)" for image element 2604, "(text: Shoe)" for text element 2606, and "(price: $99.00)" for text element 2607. In some embodiments, as shown in FIG. 26, identification information for image elements (such as image element 2604) includes a confidence level for the identification of the image content. For example, in the illustrated embodiment, the confidence level of the computer vision algorithm that image element 2604 is a shoe is 85%.

Example Location Determination Module (continued)

Turning back to FIG. 25, bounding regions 2524, which includes size, position, and identification information for the bounding regions and elements in the bounding regions, is provided to element relationship determination module 2530. In certain embodiments, element relationship determination module 2530 includes computer vision module 2532. Computer vision module 2532 may determine relationships between elements (e.g., element 2602, image element 2604, text element 2606, text element 2607, and shape element 2608, shown in FIG. 26) including parent/child element relationships. Determining the relationships may include determining whether the elements are in selected locations relative to each other. For example, computer vision module 2532 may determine whether elements are in a selected alignment relative to each other. Selected locations (e.g., selected alignments) may be inputs provided by a programmer or operator or inputs determined by automatic processes (e.g., alignment based on location analysis of multiple user interfaces, as described herein).

The relationships determined by computer vision module 2532 may be combined with the information for bounding regions 2524 and output as location determination information 2322, which may be provided to location updating module 2330, as shown in FIG. 23. In some embodiments, location information 2322 is provided to reporting module 2540. Reporting module 2540 may generate report 2542 based on location information 2322. Report 2542 may include, for example, size, position, and identification information determined for the elements along with the determination of whether the elements are in selected locations (e.g. selected alignments). In some embodiments, report 2542 is provided to another entity such as the operator of the UI, which may use the report to update or change the UI. In some embodiments, report 2542 is provided to location updating module 2330 for use in updating the locations of elements in the UI.

Example Location Updating Module

Figure 27:
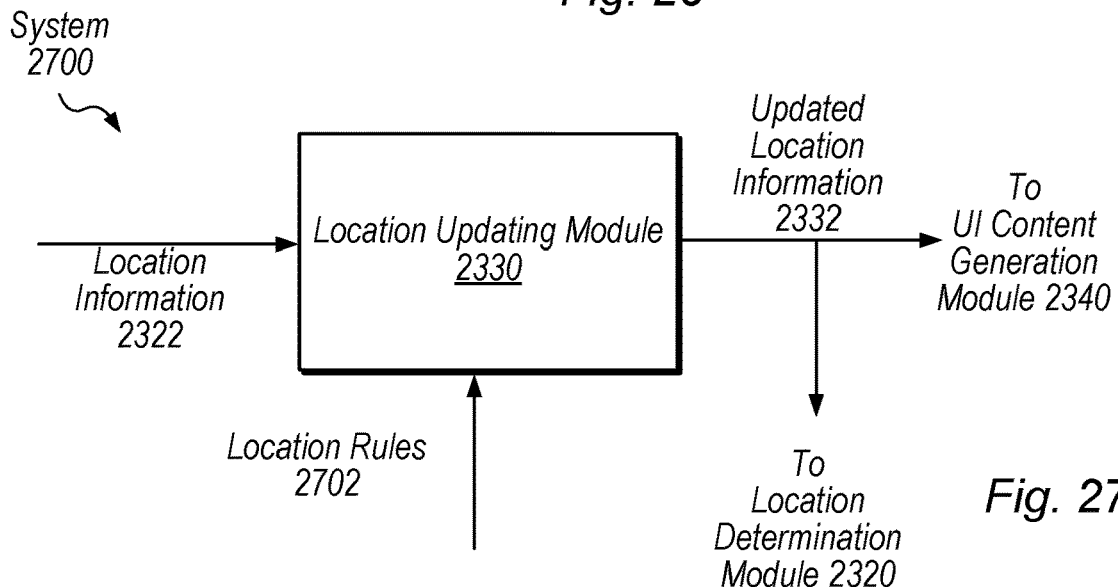
FIG. 27 is a block diagram illustrating an example location updating module.

FIG. 27 is a block diagram illustrating an example location updating module 2330. In the illustrated embodiment, system 2700 includes location updating module 2330. In certain embodiments, location updating module 2330 receives location information 2322 and determines updated location information 2332 based on location rules 2702. In some embodiments, location rules 2702 include user selected locations (e.g., user selected alignments) provided by a programmer or operator. In some embodiments, location rules 2702 include inputs determined by automatic processes. For example, location determination module 2320 (or a similar tool) may be used to determine size and placement of elements in a plurality of user interfaces that are related (such as multiple product tiles located in an online store). Information about the size and placements of elements in the plurality of user interfaces may be used to determine suggested placements of text in relation to images or other elements. As a specific example, there may be a strong correlation for text to be aligned with the left edge of images in the plurality of user interfaces, which may suggest that location rules 2702 include rules for aligning text with the left edges of images.

Example Updated Locations for Rendered Image of UI

Figure 28:
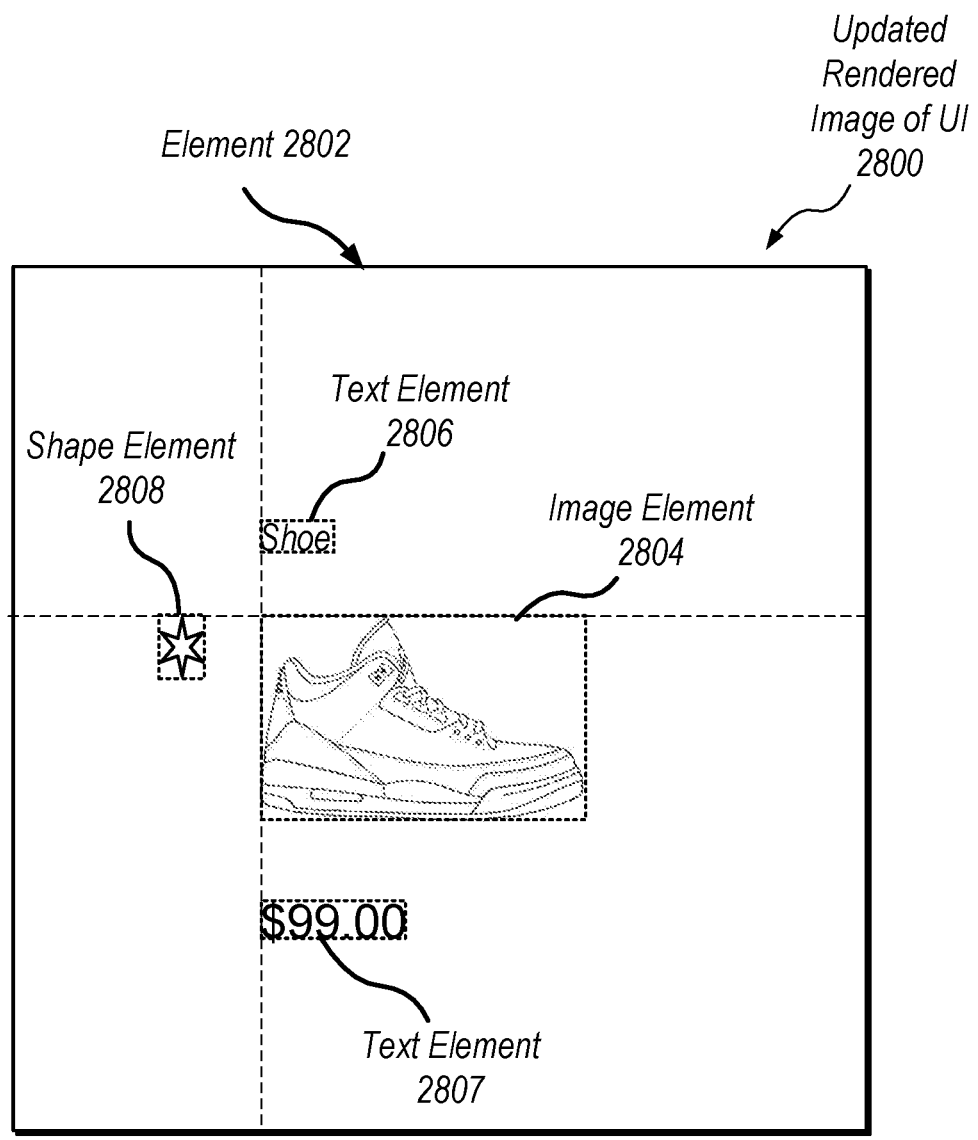
FIG. 28 is a block diagram illustrating an example of an updated rendered image of UI based on updated location information determined by a location updating module.

As described above, by applying location rules 2702, location updating module 2330 determines updated location information 2332 for location information 2322 determined from the rendered image of UI 2600 (shown in FIG. 26). FIG. 28 is a block diagram illustrating an example of updated rendered image of UI 2800 based on updated location information 2332 determined by location updating module 2330. In the illustrated embodiment, text element 2806, image element 2804, and text element 2807 are in left alignment (as shown by dashed line) while image element 2804 and shape element 2808 are in top alignment (as shown by dashed line) within element 2802. Because the bounding regions for text element 2806, image element 2804, text element 2807, and shape element 2808 are determined by what is visible in the rendered image of UI 2800 using computer vision algorithm(s), the content within the elements (e.g., the images and text themselves) are able to be placed in visual alignment.

Example Alignments for UI

While FIG. 28 depicts one example of possible alignments, other alignments of elements and content within the elements may also be contemplated. FIGS. 29A-29D depict block diagrams illustrating examples of additional contemplated horizontal and vertical alignments. For simplicity in these examples, alignment is shown only between image element 2904, text element 2906, and text element 2907. FIG. 29A depicts an example of horizontal center alignment between image element 2904, text element 2906, and text element 2907. FIG. 29B depicts an example of split horizontal alignment between image element 2904, text element 2906, and text element 2907. FIG. 29C depicts an example of vertical fill alignment between image element 2904, text element 2906, and text element 2907. FIG. 29D depicts an example of bottom vertical alignment between image element 2904, text element 2906, and text element 2907. It is to be understood that combination of alignments may also be contemplated. For example, a selected horizontal alignment may be combined with a selected vertical alignment.

Figure 30A:
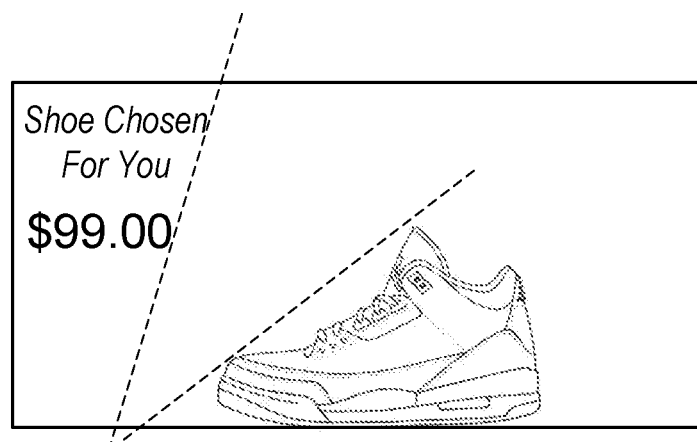
FIGS. 30A and 30B depict examples of diagonal alignments between text elements and an image element.
Figure 30B:
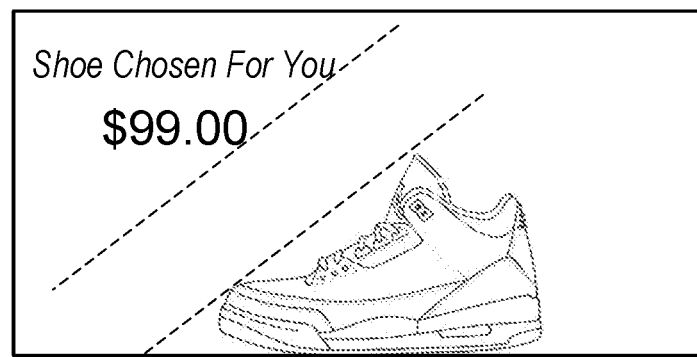

In some embodiments, diagonal alignment between text elements and image elements may be contemplated by location updating module 2330. Applying diagonal alignment may include determining locations for line breaks in text, font size of text, line height of text, padding between text elements, and other factors to generate a diagonal alignment between the text elements and the image element. FIG. 30A depicts an example of text elements that do not appear in good diagonal alignment with an image element (as shown by the diagonal line aligned with the text that intersects the diagonal line aligned with the shoe). FIG. 30B depicts an example of the text elements in better diagonal alignment with the image element (as shown by the diagonal line aligned with the text that is substantially parallel to the diagonal line aligned with the shoe).

Example Location Updating Module (continued)

Turning back to FIG. 27, location updating module 2330 may, in some embodiments, provide updated location information 2332 to location determination module 2320 (as shown in FIG. 23). Updated location information 2332 may be provided to location determination module 2320, which may determine whether the updated location information 2332 positions the elements in selected locations, as described above.

In some embodiments, location updating module 2330 provides updated location information 2332 to UI content generation module 2340, as shown in FIG. 23, which may generate updated UI content 2342 (e.g., updating information specifying content of the UI). UI content generation module 2340 may generate the updated UI content 2342 based on the received updated location information 2332. For example, UI content generation module 2340 may do subtraction or other mathematical operations to determine padding of elements or other positional information for the elements needed for the information specifying content of the UI (e.g., HTML or CSS code) based on where the elements are located in a computer vision algorithm rendering of the image of the UI, which is defined in the updated location information 2332. Other methods for generating updated UI content 2342 from updated location information 2332 may also be contemplated including methods for generating new UI content as described herein.

Example of Template Generation Using Locating Module

Figure 31:
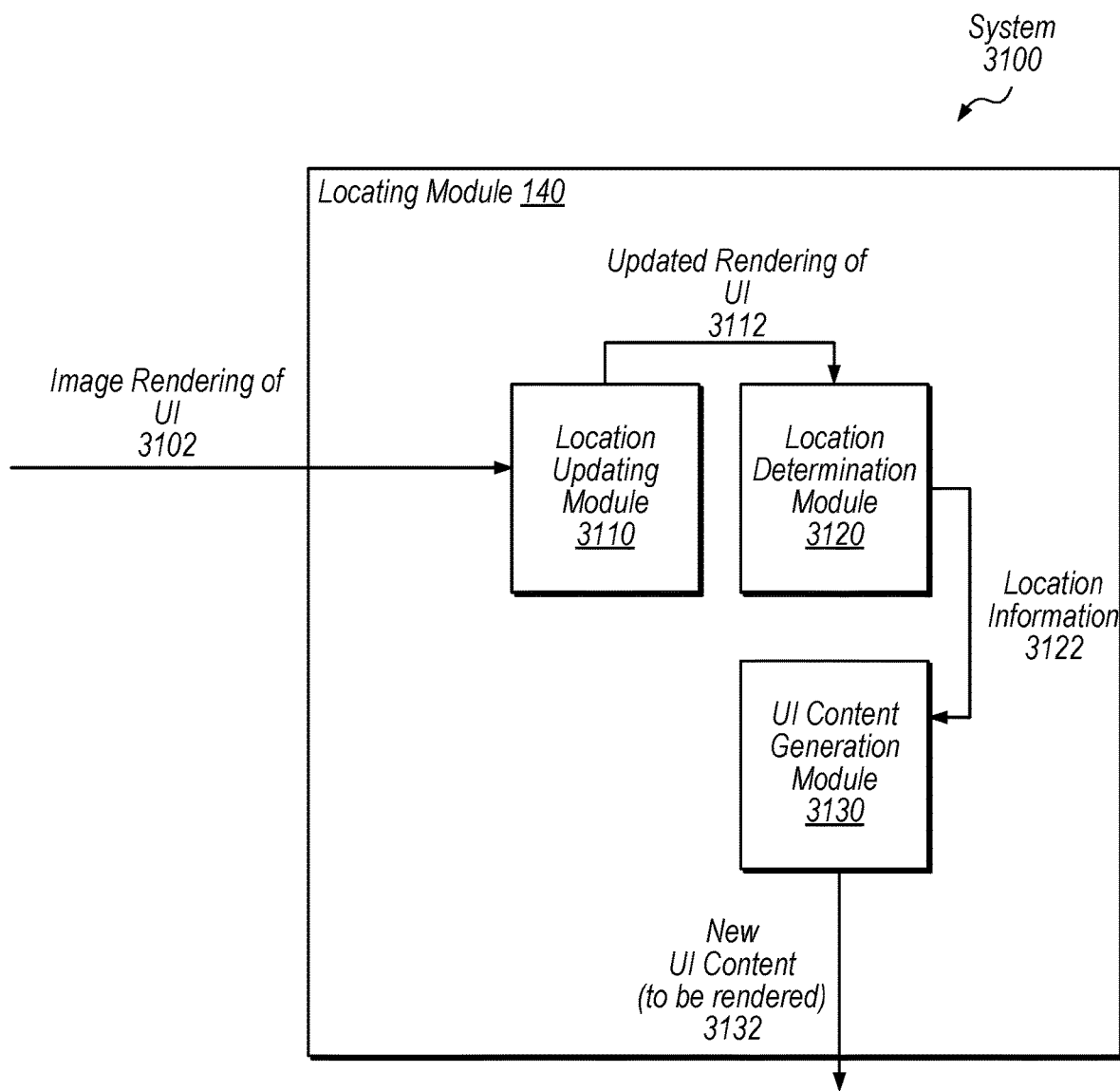
FIG. 31 is a block diagram illustrating an example system configured to automatically generate a template for new UI content to be rendered.

In some embodiments, locating module 140 may be used to generate a template for new UI content to be rendered without receiving any original UI content to be rendered (e.g., any information specifying content for the original UI). FIG. 31 is a block diagram illustrating an example system configured to automatically generate a template for new UI content to be rendered. In the illustrated embodiment, system 3100 includes locating module 140, which includes location updating module 3110, location determination module 3120, and UI content generation module 3130.

Location updating module 3110 receives an image rendering of UI 3102. Image rendering of UI 3102 may be, for example, an image capture of an existing UI or rendering of an UI already in image format. Location determination module 3110 may be used to update the locations of elements in image rendering of UI 3102. For example, a user may place elements in selected locations on the image rendering of UI 3102 or computer vision algorithms may be applied to determine locations of elements and update the elements to selected locations (as described above). Updated rendering of UI 3112 may include the locations of elements updated by location determination module 3110.

Location determination module 3120 may receive the updated rendering of UI 3112 and determine location information 3122 for the rendering of the UI (e.g., determining locations of elements using computer vision modules, as described herein). Location information 3122 determined by location determination module 3120 may be received by UI content generation module 3130, which may generate new UI content (to be rendered) 3132 based on the location information 3122. New UI content 3132 may include information specifying content for rendering a new UI (e.g., HTML or CSS code for rendering the new UI) that is determined without any information on the original information specifying content (e.g., original HTML or CSS code) used to generate the original UI (e.g., image rendering of UI 3102). In some embodiments, new UI content 3132 may include information specifying content that may be implemented as a template for generating new or updated UI related to the original UI.

Example Methods

Figure 32:
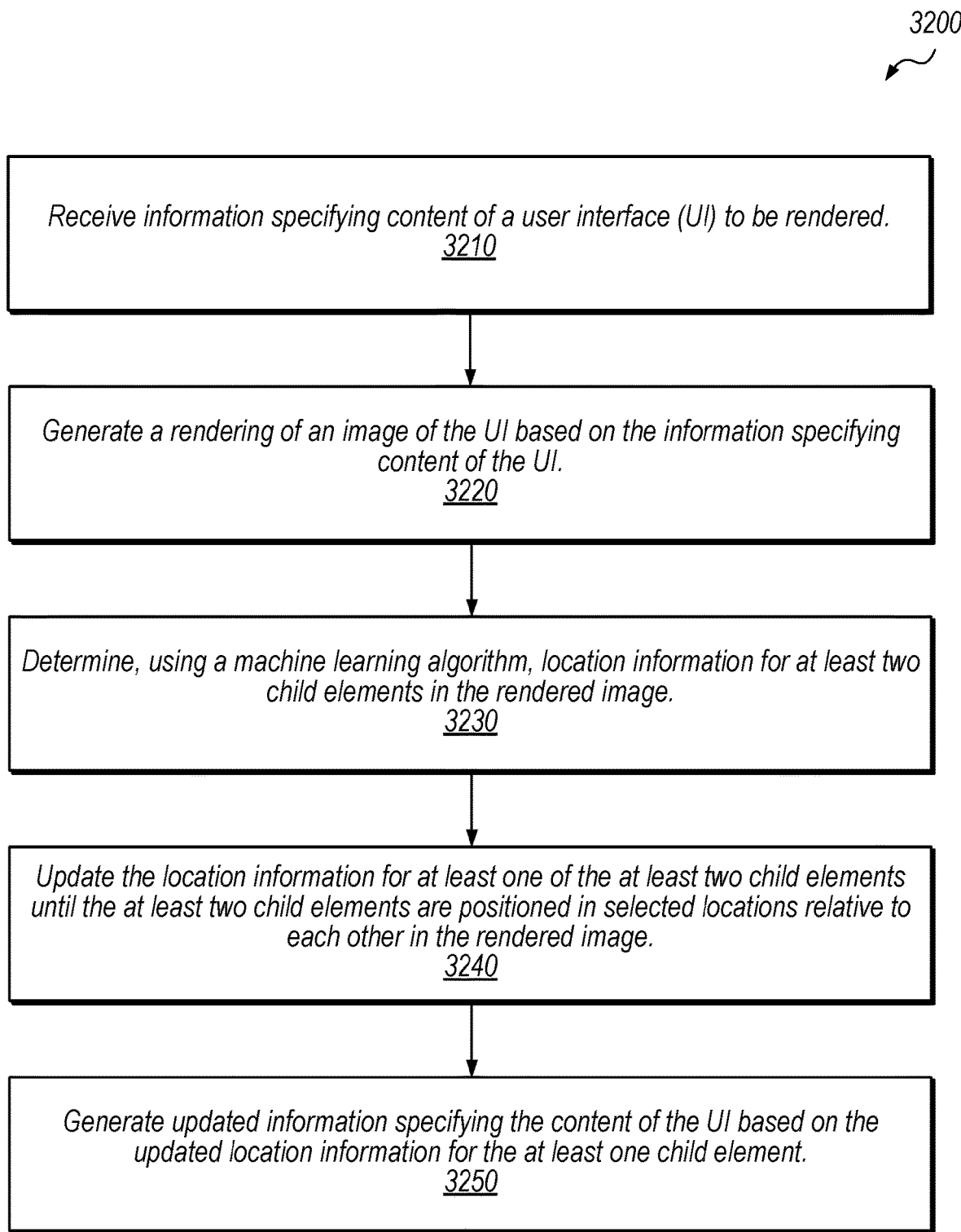
FIG. 32 is a flow diagram illustrating a method for automatically locating elements and updating locations of the elements for UI content to be rendered, according to some embodiments.

Turning now to FIG. 32, a flow diagram illustrates a method 3200 for automatically locating elements and updating locations of the elements for UI content to be rendered, according to some embodiments. The method shown in FIG. 32 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 3210, in the illustrated embodiment, a computer system receives information specifying content of a user interface (UI) to be rendered.

At 3220, the computer system generates a rendering of an image of the UI based on the information specifying content of the UI.

At 3230, the computer system determines, using a machine learning algorithm, location information for at least two child elements in the rendered image. In certain embodiments, the machine learning algorithm is a computer vision algorithm. In some embodiments, the computer system determines the location information for the at least two child elements by determining bounding regions for the at least two child elements in the rendered image and determining location information for the bounding regions. In some embodiments, the determined location information includes spacing information for the bounding regions in the rendered image. In some embodiments, the machine learning algorithm determines identifying information of the at least two child elements in the rendered image.

In some embodiments, the computer system determines an alignment for the at least two child elements relative to each other based on the location information for at least two child elements in the rendered image and generates a report of the alignment determined for the at least two child elements. In some embodiments, the report is transmitted to a computer system operating the UI. In some embodiments, determining the alignment for the at least two child elements includes determining whether the at least two child elements are in a selected alignment. In some embodiments, the report includes the determination on whether the at least two child elements are in the selected alignment.

In certain embodiments, at least one child element includes an element located within a bounding region in the rendered image where the bounding region for the at least one child element is located within at least one outer bounding region. In some embodiments, positioning the at least two child elements in the selected locations relative to each other includes positioning the at least two child elements in a selected alignment relative to each other.

At 3240, the computer system updates the location information for at least one of the at least two child elements until the at least two child elements are positioned in selected locations relative to each other in the rendered image.

At 3250, the computer system generates updated information specifying the content of the UI based on the updated location information for the at least one child element. In some embodiments, the computer system generates a report of the updated location information for the at least one child element.

In some embodiments, updating the location information for at least one of the at least two child elements until the at least two child elements are positioned in selected locations relative to each other in the rendered image includes:

(a) updating the location information for at least one of the at least two child elements in the rendered image;

(b) determining, by the computer system using the machine learning algorithm, the updated location information for the at least two child elements in the rendered image;

determining, by the computer system, whether the at least two child elements are positioned in selected locations relative to each other in the rendered image based on the updated location information;

in response to the at least two child elements being determined to be positioned in the selected locations relative to each other in the rendered image, generating the updated information specifying the content of the UI based on the updated location information for the at least one child element; and in response to the at least two child elements being determined to not be positioned in the selected locations relative to each other in the rendered image, repeating (a) and (b) until the at least two child elements are determined to be positioned in the selected locations relative to each other in the rendered image.

Turning now to FIG. 33, a flow diagram illustrates a method 3300 for automatically updating locations of elements in a rendered image of a UI and generating new information specifying content of the updated UI, according to some embodiments. The method shown in FIG. 33 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 3310, in the illustrated embodiment, a computer system receives a rendering of an image of a user interface (UI) where the rendered image includes a plurality of child elements positioned within at least one outer bounding region.

At 3320, the computer system updates the rendered image by placing one or more of the child elements in selected locations in the rendered image. In some embodiments, the computer system places the one or more of the child elements in the selected locations in the rendered image by placing at least two child elements in selected locations relative to each other.

At 3330, the computer system determines, using a machine learning algorithm, location information for the plurality of child elements in the updated rendered image. In certain embodiments, the machine learning algorithm is a computer vision algorithm.

At 3340, the computer system generates information specifying the content of the UI based on the location information for the plurality of child elements in the updated rendered image. In certain embodiments, the information specifying the content of the UI is generated independently of information specifying the content of the UI for the received rendering of the image of the UI. In some embodiments, at least one additional UI is generated using the new information specifying the content of the UI.

Example UI Migration

Figure 34:
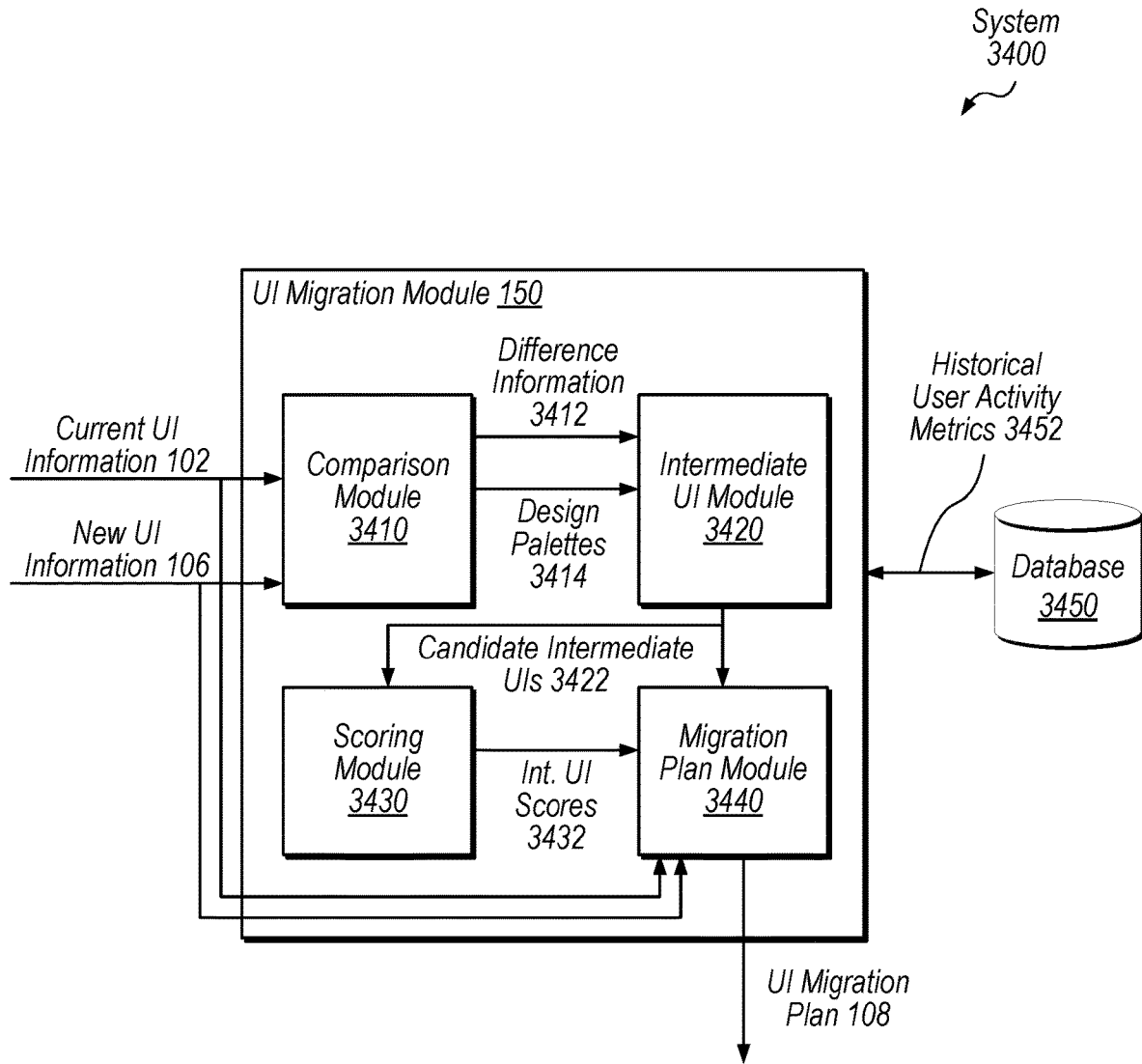
FIG. 34 is a block diagram illustrating an example system configured to generate a UI migration plan, according to some embodiments.

FIG. 34 is a block diagram illustrating an example system 3400 configured to generate a UI migration plan 108. In the illustrated embodiment, system 3400 includes a UI migration module 150 and a database 3450. The UI migration module 150 includes a comparison module 3410, an intermediate UI module 3420, a scoring module 3430, and a migration plan module 3440.

UI migration module 150, in the illustrated embodiment, receives information specifying current UI 102 and information specifying new UI 106. UI migration module may receive this information from UI automation module 110. Based on this information, UI migration module 150 generates one or more intermediate UIs and outputs a UI migration plan 108 that includes the intermediate UIs, as well as the current UI 102 and the new UI 106. The UI migration plan 108 may be used to control the rate at which users are introduced to the new UI by transitioning through several intermediate UIs that include incremental changes between the current UI and the new UI.

Comparison module 3410, in the illustrated embodiment, evaluates current UI 102 and new UI 106 and generates difference information 3412 and design palettes 3414. Intermediate UI module 3420 generates one or more candidate intermediate UIs 3422 based on the difference information 3412, design palettes 3414, and the information specifying the current and new UIs. In some embodiments, the candidate intermediate UIs 3422 are generated based on historical user activity metrics 3452 retrieved from database 3450. Historical user activity metrics 3452 are metrics for one or more users that were recorded prior to generation of the UI migration plan 108. Example user activity metrics are discussed below with reference to FIG. 37. The candidate intermediate UIs 3422 are then provided to scoring module 3430 and migration plan module 3440. Scoring module 3430, in the illustrated embodiment, scores candidate intermediate UIs 3422 and provides intermediate UI scores 3432 to migration plan module 3440. Example scoring of candidate intermediate UIs is discussed in detail below with reference to FIG. 38.

Migration plan module 3440 receives information specifying current UI 102 and new UI 106, candidate intermediate UIs 3422, and scores 3432 for the intermediate UIs.

Based on this information and historical user activity metrics 3452, migration plan module 3440 generates UI migration plan 108 for migrating from current UI 102 to new UI 106. Note that migration plan module 3440 is discussed in detail below with reference to FIG. 39.

In some embodiments, UI migration module 150 receives additional information from UI automation module 110. The additional information may include characteristics, design palettes, etc. of the current and new UIs. In some embodiments, UI migration module 150 uses the received additional information to generate UI migration plan 108. Specifically, the additional information (e.g., characteristics of current components) could be used by comparison module 3410 to generate difference information.

Example Difference Information

Figure 35A:
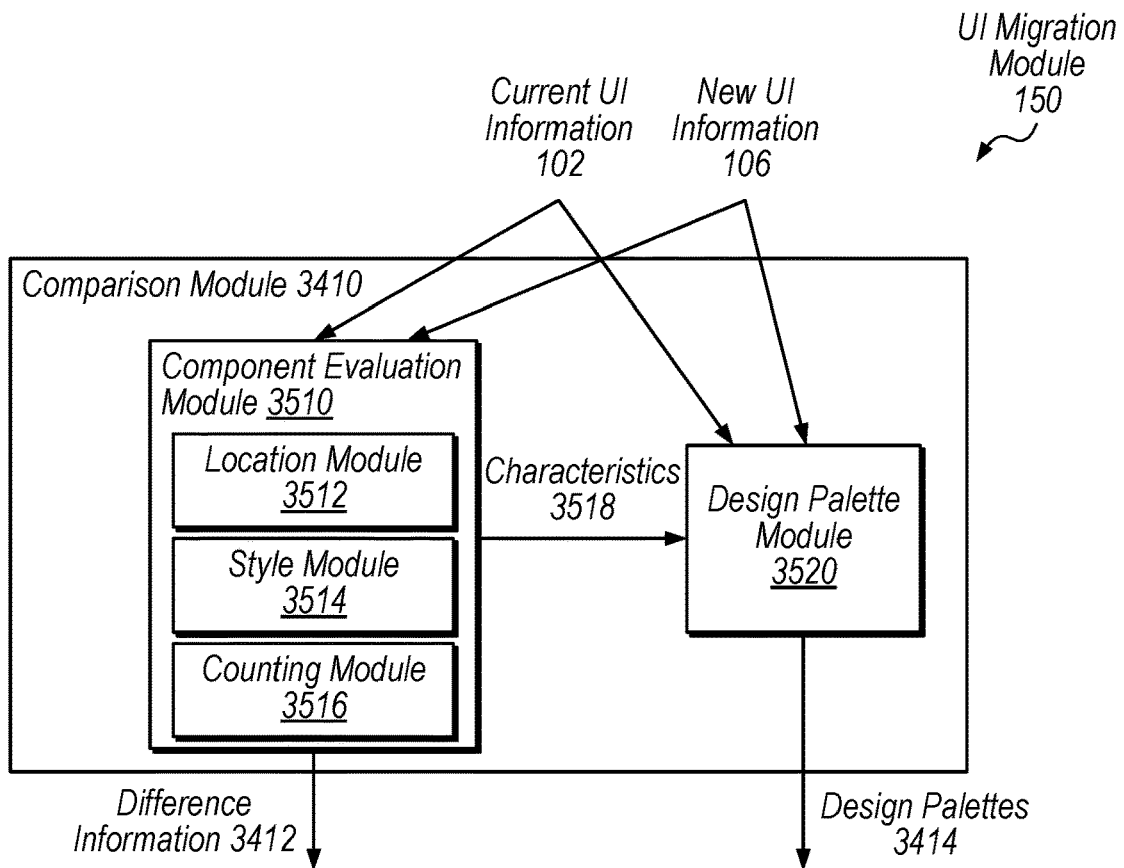
FIGS. 35A and 35B are block diagrams illustrating an example comparison module and example differences between pairs of UIs, respectively, according to some embodiments.
Figure 35B:
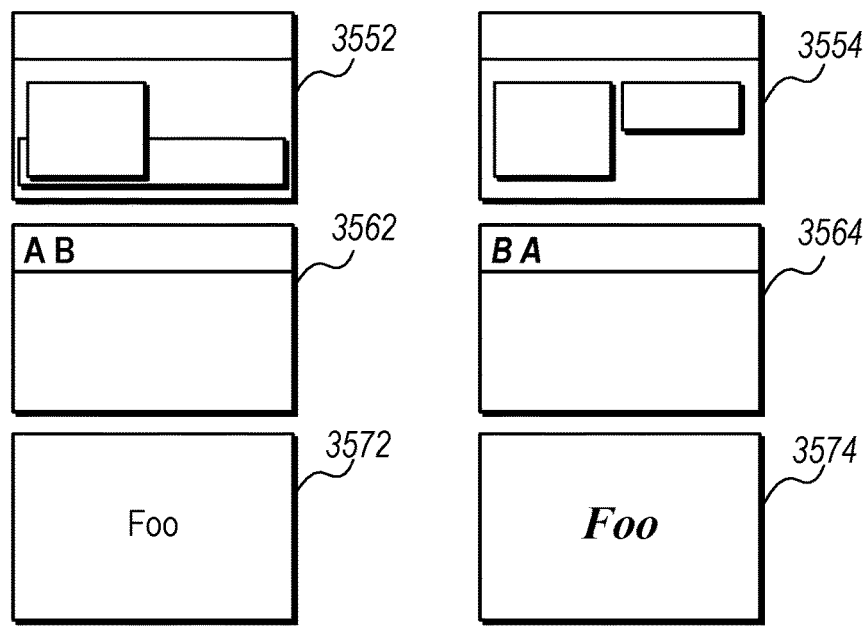

FIG. 35A illustrates an example comparison module 3410 that generates difference information 3412 and design palettes 3414 for current and new UIs, while FIG. 35B illustrates example differences 3550 between pairs of UIs.

In FIG. 35A, comparison module 3410 includes a component evaluation module 3510 and a design palette module 3520. Component evaluation module 3510, in turn, includes location module 3512, style module 3514, and counting module 3516. Modules 3512, 3514, and 3516 may use any of various computer vision techniques to identify characteristics of current UI 102 and new UI 106. In the illustrated embodiment, component evaluation module 3516 receives information specifying both a current UI 102 and a new UI 106. Based on this information, component evaluation module 3510 determines characteristics 3518 of UIs 102 and 106. For example, location module 3512 determines locations of components (e.g., using edge detection to identify bounding regions) within both the current and new UIs. In addition, style module 3514 determines characteristics of the two UIs related to style, including: size, weight, font, color, transparency, spacing, rotation, borders, etc. Then, counting module 3516 determines a quantity of components included in each of the two UIs. After making these determinations, component evaluation module 3510 provides characteristics 3518 for current UI 102 and new UI 106 to design palette module 3520. In addition, component evaluation module 3510 outputs difference information 3412.

Difference information 3412 specifies one or more differences 3550 between the current 102 and the new UI 106. For example, difference information 3412 may specify, for components of the two UIs, differences in: quantity, location, style (e.g., color, shape, transparency, etc.), etc. Difference information 3412 may specify differences in the program code (e.g., HTML, CSS, etc.) of the two UIs. Difference information 3412 may also specify differences in pixels between the two UIs.

Design palette module 3520, in the illustrated embodiment, receives information specifying both a current UI 102 and a new UI 106 as well as characteristics 3518 of the two UIs. Based on this information, design palette module 3520 generates a design palette 3414 for each UI. Similar to design palette 1032 discussed above with reference to FIG. 10, design palettes 3414 for a current and new UI may specify colors, fonts, weights, shapes, etc. for these UIs. For example, design palette module 3520 may identify, based on the style information specified by characteristics 3518, that current UI 102 includes components that have borders with rounded corners and a red background. As a result, design palette module 3520 includes this style information in the design palette 3414 for the current UI 102.

FIG. 35B illustrates example differences 3550 (i.e., examples of difference information 3412) between three different pairs of current and new user interfaces. For example, the three UIs 3552, 3562, and 3572 shown on the left portion of FIG. 35B may be current UIs 102, while the three user interfaces 3554, 3564, and 3574 shown on the right portion of FIG. 35B may be new UIs 106.

In the illustrated embodiment, UIs 3552 and 3554 differ in that UI 3554 has a new component and is missing a component included in UI 3552. This example difference may be identified by counting module 3516. Similarly, UIs 3562 and 3564 differ in that the elements "A" and "B" in UI 3564 are in a different order and position than the same elements shown in UI 3562. This example difference may be identified by location module 3512. Finally, UIs 3572 and 3574 differ in that UI 3574 includes a text element "Foo" in a different font and weight than the same element shown in UI 3572. This example difference may be identified by style module 3514.

Example Intermediate UI Module

Figure 36:
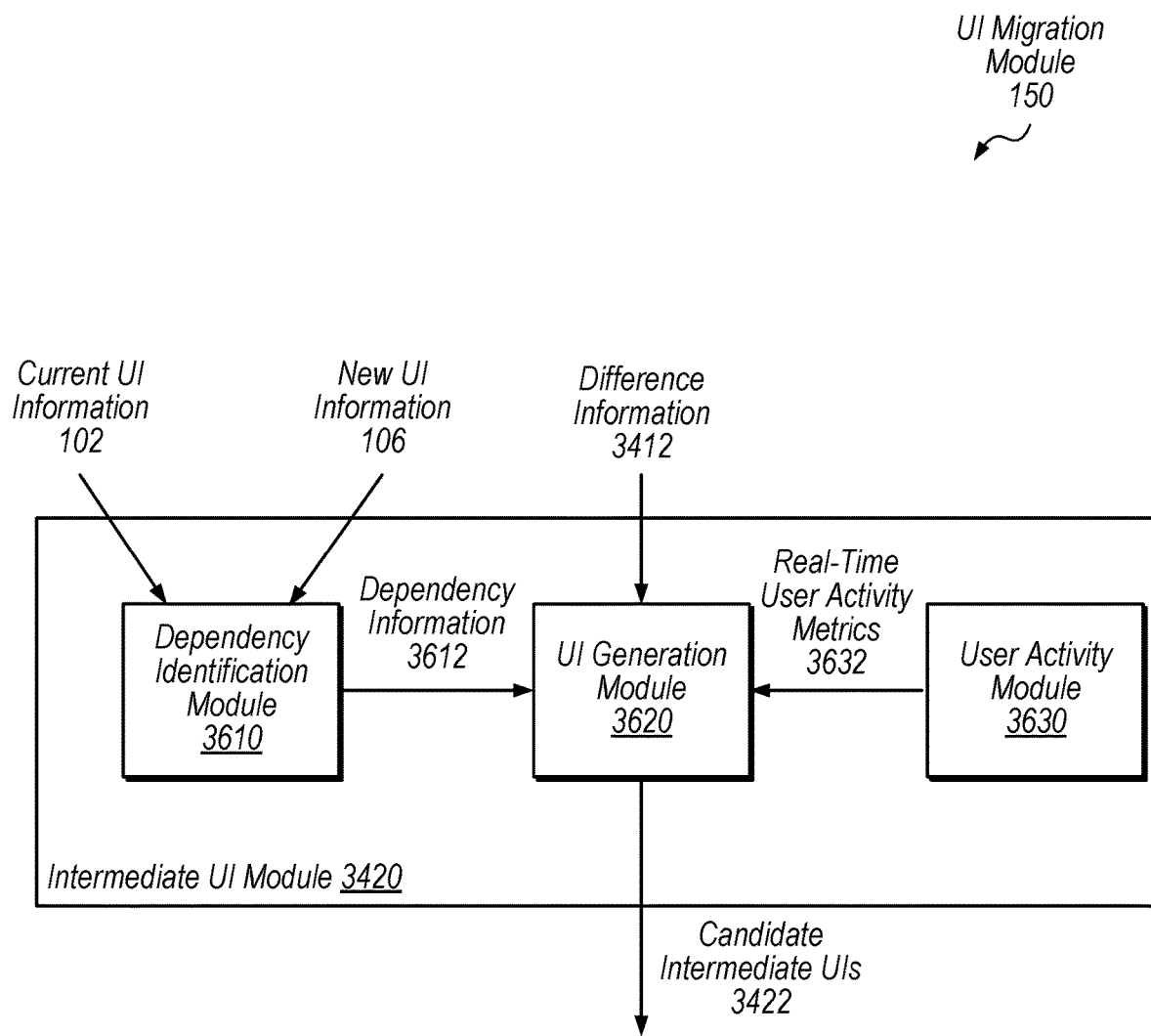
FIG. 36 is a block diagram illustrating an example intermediate UI module, according to some embodiments.

FIG. 36 is a block diagram illustrating an example intermediate UI module 3420. In the illustrated embodiment, intermediate UI module 3420 includes a dependency identification module 3610, UI generation module 3620, and user activity module 3630.

Dependency identification module 3610, in the illustrated embodiment, determines one or more dependencies between content of a current UI and between content of a new UI, respectively. Dependencies may indicate that certain UI content must be rendered at the same time within a UI in order for that UI to function properly. For example, dependency identification module 3610 may determine that a particular component in the current UI includes an outer rectangular shape, text within the shape, and a click handler that are dependent on one another. Therefore, in this example, the dependency information 3612 specifies that these three elements need to be changed (e.g., moved within a UI, replaced by another component, removed from a UI, etc.) together. As another example, dependency identification module 3610 may identify that an input field includes an outer rectangle, an event handler, and text indicating to the user to provide input that are dependent on one another and, therefore, need to be changed together within a UI. Dependency identification module 3610 may, for example, perform a static analysis of program code of the current and new UIs to determine dependencies between UI content that are specified in the program code. Example static analysis tools include: Salesforce Lightning Web Components, Webpack, Babel, etc.

User activity module 3630, in the illustrated embodiment, provides real-time user activity metrics 3632 to UI generation module 3620. User activity module 3630 may measure activity metrics for a particular user relative to any of various displayed UIs (for example, the current UI or the new UI) during generation of candidate intermediate UIs 3422 by UI generation module 3620. In some embodiments, user activity metrics are historical metrics 3452 that are measured for a particular user relative to various other UIs prior to generation of intermediate UIs. Example user activity metrics are discussed in detail below with reference to FIG. 37.

UI generation module 3620, in the illustrated embodiment, receives difference information 3412, dependency information 3612, and real-time user activity metrics 3632. Based on this information, UI generation module 3620 generates one or more candidate intermediate UIs 3422 for use in migration from current UI 102 to new UI 106. In some embodiments, UI generation module 3620 also receives design palettes 3414 for the current and new UIs. For example, UI generation module 3620 may use design palettes 3414 to format the one or more candidate intermediate UIs 3422 such that the intermediate UIs may be used to migrate from the current UI to the new UI. In some embodiments, the number of candidate intermediate UIs generated by UI generation module 3620 is based on a quantity of identified differences specified in difference information 3412. For example, UI generation module 3620 may generate three candidate intermediate UIs when there are three differences between current UI 102 and new UI 106. In this example, each of the three candidate intermediate UIs may introduce a single change based on one of the three differences, to transition from the current UI to the new UI.

In some embodiments, UI migration plan module 3440 provides UI migration plan 108 to UI generation module 3620 during execution of the plan. In some embodiments, UI generation module 3620 alters the UI migration plan 108 based on real-time user activity metrics 3632. For example, UI migration module 3620 may make changes to (e.g., update) one or more subsequent intermediate UIs included in the UI migration plan 108 based on real-time user activity metrics 3632 tracked for previous intermediate UIs included in the plan. In this example, the subsequent UIs have not yet been displayed. As another example, UI migration module 3620 may add an intermediate UI to the UI migration plan 108 or may remove an intermediate UI from the plan based on real-time user activity metrics 3632.

Example User Activity Metrics

Figure 37:
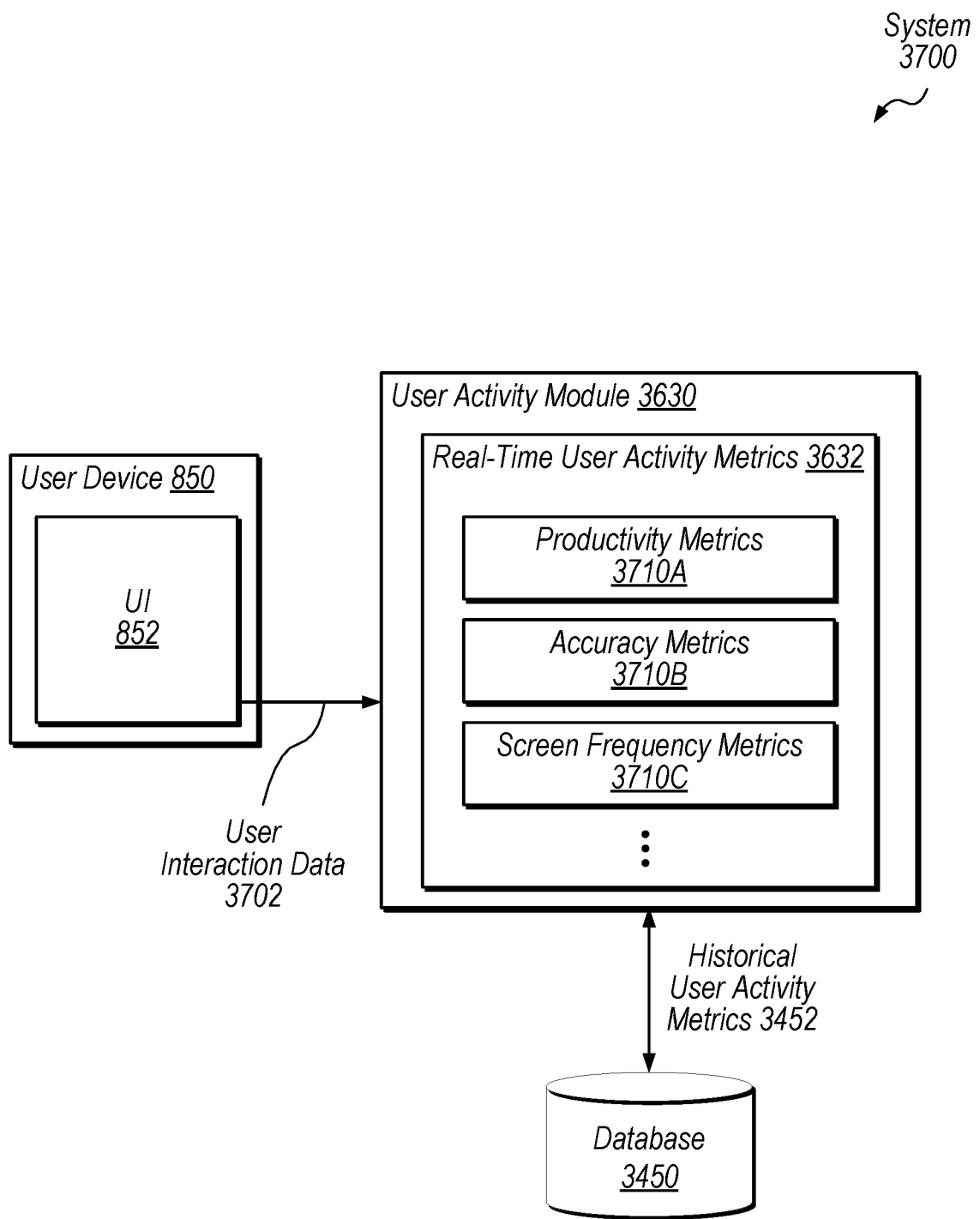
FIG. 37 is a block diagram illustrating an example system configured to generate user activity metrics, according to some embodiments.

FIG. 37 is a block diagram illustrating an example system 3700 configured to generate user activity metrics. In the illustrated embodiment, user activity module 3630 includes various types of real-time user activity metrics 3632: productivity metrics 3710A, accuracy metrics 3710B, and screen frequency metrics 3710C. Note that these three types of metrics are non-limiting examples and that any of various types of activity metrics may be recorded based on user interaction with a user interface.

User device 850, in the illustrated embodiment, provides user interaction data 3702 to user activity module 3630. User interaction data 3702 may specify how a user interacts with UI 852 displayed via user device 850. For example, user interaction data 3702 may indicate a time at which a user clicks on a button in UI 852, scrolling activity of the user, movement of a selector tool (e.g., mouse) within UI 852, a number of webpages viewed for a particular website, or any of various other types of user activity tracked relative to UI 852. Note that UI 852 may be a current UI, an intermediate UI, or a new UI. User activity module 3630 aggregates user interaction data 3702 to generated activity metrics for a particular user.

Productivity metrics 3710A indicate, for a particular user, an amount of work that the user accomplishes when interacting with UI 852. For example, productivity metrics 3710A may indicate a time between clicks for a particular user relative to UI 852. As another example, productivity metrics 3710A may indicate a speed at which the particular user is scrolling relative to UI 852. Similar to this, screen frequency metrics 3710C may indicate how often the particular user switches between webpages. Accuracy metrics 3710B may indicate how accurate the particular user is when answering questions (e.g., for a survey or questionnaire).

User activity module 3630 stores real-time user activity metrics 3632, that it records during execution of the UI migration plan 108, as historical user activity metrics 3452 in database 3450 for use by UI migration module 150 at a later time. Specifically, the historical user activity metrics 3452 may be used by UI generation module 3620 to generate one or more candidate intermediate UIs 3422 as discussed above with reference to FIG. 36 or may be used by UI migration plan module 3440 to generate a UI migration plan 108 as discussed below with reference to FIG. 39.

Example Design Criteria

Figure 38:
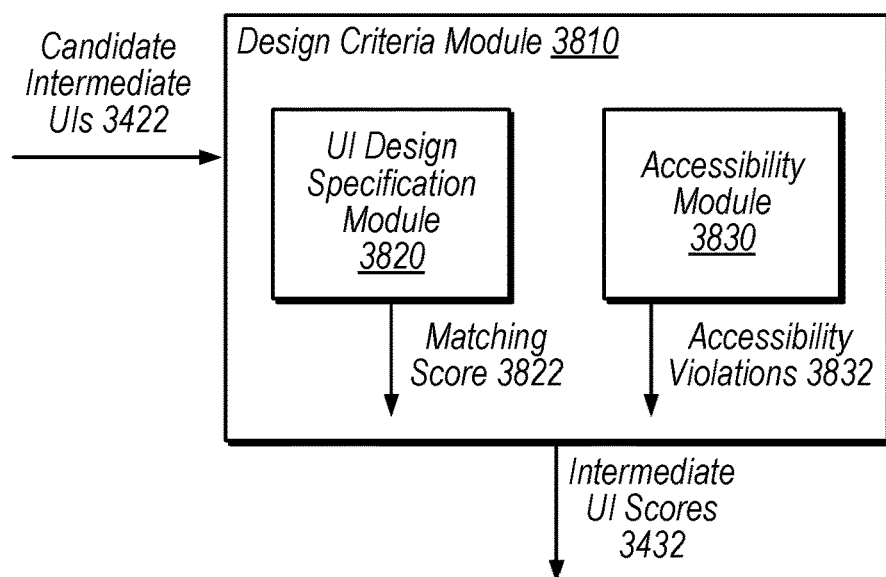
FIG. 38 is a block diagram illustrating an example scoring module, according to some embodiments.

FIG. 38 is a block diagram illustrating an example scoring module 3430 that generates scores 3432 for candidate intermediate UIs. In the illustrated embodiment, scoring module 3430 includes a design criteria module 3810 that evaluates candidate intermediate UIs 3422 using a UI design specification module 3820 and an accessibility module 3830.

Design criteria module 3810 may include any of various design criteria that are dictated by a user interface design specification associated with new UI 106. For example, a UI design specification used to generate a new UI may include element and component definitions, a design palette, etc. The UI design specification and accessibility rules are used by design criteria module 3810 to score candidate intermediate UIs 3422. Accessibility rules may also be included in the UI design specification or may be independent of the design specification. For example, accessibility rules may be global rules that apply to various UIs, while design criteria included in a design specification, such as element and component definitions and a design palette, may be local rules that apply to UIs that are generated using the UI design specification.

UI design specification module 3820 evaluates candidate intermediate UIs 3422 based on a design palette specified by the UI design specification of the new UI 106 to generate a match score 3822. In some embodiments, the match score 3822 for a particular candidate intermediate UI 3422 indicates the extent to which this UI satisfies the design requirements of the new UI design specification. For example, this score may indicate the likelihood that the particular candidate intermediate UI looks like the new UI (e.g., with respect to style).

Accessibility module 3830, in the illustrated embodiment, evaluates one or more candidate intermediate UIs 3422 to determine whether content of these UIs include any accessibility violations 3832. For example, accessibility violations may include visibility violations (e.g., violates contrast requirements), usability violations, sizing violations, etc. As one specific example, if a current UI includes a red button with white text and a new UI includes a white button with blue text, then a candidate intermediate UI 3422 generated based on these UIs may include a pink button with light blue text. In this example, the pink button with light blue text will provide poor visibility of the text within the button. Therefore, this candidate intermediate UI 3422 violates an accessibility rule. As another specific example, if a current UI includes a button that includes an outline, text, and a link, and a candidate intermediate UI only includes the button outline and text, then this candidate intermediate UI may violate usability rules. Specifically, the button outline and text included in the intermediate UI will not redirect a user to a link associated with the button when the user clicks on the button. An acceptable candidate intermediate UI will include all three elements (e.g., the outline, text, and link) of the button. As an additional example, accessibility module 3830 may verify that text elements included in a candidate intermediate UI 3422 satisfy contrast requirements. Specifically, if the original UI contains black text on a white background and the new design includes white text on a black background, accessibility module 3830 will flag a candidate intermediate UI generated for these UIs that includes white text on a white background.

Design criteria module 3810 generates intermediate UI scores 3432 for candidate intermediate UIs 3422 based on matching scores 3822 and accessibility violations 3832. For example, a candidate intermediate UI 3422 whose matching score 3822 indicates that it closely matches the style of the new UI and does not include any accessibility violations 3832 will receive an intermediate UI score 3432 indicating that this candidate intermediate UI 3422 should be included in the UI migration plan 108. Another candidate intermediate UI 3422 that receives a poor matching score 3822 and includes several accessibility violations 3832 will most likely be thrown out by migration plan module 3440 when selecting candidate intermediate UIs 3422 for use in UI migration plan 108.

Example Migration Plan Module

Figure 39:
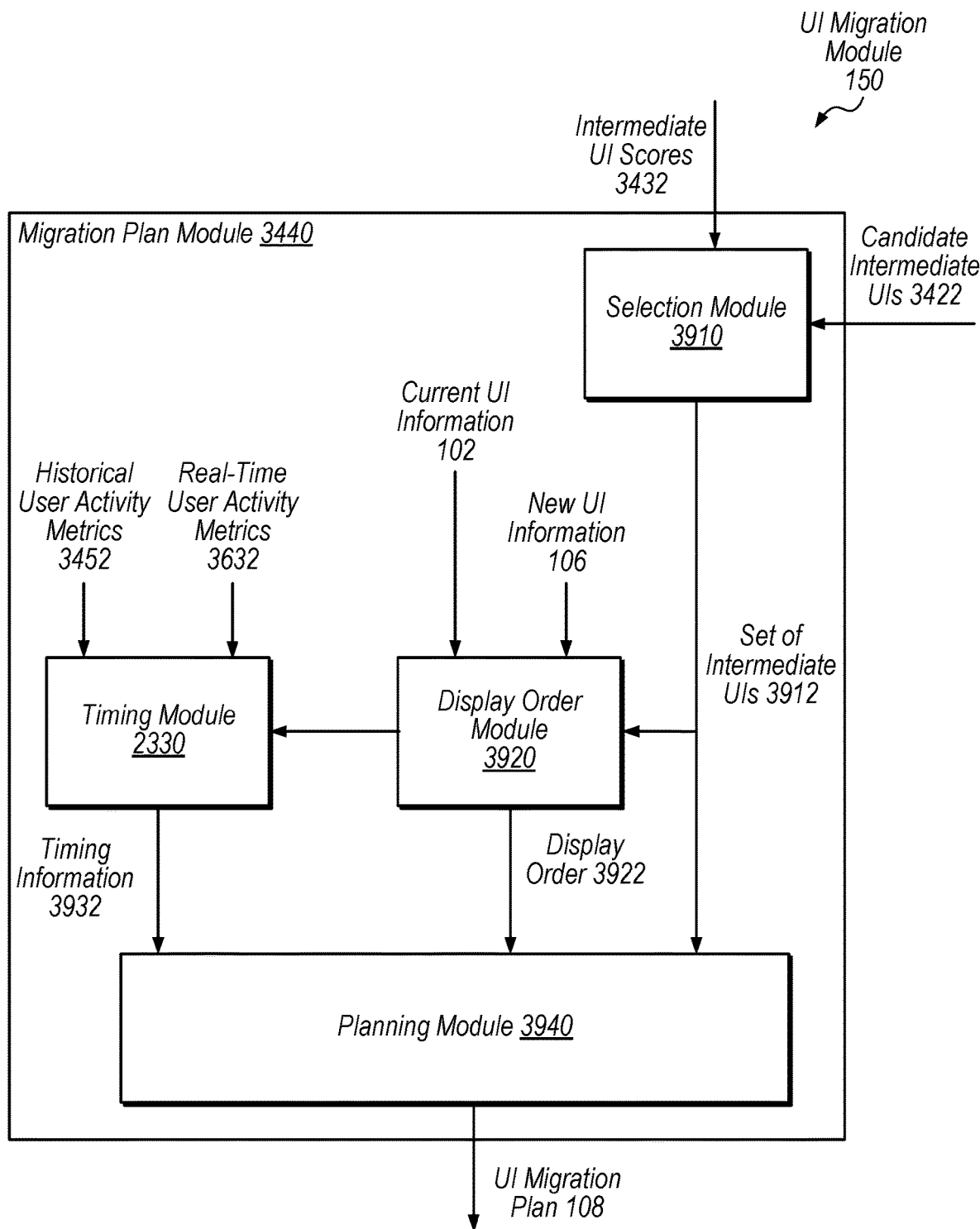
FIG. 39 is a block diagram illustrating an example migration plan module, according to some embodiments.

FIG. 39 is a block diagram illustrating an example migration plan module 3440. In the illustrated embodiment, migration plan module 3440 includes selection module 3910, display order module 3920, timing module 3930, and planning module 3940.

Selection module 3910, in the illustrated embodiment, receives intermediate UI scores 3432 and candidate intermediate UIs 3422. Based on the intermediate UI scores, selection module 3910 selects a set of intermediate UIs 3912 from the candidate intermediate UIs 3422. For example, selection module 3910 may select candidate intermediate UIs 3422 whose scores 3432 satisfy a design threshold. A score 3432 indicating that a candidate intermediate UI violates two or more accessibility rules may not satisfy the design threshold and, therefore, is not selected for inclusion in UI migration plan 108.

Display order module 3920 receives information specifying current UI 102, information specifying new UI 106, and the set of intermediate UIs 3912 selected by selection module 3910. Display order module 3920 then determines a display order 3922 for the UIs that specifies an order in which to display the current UI, the new UI, and intermediate UIs included in the set. Module 3920 then provides the display order 3912 as well as the current and new UIs to planning module 3940.

Timing module 3930 receives both historical user activity metrics 3452 and real-time user activity metrics 2032, determines timing information 3932 based on the metrics, and provides this timing information 3932 to planning module 3940. Timing module 3930 may receive display order 3922, current UI 102, new UI 106, and the set of intermediate UIs 3912 from display order module 3920. Timing information 3932 may specify a window of time during which a user will receive the UI from display order module 2320 when accessing a webpage one or more times. For example, a user may view this webpage during several different instances, but for different lengths of time. In this example, timing information 3932 specifies a window of time with respect to a total viewing time for the different instances of the user viewing the webpage. For example, if user's activity (e.g., clicking activity) indicates a reduced performance (either historical or real-time) relative to a given displayed interface, then the timing information 3932 may specify to display each UI (i.e., current, intermediate, or new UIs) for a longer amount of time before transitioning to the next UI than for a second user whose activity indicates a higher performance relative to the same or similar UI. Said another way, the first user may be slower to learn and become comfortable interacting with new UIs, while the second user may be faster at learning new UIs.

In some embodiments, timing information 3932 specifies personalized lengths of time to display each UI included in the UI migration plan. This personalized timing information may be determined based on display information received from display order module 3920. For example, an intermediate UI displayed after the current UI may be displayed longer than an intermediate UI displayed right before the new UI.

Planning module 3940, in the illustrated embodiment, generates UI migration plan 108 that includes the current UI 102, the set of intermediate UIs 3912, and the new UI 106 as well as the information 3932 specifying the order in which to display the UIs and the information 3932 specifying timing of the display.

Using a UI migration plan to incrementally transition from a current UI to a new UI may advantageously prevent user interaction issues with the new UI. This in turn may improve user productivity relative to new UIs that are not introduced using a migration plan. Implementing the UI migration plan may advantageously help users become more comfortable with the process of change and, as a result, these users may improve the speed at which they learn new user interfaces over time.

Example Migration

Figure 40:
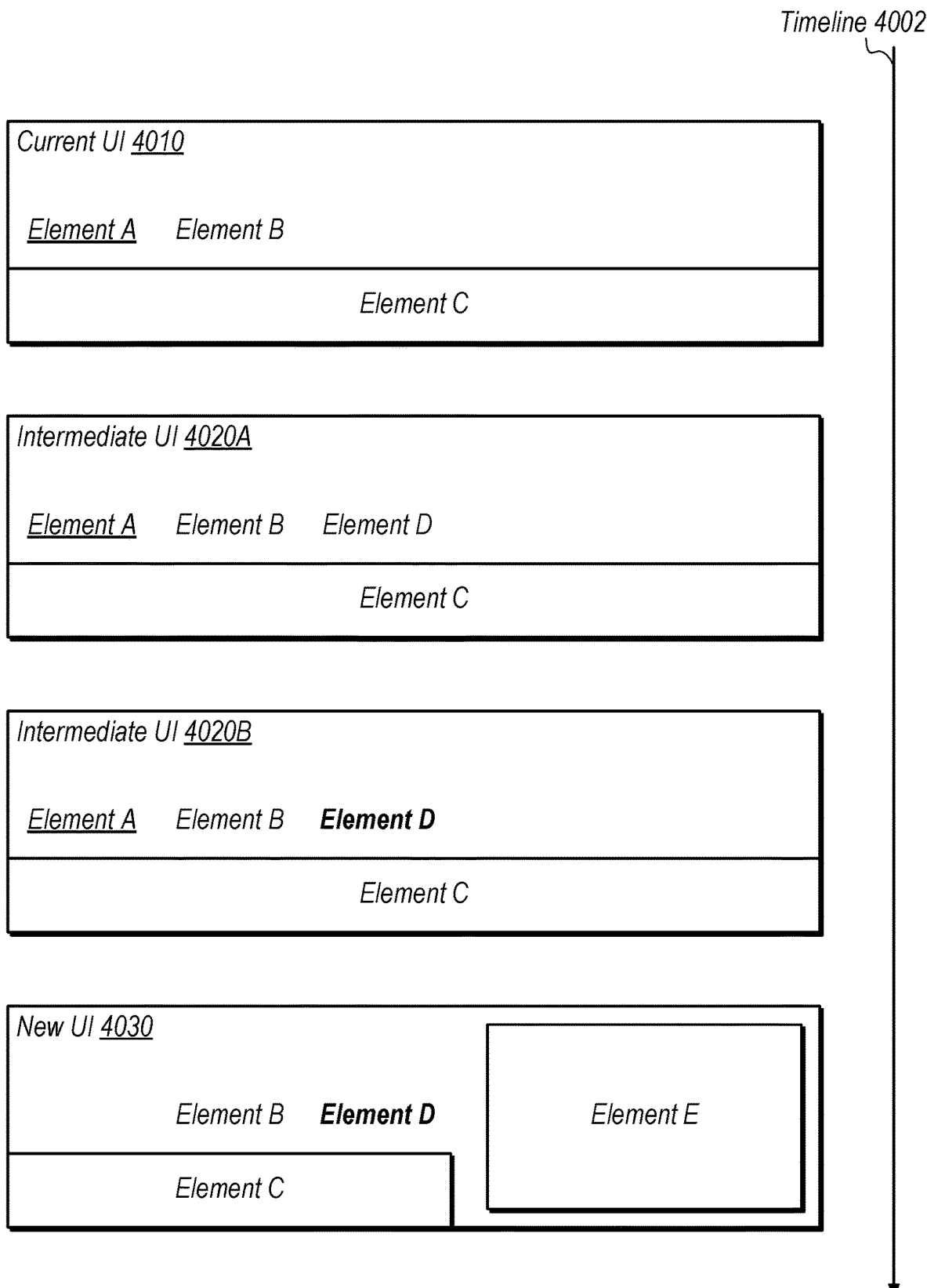
FIG. 40 is a block diagram illustrating example migration from a current UI to a new UI using intermediate UIs, according to some embodiments.

FIG. 40 is a block diagram illustrating example migration from a current UI 4010 to a new UI 4030 using intermediate UIs 4020. In the illustrated embodiment, current UI 4010 includes three different elements A, B, and C and is displayed first according to timeline 4002. Intermediate UI 4020A is displayed next and includes an added element D that is not included in current UI 4010. The next intermediate UI 4020B to be displayed includes a change in style (i.e., element D is bolded) from intermediate UI 4020A. Finally, the new UI 4030 is displayed and includes three changes: addition of element E, resizing of element C, and removal of element A.

Figure 41A:
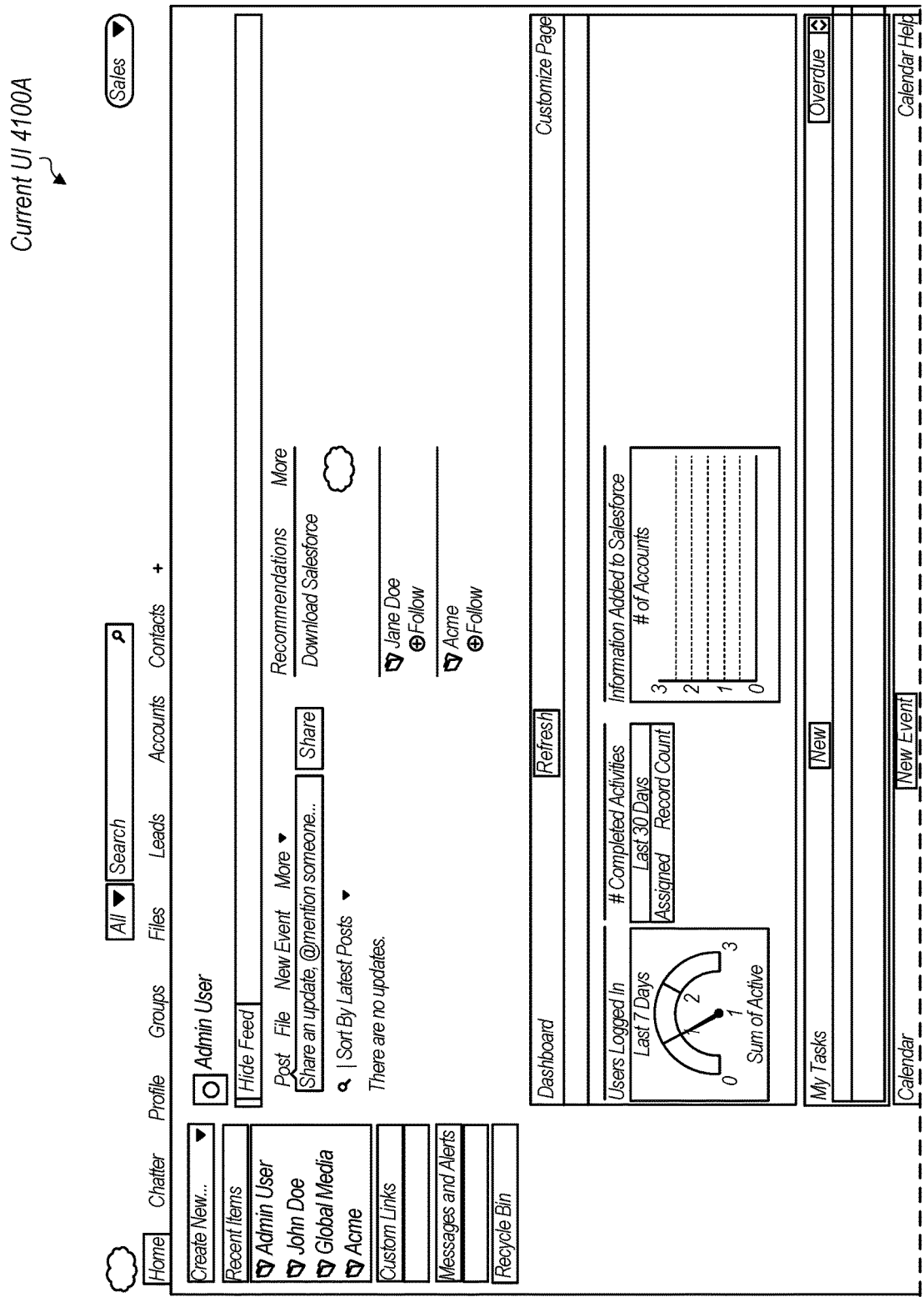

FIGS. 41A-41E are block diagrams illustrating detailed examples of a current UI 4100A, intermediate UIs 4100B-4100D, and a new UI 4100E. FIG. 41A shows an example current UI 4100A that is a webpage that is designed according to the Salesforce Classic design specification.

Figure 41B:
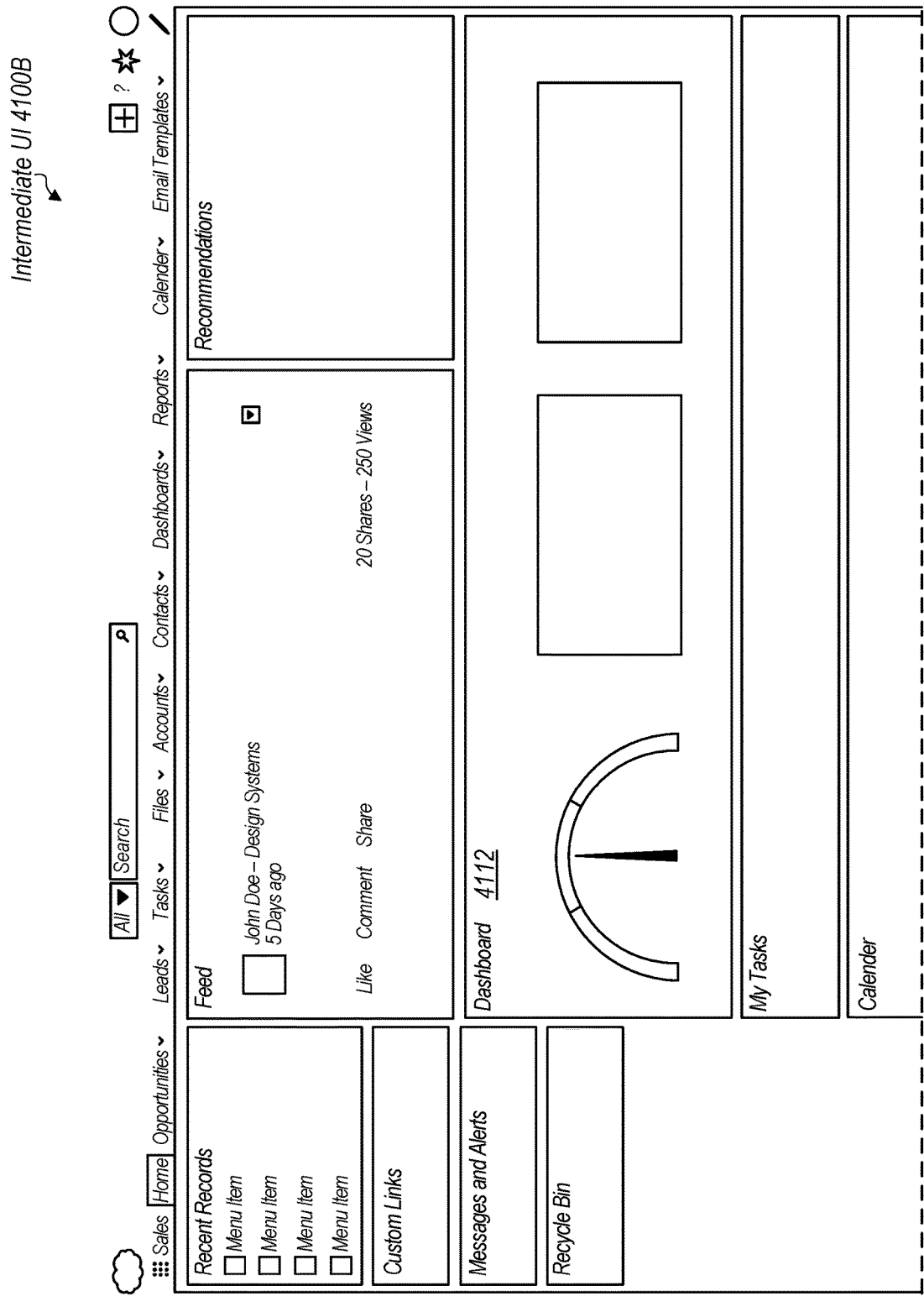
Figure 41C:
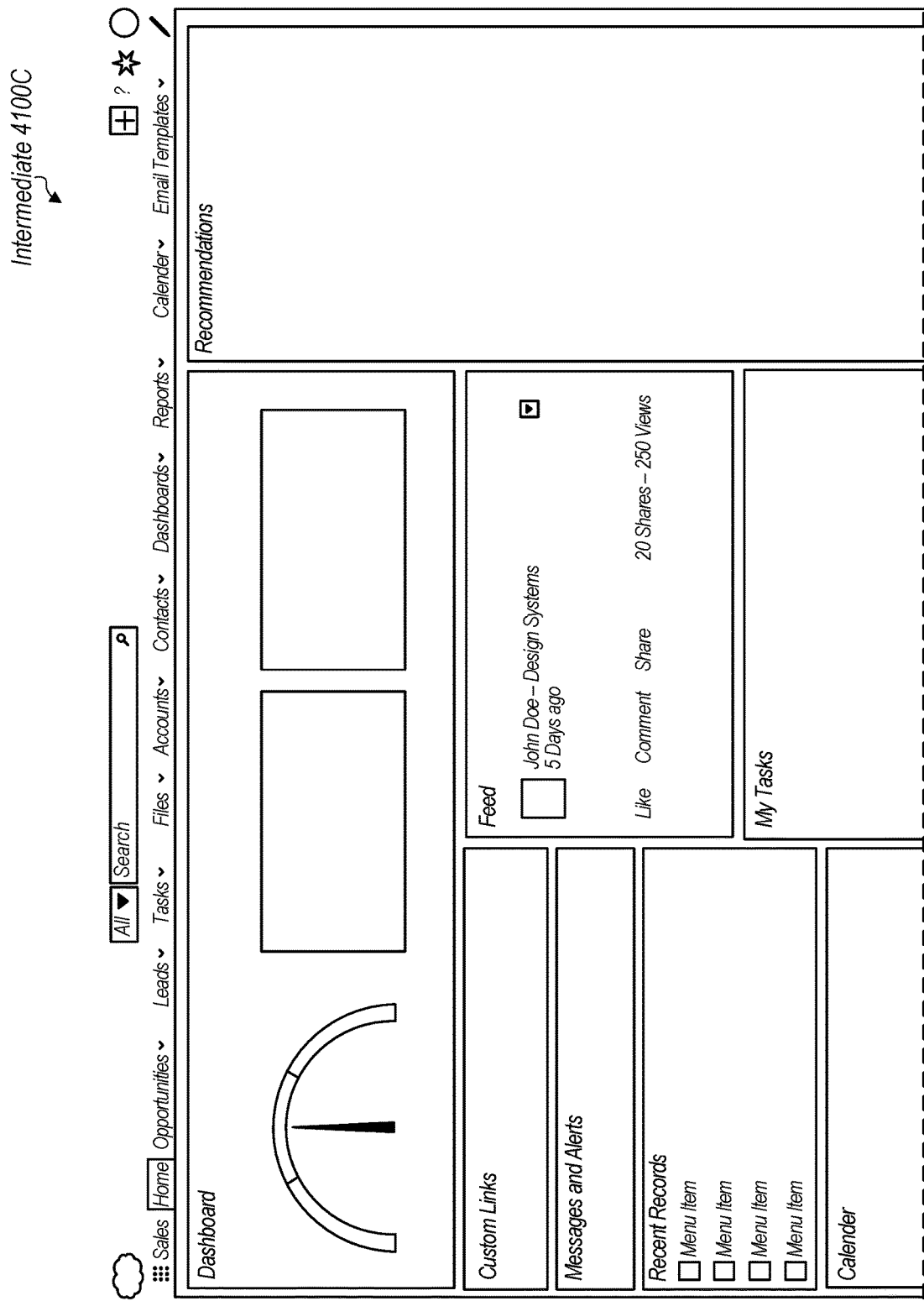
Figure 41D:
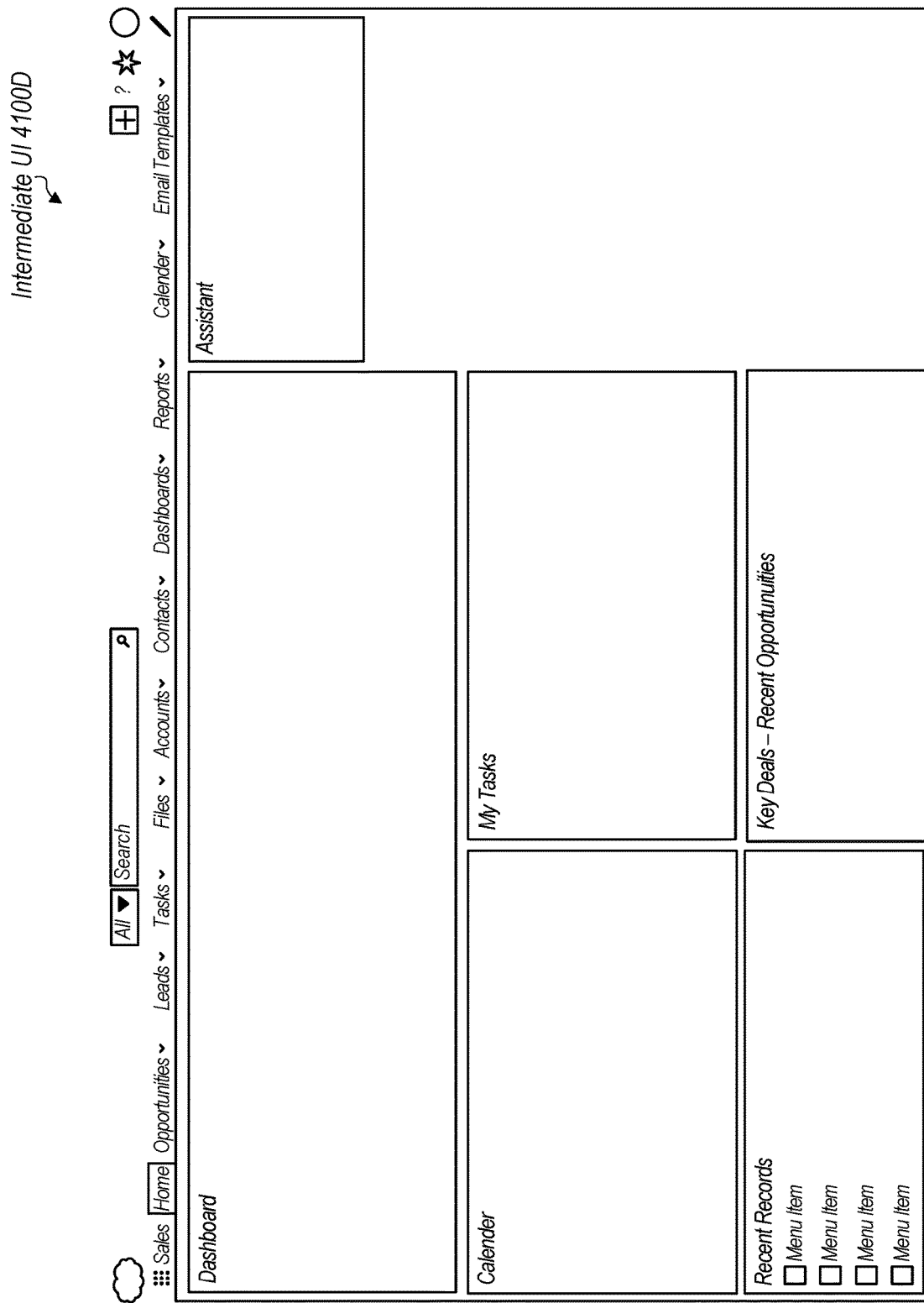

FIGS. 41B-41D show example intermediate UIs 4100B-4100D that include changes from the current UI 4100A. Intermediate UI 4100B shows a version of current UI 4100A with updates styles. For example, dashboard component 4112 includes an indicator element with a needle that is a different style from the indicator element included in the dashboard of current UI 4100A. Intermediate UI 4100C illustrated in FIG. 41C includes similar components to intermediate UI 4100B but in different locations (e.g., dashboard component 4112 is moved to the top portion of the UI). For intermediate UI 4100D, the dashboard component 4112 has been removed altogether as shown in FIG. 41D. Finally, FIG. 41E illustrates new UI 4100E which is a version of the intermediate UI 4100D but with new content placed in its components.

Example Method

Figure 42:
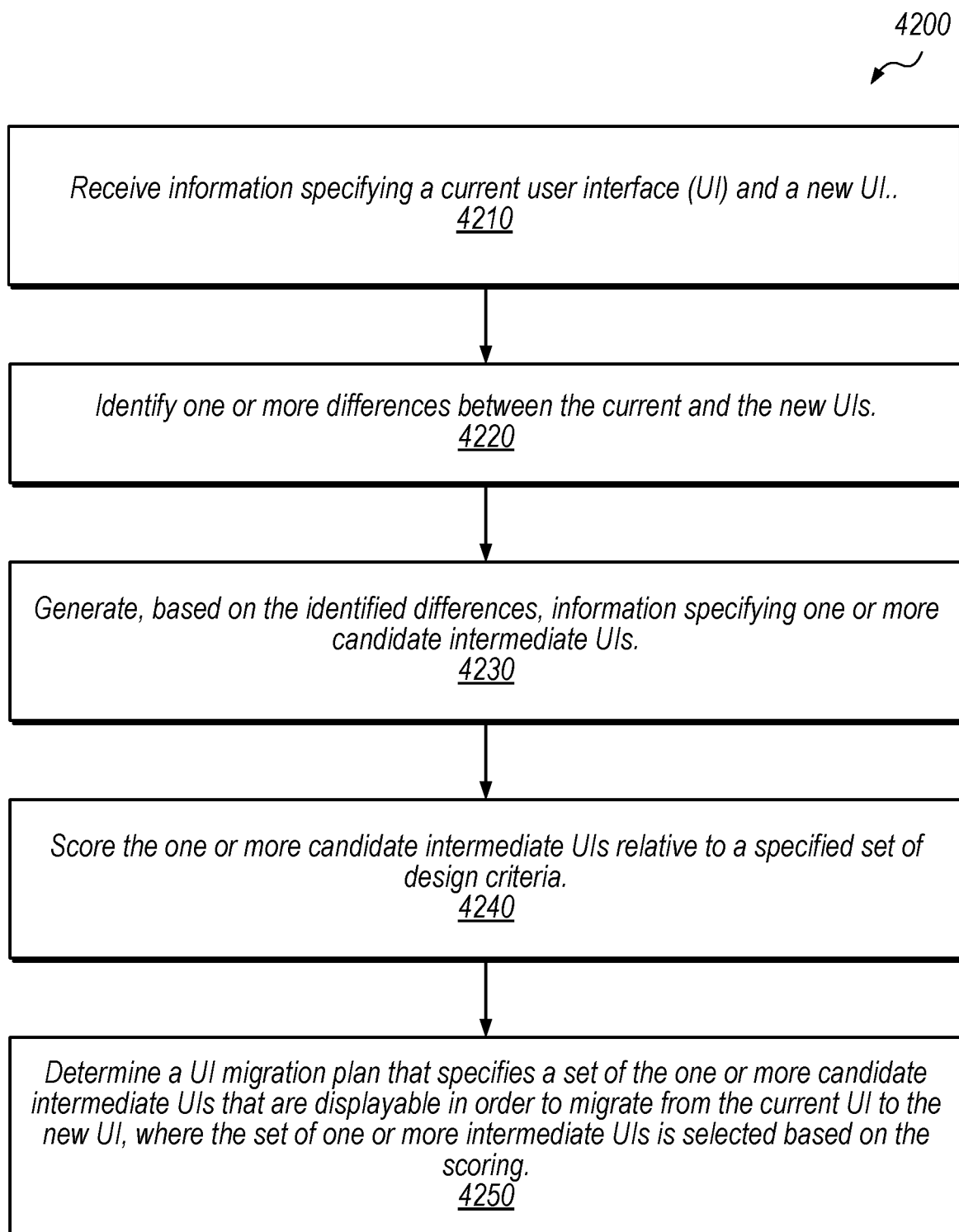
FIG. 42 is a flow diagram illustrating a method for determining a similarity of new UI components to components of a current user interface (UI) for use in automatically generating a new UI, according to some embodiments.

Turning now to FIG. 42, a flow diagram illustrating a method 4200 for determining a similarity of new UI components to components of a current UI for use in automatically generating a new UI, according to some embodiments. The method shown in FIG. 42 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 4210, in the illustrated embodiment, a computer system receives information specifying a current user interface (UI) and a new UI.

At 4220, the computer system identifies one or more differences between the current and the new UIs.

At 4230, the computer system generates, based on the identified differences, information specifying one or more candidate intermediate UIs. In some embodiments, a number of intermediate UIs specified in the generated information is based on a quantity of identified differences between the current and the new UIs, where the identified differences include differences in attributes of UI content in the current and new UIs, including removal of UI content and changes in the attributes of UI content that remains. Specifically, the number of intermediate screens may be less than or equal to the number of differences. For example, in some instances, a transition from one intermediate UI to another will include several changes bundled together, resulting in less intermediate UIs than the number of differences. In some embodiments, the number of intermediate UIs specified in the generated information is further based on identifying a quantity of dependencies included in content of the current and new UIs, where the one or more intermediate UIs are generated according to the identified dependencies. In some embodiments, the dependencies specify that at least two UI elements included in the current UI must be displayed at the same time within the current UI.

At 4240, the computer system scores the one or more candidate intermediate UIs relative to a specified set of design criteria. In some embodiments, the scoring relative to the specified set of design criteria includes determining an extent to which the one or more candidate intermediate UIs satisfy one or more accessibility rules. For example, an accessibility rule may specify visibility requirements for UIs (e.g., a certain amount of contrast between UI colors). In some embodiments, the set of design criteria includes one or more rules of a user interface design specification that specify at least one of: accessibility, layout, and a design palette. That is, the user interface design specification could include one or more of the following types of information: accessibility, layout, and design palette.

At 4250, the computer system determines a UI migration plan that specifies a set of the one or more candidate intermediate UIs that are displayable in order to migrate from the current UI to the new UI, where the set of one or more intermediate UIs is selected based on the scoring. In some embodiments, the UI migration plan further specifies a display order and timing information for the set of one or more intermediate UIs, where the timing information specifies a window of time in which to display UIs included in the set of one or more intermediates UIs. In some embodiments, the UI migration plan is specific to a particular user. In some embodiments, the display order and the timing information are determined based on historical activity metrics tracked for the particular user. For example, based on past scrolling, hovering, clicking, etc. activity of the particular user within various displayed user interfaces, the computer system determines what order and a length of time to display intermediate UIs included in the UI migration plan. For example, the UI migration plan may specify, for a particular user, to show each intermediate UI for a shorter window of time or to skip display of an intermediate UI when the particular user learns or becomes comfortable with new UIs quickly relative to other users.

In some embodiments, the UI migration plan is adaptable during operation of the UI migration plan, and wherein adaptation of the UI migration plan is based on tracking user activity metrics during display of at least one of the set of one or more intermediate UIs. For example, the UI migration plan may be updated based on real-time tracking of user activity metrics. As one specific example, an intermediate UI may be displayed and based on user interaction with this UI, the speed at which intermediate UIs in the migration plan are displayed is adjusted.

In some embodiments, the computer system causes display, according to the UI migration plan, of at least one of the set of intermediate UIs. For example, the computer system may provide the set of intermediate UIs, included in the UI migration plan, to a user device for display by the device. In some embodiments, the computer system receives, from a user computing device, user activity metrics, where the user activity metrics are tracked during display of the at least one of the set of intermediate UIs. In some embodiments, in response to receiving user activity metrics, the computer system changes one or more intermediate UIs included in the set that are yet to be displayed. For example, the computer system may add intermediate UIs to, remove intermediate UIs from, or update intermediate UIs included in the set. In some embodiments, the user activity metrics include, for the set of intermediate UIs, at least one of: scrolling within the user interface, hovering within the user interface, and clicking within the user interface.

In some embodiments, the computer system is a server computer system that receives a base user interface (UI) migration plan, where the base UI migration plan includes a set of intermediate UIs that are displayable in order to migrate from a current UI to a new UI. In some embodiments, UIs in the set of intermediate UIs are generated based on one or more identified differences between the current UI and the new UI. In some embodiments, the server computer system transmits, to a user computer device, the set of intermediate UIs included in the base UI migration plan, where the set of intermediate UIs are displayable by the user computer device. In some embodiments, the server computer system receives from the user computer device, user activity metrics tracked for user of the user computer device relative to the display of at least one of the set of intermediate UIs included in the base UI migration plan. In some embodiments, the server computer system alters, based on the received user activity metrics, the base UI migration plan.

In some embodiments, the server computer system updates, based on historical user activity metrics, the base UI migration plan. In some embodiments, the altering includes one or more of the following: changing a display order for UIs included in the UI migration plan, changing timing of display for UIs included in the UI migration plan, and changing one or more of the UIs included in the set of intermediate UIs. In some embodiments, the one or more identified differences between the current UI and the new UI are identified based on an analysis of program code and one or more UI screenshots included in information specifying the current UI and the new UI.

Example Computing Device

Figure 43:
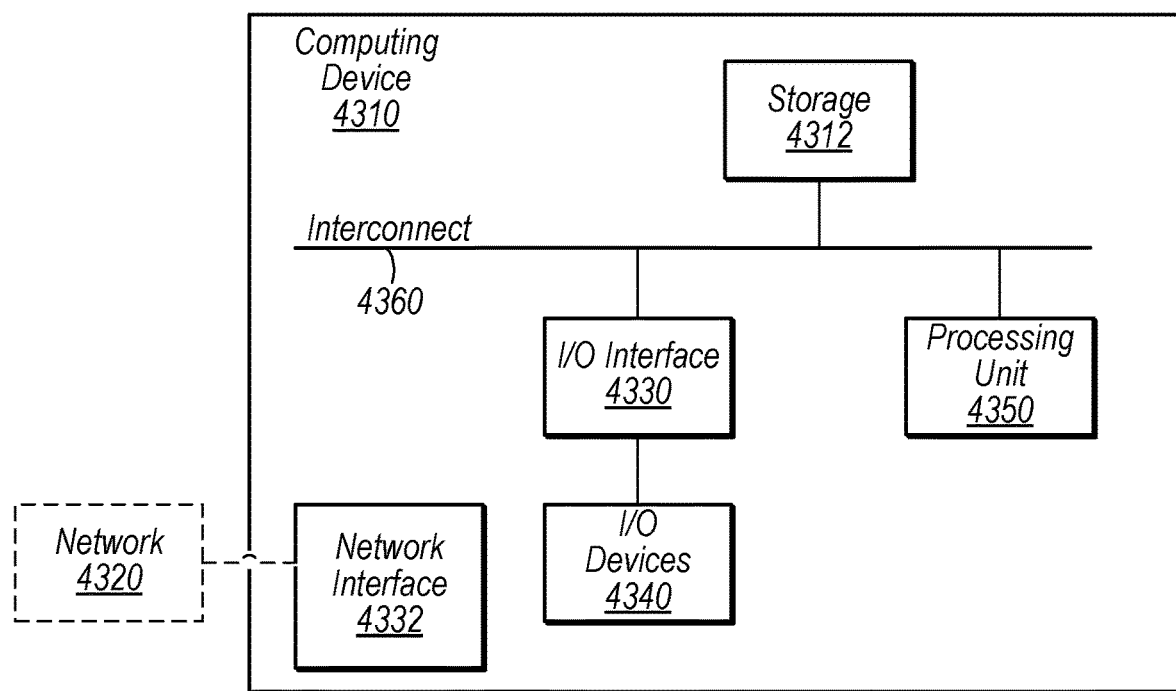
FIG. 43 is a block diagram illustrating an example computing device, according to some embodiments.

Turning now to FIG. 43, a block diagram of a computing device (which may also be referred to as a computing system) 4310 is depicted, according to some embodiments. Computing device 4310 may be used to implement various portions of this disclosure. Computing device 4310 is one example of a device that may be used as a mobile device, a server computer system, a client computer system, or any other computing system implementing portions of this disclosure.

Computing device 4310 may be any suitable type of device, including, but not limited to, a personal computer system, desktop computer, laptop or notebook computer, mobile phone, mainframe computer system, web server, workstation, or network computer. As shown, computing device 4310 includes processing unit 4350, storage subsystem 4312, and input/output (I/O) interface 4330 coupled via interconnect 4360 (e.g., a system bus). I/O interface 4330 may be coupled to one or more I/O devices 4340. Computing device 4310 further includes network interface 4332, which may be coupled to network 4320 for communications with, for example, other computing devices.

Processing unit 4350 includes one or more processors and, in some embodiments, includes one or more coprocessor units. In some embodiments, multiple instances of processing unit 4350 may be coupled to interconnect 4360. Processing unit 4350 (or each processor within processing unit 4350) may contain a cache or other form of on-board memory. In some embodiments, processing unit 4350 may be implemented as a general-purpose processing unit, and in other embodiments it may be implemented as a special purpose processing unit (e.g., an ASIC). In general, computing device 4310 is not limited to any particular type of processing unit or processor subsystem.

As used herein, the term "processing unit" refers to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

Storage subsystem 4312 is usable by processing unit 4350 (e.g., to store instructions executable by and data used by processing unit 4350). Storage subsystem 4312 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 4312 may consist solely of volatile memory in some embodiments. Storage subsystem 4312 may store program instructions executable by computing device 4310 using processing unit 4350, including program instructions executable to cause computing device 4310 to implement the various techniques disclosed herein.

I/O interface 4330 may represent one or more interfaces and may be any of various types of interfaces configured to couple to and communicate with other devices, according to various embodiments. In some embodiments, I/O interface 4330 is a bridge chip from a front-side to one or more back-side buses. I/O interface 4330 may be coupled to one or more I/O devices 4340 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 43 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a computer system, a request to generate stencils for a user interface (UI), wherein the request includes i) an automatically rendered version of the UI and ii) automatically generated metadata including program code for the UI;
   identifying, by the computer system based on the request, one or more bounding regions of content within the rendered version of the UI, wherein the identifying includes analyzing the rendered version of the UI using one or more image processing routines;
   automatically generating, by the computer system based on the one or more identified bounding regions and in response to an initial portion of data specifying content of the UI arriving, one or more base UI stencils that are displayable as progress indicators indicative of the initial portion;
   transmitting, by the computer system to a different computer system, the one or more base UI stencils to cause the different computer system to automatically display the one or more base UI stencils; and
   in response to an additional portion of data specifying content of the UI arriving, the computer system:
     generating one or more updated UI stencils that are displayable as progress indicators indicative of both the initial portion and the additional portion; and
     transmitting, to the different computer system, the one or more updated UI stencils to cause the different computer system to automatically display the one or more updated UI stencils.

2. The method of claim 1, wherein the metadata and the rendered version of the UI are generated by automatically updating an existing UI.

3. The method of claim 1, wherein results of the analyzing the rendered version of the UI indicate an outer boundary of one or more constituent parts included in the rendered version of the UI.

4. The method of claim 1, further comprising:
   determining, by the computer system, a design palette, wherein the determining includes accessing a plurality of UI element specifications included in a UI design specification associated with the UI, and wherein the plurality of UI element specifications include characteristics of a plurality of UI elements; and formatting, by the computer system according to the design palette, the one or more base UI stencils and the one or more updated UI stencils.

5. The method of claim 4, wherein formatting further includes:

performing a color analysis of a variety of colors included in the design palette;

determining, based on results of the color analysis, a representative color for the UI; and assigning the representative color, selected from the variety of colors included in the design palette, to the one or more base UI stencils and the one or more updated UI stencils.

6. The method of claim 4, wherein the formatting includes:

determining respective amounts of a base stencil color included in ones of a plurality of colors specified in the design palette; and adjusting the base stencil color according to the determined amounts.

7. The method of claim 1, further comprising the different computer system displaying the one or more base UI stencils and the one or more updated UI stencils in response to receiving the stencils from the computer system.

8. The method of claim 1, wherein the automatically generating includes:

analyzing one or more rendered instances of a particular UI component included in the rendered version of the UI;

determining, based on analyzing the one or more rendered instances of the particular UI component, a subset of data of the particular UI component that is included in the one or more rendered instances; and generating, based on the subset of data, a stencil for the particular UI component.

9. The method of claim 1, wherein the automatically generated metadata of the UI further includes a list of components to be loaded for rendering in the UI, and wherein the rendered version of the UI is a screenshot of the UI.

10. A non-transitory computer-readable medium having instructions stored thereon that are capable of causing a computing device to implement operations comprising:

receiving a request to generate stencils for a user interface (UI), wherein the request includes i) an automatically rendered version of the UI and ii) automatically generated metadata including program code for the UI;

identifying, based on the request, one or more bounding regions of content within the rendered version of the UI, wherein the identifying includes analyzing the rendered version of the UI using one or more computer vision techniques;

automatically generating, based on the one or more identified bounding regions and in response to an initial portion of data specifying content of the UI arriving, one or more base UI placeholders that are displayable as progress indicators indicative of the initial portion;

transmitting, to a different computing device, the one or more base UI placeholders to cause the different computing device to automatically display the one or more base UI placeholders; and in response to an additional portion of data specifying content of the UI arriving:

generating one or more updated UI placeholders that are displayable as progress indicators indicative of both the initial portion and the additional portion; and transmitting, to the different computing device, the one or more updated placeholders to cause the different computing device to automatically display the one or more updated UI placeholders.

11. The non-transitory computer-readable medium of claim 10, wherein the operations further comprise:

determining a design palette, wherein the determining includes accessing a plurality of UI element specifications included in a UI design specification associated with the UI, and wherein the plurality of UI element specifications include characteristics of a plurality of UI elements; and formatting, according to the design palette, the one or more base UI placeholders and the one or more updated UI placeholders.

12. The non-transitory computer-readable medium of claim 11, wherein the formatting includes:

performing a color analysis of a variety of colors included in the design palette;

determining, based on results of the color analysis, a representative color for the UI; and assigning the representative color, selected from the variety of colors included in the design palette, to the one or more base UI placeholders and the one or more updated UI placeholders.

13. The non-transitory computer-readable medium of claim 10, further comprising the different computing device displaying the one or more base UI placeholders and the one or more updated UI placeholders in response to receiving the stencils from the computing device.

14. The non-transitory computer-readable medium of claim 10, wherein the automatically generating includes:

analyzing one or more rendered instances of a particular UI component included in the rendered version of the UI;

determining, based on analyzing the one or more rendered instances of the particular UI component, a subset of data of the particular UI component that is included in the one or more rendered instances; and generating, based on the subset of data, a placeholder for the particular UI component.

15. The non-transitory computer-readable medium of claim 10, wherein the identifying further includes analyzing a list of components to be loaded for rendering in the UI and program code of the UI.

16. A system, comprising:

at least one processor;

a non-transitory, computer-readable medium having instructions stored thereon that are executable by the at least one processor to cause the system to:

receive a request to generate stencils for a user interface (UI), wherein the request includes i) an automatically rendered version of the UI and ii) automatically generated metadata including program code for the UI;

identify, based on the request, one or more bounding regions of content within the rendered version of the UI, wherein the identifying includes analyzing the metadata and the rendered version of the UI;

automatically generate, based on the one or more identified bounding regions and in response to an initial portion of data specifying content of the UI arriving, one or more base UI stencils that are displayable as progress indicators indicative of the initial portion;

transmit to a different computer system, the one or more base UI stencils to cause the different computer system to automatically display the one or more base UI stencils; and in response to an additional portion of data specifying content of the UI arriving, the system:

generating one or more updated UI stencils that are displayable as progress indicators indicative of both the initial portion and the additional portion; and transmitting, to the different computer system, the one or more updated UI stencils to cause the different computer system to automatically display the one or more updated UI stencils.

17. The system of claim 16, wherein the instructions are further executable to cause the system to:

determine a design palette, wherein the determining includes accessing a plurality of UI element specifications included in a UI design specification associated with the UI, and wherein the plurality of UI element specifications include characteristics of a plurality of UI elements; and format, according to the design palette, the one or more base UI stencils and the one or more updated UI stencils.

18. The system of claim 16, wherein the automatically generating is performed within a specified time interval.

19. The system of claim 16, wherein identifying one or more bounding regions further includes:

analyzing, using one or more image processing routines, the rendered version of the UI, wherein results of the analyzing indicate an outer boundary of one or more components included in the rendered version of the UI.

20. The system of claim 16, wherein the metadata and the rendered version of the UI are generated by automatically updating an existing UI.

* * * * *